US012145745B2

(12) United States Patent
Karni et al.

(10) Patent No.: US 12,145,745 B2
(45) Date of Patent: Nov. 19, 2024

(54) METHODS FOR MANAGING CENTER OF GRAVITY WHILE LOADING WIND TURBINE BLADES ON A CARGO AIRCRAFT USING INTERNALLY-EXTENDING RAILS

(71) Applicant: ZSM HOLDINGS LLC, Dover, DE (US)

(72) Inventors: Etan D. Karni, Boulder, CO (US); Scott David Rewerts, Boulder, CO (US); Mark Emil Lundstrom, Boulder, CO (US)

(73) Assignee: ZSM Holdings, LLC, Dover, DE (US)

( * ) Notice: Subject to any disclaimer, the term of this patent is extended or adjusted under 35 U.S.C. 154(b) by 0 days.

(21) Appl. No.: 17/862,317

(22) Filed: Jul. 11, 2022

(65) Prior Publication Data

US 2022/0340281 A1 Oct. 27, 2022

Related U.S. Application Data

(60) Division of application No. 17/550,620, filed on Dec. 14, 2021, now Pat. No. 11,383,838, which is a (Continued)

(51) Int. Cl.
*B64D 9/00* (2006.01)
*B64C 1/06* (2006.01)
(Continued)

(52) U.S. Cl.
CPC ............ *B64D 9/003* (2013.01); *B64C 1/0683* (2020.01); *B64C 1/1415* (2013.01); *B64C 1/20* (2013.01);
(Continued)

(58) Field of Classification Search
CPC ... B64D 9/003; B64D 2009/006; F03D 13/40; F05B 2260/02; B64C 1/0683; B64C 1/20; B64C 1/22; B64F 1/32
(Continued)

(56) References Cited

U.S. PATENT DOCUMENTS 2,998,948 A 9/1961 Sisk
3,374,972 A 3/1968 Webb
(Continued)

FOREIGN PATENT DOCUMENTS

CN 103452752 A 12/2013
CN 107963198 A 4/2018
(Continued)

OTHER PUBLICATIONS

U.S. Appl. No. 17/550,620, filed Dec. 14, 2021, Methods for Managing Cargo Aircraft Center of Gravity.
(Continued)

*Primary Examiner* — Brady W Frazier
(74) *Attorney, Agent, or Firm* — Barnes & Thornburg LLP

(57) ABSTRACT

Systems, methods, and aircraft for managing center of gravity (CG) while transporting large cargo are described. Management of CG is achieved in many ways. In some instances, the aircraft itself is designed to assist in managing CG by providing fuel tanks that minimize the impact of fuel on the net CG of the aircraft. The fuel tanks utilize only a small amount of available volume in the wings for fuel. Disclosures related to properly managing CG while loading wind turbines onto cargo aircraft are also provided. The CG management techniques provided for herein allow for the transportation of wind turbine blades via aircraft, running counter to the typical rail or truck transportation of the same. One such management technique includes accounting for how a rotation of the blades when loading impacts the CG of the blades, and thus taking this into account when placing the blades in the aircraft.

19 Claims, 32 Drawing Sheets

Related U.S. Application Data continuation of application No. PCT/US2020/049786, filed on Sep. 8, 2020.

(60) Provisional application No. 62/938,853, filed on Nov. 21, 2019, provisional application No. 62/896,529, filed on Sep. 5, 2019, provisional application No. 62/896,533, filed on Sep. 5, 2019.

(51) Int. Cl.
| | | |
|---|---|---|
| *B64C 1/14* | (2006.01) | |
| *B64C 1/20* | (2006.01) | |
| *B64C 1/22* | (2006.01) | |
| *B64C 3/32* | (2006.01) | |
| *B64C 3/34* | (2006.01) | |
| *B64C 17/08* | (2006.01) | |
| *B64D 37/04* | (2006.01) | |
| *B64F 1/32* | (2006.01) | |
| *F03D 13/40* | (2016.01) | |

(52) U.S. Cl.
CPC .............. *B64C 1/22* (2013.01); *B64C 3/32* (2013.01); *B64C 3/34* (2013.01); *B64C 17/08* (2013.01); *B64D 9/00* (2013.01); *B64D 37/04* (2013.01); *B64F 1/32* (2013.01); *F03D 13/40* (2016.05); *B64D 2009/006* (2013.01); *F05B 2260/02* (2013.01)

(58) Field of Classification Search
USPC ...................................... 244/118.1
See application file for complete search history.

(56) References Cited

U.S. PATENT DOCUMENTS

| | | | |
|---|---|---|---|
| 7,944,372 | B2 | 5/2011 | Gouette et al. |
| 8,121,786 | B2 | 2/2012 | Morbey et al. |
| 10,641,249 | B2 | 5/2020 | Thomsen et al. |
| 10,994,842 | B1 | 5/2021 | Skylus |
| 11,383,838 | B2 | 7/2022 | Karni et al. |
| 2004/0200930 | A1 | 10/2004 | Bays-Muchmore et al. |
| 2006/0108477 | A1 | 5/2006 | Helou, Jr. |
| 2009/0114773 | A1 | 5/2009 | Helou, Jr. |
| 2009/0173824 | A1 | 7/2009 | Perez-Sanchez |
| 2009/0261203 | A1* | 10/2009 | Gouette ............... G01M 1/125 340/945 |
| 2009/0304482 | A1 | 12/2009 | Sanford et al. |
| 2010/0252682 | A1 | 10/2010 | Pahl |
| 2012/0114443 | A1 | 5/2012 | Cyrus et al. |
| 2013/0319891 | A1 | 12/2013 | Lieberknecht et al. |
| 2015/0183519 | A1 | 7/2015 | Sandin |
| 2015/0198140 | A1 | 7/2015 | Sigurdsson |
| 2015/0225082 | A1 | 8/2015 | Levron |
| 2016/0244186 | A1 | 8/2016 | Brown |
| 2016/0311512 | A1 | 10/2016 | Sankrithi |
| 2016/0327018 | A1 | 11/2016 | Botwright |
| 2018/0281924 | A1* | 10/2018 | Grubb ....................... B64C 3/38 |
| 2020/0207475 | A1 | 7/2020 | Dobberfuhl et al. |

FOREIGN PATENT DOCUMENTS

| | | |
|---|---|---|
| GB | 900467 A | 7/1962 |
| RU | 2353548 C1 | 4/2009 |

OTHER PUBLICATIONS

No Author Listed. "747-400/-400ER Freighters" StartupBoeing. May 2010.
No Author Listed. "A record transport of world's largest blades by LM Service & Logistics" (LM Wind Power) Feb. 1, 2012. url: https://www.youtube.com/watch?v=N5wD29rqmMY.
No Author Listed. "Air Charter Service—Worlwide Private Aircraft Charter" (Air Charter Service) Apr. 15, 2012. url: https://web.archive.org/web/20120415013519/http://www.aircharterservice.aero/cargo/aircraft/antonov_an225.htm.
No Author Listed. "Wide-Body Air Freight Returns to the U.S." Air & Surface Logistics. Jul. 3, 2014. url: https://airandsurface.com/wide-body-air-freight/.
No Author Listed. "Antonov Airlines Brochure. Jul. 2019. [online] retrieved from URL: https://www.antonov-airlines.com/wp-content/uploads/2019/07/Antonov-Airlines-brochure.pdf".
International Search Report and Written Opinion for Application No. PCT/US20/49787, mailed Nov. 30, 2020 (20 pages).
International Search Report and Written Opinion for Application No. PCT/US2020/049786, mailed Jan. 22, 2021 (20 pages).
International Search Report and Written Opinion for Application No. PCT/US2021/021792, mailed May 20, 2021 (12 pages).
European Supplementary Search Report for Application No. 20860969.1 dated Jul. 27, 2023 (9 pages).
LM Wind Power "A record transport of world's longest blades by LM Service & Logistics," Feb. 1, 2012 (Feb. 1, 2012), XP055911887.
Across land, sea and air: wind turbine blade transportation that can do anything on the sky, on the ground and on the sea! Source: Wind Turbine blades, dated Jan. 12, 2018. (https://www.sohu.com/a/216254180_752780).
Chinese First Office Action for Application No. 2020800749790 dated Jun. 29, 2024 (16 pages).

* cited by examiner

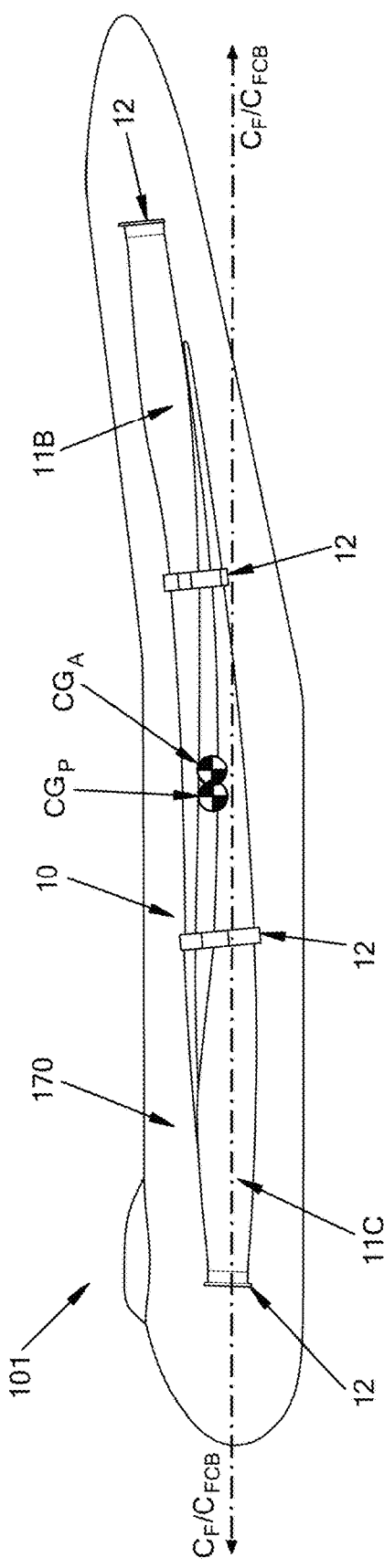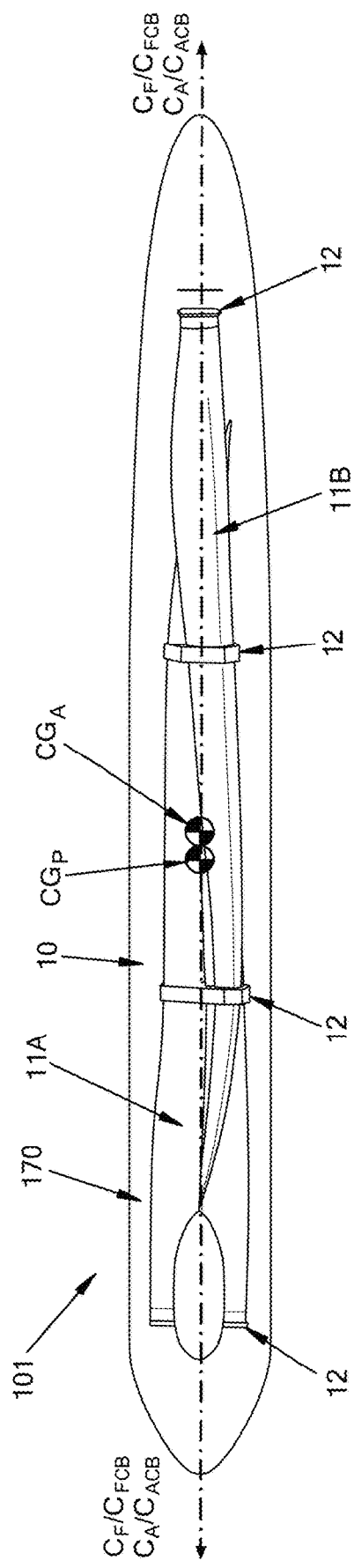
FIG. 13B
FIG. 13C

METHODS FOR MANAGING CENTER OF GRAVITY WHILE LOADING WIND TURBINE BLADES ON A CARGO AIRCRAFT USING INTERNALLY-EXTENDING RAILS

CROSS REFERENCE TO RELATED APPLICATIONS

This application is a divisional of U.S. patent application Ser. No. 17/550,620, filed Dec. 14, 2021, which is a U.S. national stage filing from International Application Number PCT/US2020/049786, filed Sep. 8, 2020, which claims priority to and the benefit of each of U.S. Provisional Patent Application No. 62/896,533, filed Sep. 5, 2019, U.S. Provisional Patent Application No. 62/896,529, filed Sep. 5, 2019, and U.S. Provisional Patent Application No. 62/938,853, filed Nov. 21, 2019, the contents of each which is incorporated by reference herein in its entirety.

FIELD

The present disclosure relates to methods and systems designed to assist in the management of center of gravity, and more particularly provides for methods, and related systems, that are used to provide for a consistent center of gravity for packaging large and/or regular structures, as well as aircraft that are designed to assist in the management of center of gravity.

BACKGROUND

Renewable energy remains an increasingly important resource year-over-year. While there are many forms of renewable energy, wind energy has increased an average of about 19 percent annually since 2007. The increase in global demand in recent years for more wind energy has catalyzed drastic advances in wind turbine technology, including the development of larger, better-performing wind turbines. Better-performing wind turbines can at least sometimes mean larger turbines, as generally turbines with larger rotor diameters can capture more wind energy. As turbines continue to improve in performance and efficiency, more and more wind farm sites become viable both onshore and offshore. These sites may be existing sites, where older turbines need replacement by better-performing, more efficient turbines, and new sites.

A limiting factor to allow for the revitalization of old sites and development of new sites is transporting the wind turbines, and related equipment, to the sites. Wind turbine blades are difficult to transport long distances due to the terrestrial limitations of existing air vehicles and roadway infrastructures. Onshore transportation has traditionally required truck or rail transportation on existing infrastructure. Both are limited by height and width of tunnels and bridges. Road transport has additional complications of lane width, road curvature, and the need to pass through urban areas that may require additional permitting and logistics, among other complications. Offshore transportation by ship is equally, if not more so, limiting. For example, delivery of parts can be limited to how accessible the offshore location is by ship due to various barriers (e.g., sand bars, coral reefs) and the like in the water and surrounding areas, as well as the availability of ships capable of handling such large structures.

Whether onshore or offshore, the road vehicle or ship options for transporting such equipment has become more limited, particularly as the size of wind turbines increase. Delivery is thus limited by the availability of vehicles and ships capable of handling such large structures. The very long lengths of wind turbine blades (some are presently 90 meters long, 100 meters long, or even longer) make conventional transportation by train, truck, or ship very difficult and complicated. Unfortunately, the solution is not as simple as making transportation vehicles longer and/or larger. There are a variety of complications that present themselves as vehicles are made longer and/or larger, including but not limited to complications of: load balancing of the vehicle; load balancing the equipment being transported; load balancing the two with respect to each other; handling, maneuverability, and control of the vehicle; and other complications that would be apparent to those skilled in the art.

Further, whether onshore or offshore, delivery of parts can be slow and severely limited by the accessibility of the site. Whether the site being developed is old or new, the sites can often be remote, and thus not near suitable transportation infrastructure. The sites may be far away from suitable roads and rails (or other means by which cargo may be transported) to allow for easy delivery of cargo for use in building the turbines at the site and/or other equipment used in developing the site. New sites are often in areas without any existing transportation infrastructure at all, thus requiring new construction and special equipment. Ultimately, transportation logistics become cost prohibitive, resulting in a literal and figurative roadblock to further advancing the use of wind energy on a global scale.

Another challenge presented by transporting large cargo, such as wind turbine blades, or other sizes and types of cargos as well, is the management of a position of a center of gravity (CG) of the cargo. This management is of the cargo itself, and with respect to other CGs, such as the CG of the vehicle in which it is being transported. Failure to properly manage CG can cause either or both of the payload and/or vehicles to undesirably flip or rotate and become damaged, or just more generally cause problems with trying to manage stability and controllability of the vehicle and/or the payload. Wind turbine blades and other complex and/or large structures are particularly difficult to manage because of their complex geometries and constructions resulting in the CG of the blade, or package of blades, not being at a geometric centroid of the blade, or package of blades.

Accordingly, there is a need for devices, systems, aircraft, and methods that help manage the CG of one or more of vehicles, aircraft, payloads, and related components to allow for stable and/or easily controllable transportation of payloads, such as irregular payloads like a wind turbine blade or package of wind turbine blades.

SUMMARY

The present application is directed to various ways by which CG can be managed to allow for the quick and efficient transportation of large cargo via cargo aircraft. In some instances, the focus is on managing the CG of the aircraft itself and how the fuel of the aircraft can impact the CG. The aircraft provided for herein significantly limit the size of the fuel tanks of the aircraft to better manage its impact on the net CG of the aircraft. While typical cargo planes utilize almost an entirety of available volume in a wingspan to house fuel, the aircraft provided for herein use a small faction, e.g., about 10% or less, of the available volume in the wingspan to house fuel.

CG is also better managed in view of the present disclosures by accounting for rotation of a payload when loading it onto the aircraft. As described herein, the payload can rotate when it is being loaded onto aircraft. While traditionally CG calculations performed when loading an aircraft are based solely on a moment arm and mass of the payload, the present disclosure accounts for a rotation of the CG as well. By accounting for this rotation, a more accurate determination of the payload CG is achieved, thus allowing for more consistent, accurate, and useful placement of the payload CG with respect to the aircraft CG.

As a result of the present disclosures, large cargo not previously transported by air can be achieved. For example, the present disclosures provide for methods of loading a cargo airplane with one or more wind turbine parts, such as blades, and flying those parts to a desired location. This opens possibilities for being able to quickly and efficiently build wind farms at many different locations, as speed of transport and accessibility of locations to build are opened up by virtue of transporting wind turbine parts, such as blades, by air.

One exemplary embodiment method of loading one or more blades of one or more wind turbines onto a cargo aircraft includes passing a package that includes one or more blades of one or more wind turbines into an interior cargo bay defined by a fuselage of a cargo aircraft, and securing the package at a location within the interior cargo bay such that a center of gravity of the package is located proximate to a center of gravity of the cargo aircraft. Located proximate to a center of gravity of the cargo aircraft can include, for example, being located within about 25%+/− about 5% mean aerodynamic chord (MAC) of the cargo aircraft.

Passing the package into the interior cargo bay can include passing the package through an opening formed in a forward end of the cargo aircraft. This can be the result of a cargo nose door being opened with respect to a main section of the fuselage. In some embodiments, passing the package into the interior cargo bay can include sliding the package along one or more rails disposed in the interior cargo bay to reach the location at which the package is to be secured. The one or more rails can extend from a forward end to an aft end of the cargo aircraft. At least one such rail can include a kinked portion such that a vertical distance between at least a portion of the at least one rail aft of the kinked portion and a plane defined by an interior bottom contact surface of the interior cargo bay in the forward end of the cargo aircraft that is substantially parallel to a centerline of the forward end of the cargo aircraft is greater than a vertical distance between at least a portion of the at least one rail forward of the kinked portion and the plane defined by the interior bottom contact surface of the interior cargo bay in the forward end of the cargo aircraft. Accordingly, the action of sliding the package can include sliding the package along at least a portion of the rail(s) that is aft of the kinked portion. The rail(s) can extend continuously along an interior bottom surface of the cargo bay from the forward end to the aft end of the cargo aircraft, and thus the sliding of the package can include sliding it along at least a portion of the rail(s) that is disposed in the aft end of the aircraft. The rail(s) can serve as a primary structural beam(s) of the cargo aircraft.

The method can further include packaging the blade(s) to form the package. The package can have substantially the same center of gravity of the package each time a new blade(s) is packaged having substantially the same configuration as the originally packaged blade(s). Packaging can include, for example, coupling a plurality of payload-receiving fixtures to each blade of the one or more blades. The plurality of payload-receiving fixtures can secure a location for each such blade with respect to each payload-receiving fixture of the plurality of payload-receiving fixtures in which the respective blade is received and with respect to each other blade of the one or more blades. In some embodiments, coupling the plurality of payload-receiving fixtures to the one or more blades can further include, for at least one payload-receiving fixture of the plurality of payload-receiving fixtures, coupling together a plurality of pieces that form the at least one payload-receiving fixture to couple the at least one payload-receiving fixture to each blade of the one or more blades.

The method can also include selecting each payload-receiving fixture of the plurality of payload-receiving fixtures that is coupled to each blade of the one or more blades based on a pre-designation for that payload-receiving fixture. The pre-designation can designate at least one of a type of package in which each payload-receiving fixture is configured to be used or one or more locations along each blade of the one or more blades that payload-receiving fixture is configured to be used. The type of package can include, for example, various configurations of the one or more blades that depend, at least in part, on at least one of dimensions of the one or more blades and/or shape of the one or more blades.

Still further, the method can include positioning the package at the location using one or more pre-formed markings in the interior cargo bay. The one or more pre-formed markings can be located such that the marking(s) designate the location for the package at which the center of gravity of the package is located proximate to a center of gravity of the cargo aircraft. The one or more pre-formed markings can include, by way of non-limiting example, a plurality of pre-designated package markings that include at least one pre-formed marking for each type of package that the interior cargo bay is configured to receive.

The action of securing the package at a location within the interior cargo bay such that a center of gravity of the package is proximate to a center of gravity of the cargo aircraft can include placing one or more ballasts in the interior cargo bay to cause the center of gravity of the package to be located proximate to a center of gravity of the cargo aircraft.

The method can also include calculating the location within the interior cargo bay at which the center of gravity of the package is located proximate to a center of gravity of the cargo aircraft. The calculating action can be based, at least in part, on each of one or more moments of the package, a mass of the package, and an amount of rotation of the package that results from a distal terminal end of the package being raised in an aft end of the interior cargo bay as the package is passed into the interior cargo bay to the location. The amount of rotation of the package can be based on an angle formed between an aft portion of the interior cargo bay and a forward portion of the interior cargo bay.

The one or more blades can include at least two wind turbine blades, at least three wind turbine blades, or at least four wind turbine blades. Other amounts, including but not limited to five, six, seven, or eight, are also possible. More generally, the package can be an irregular package in which a center of gravity of the irregular package is located at a separate location than a geometric centroid of the irregular package. Additional details regarding what constitutes an irregular package is provided below. The irregular package can be configured to have a compact volume. The blade(s) can have a length of at least about 57 meters, or at least about 65 meters, or at least about 75 meters, or at least about 85 meters, or at least about 100 meters, or at least about 120 meters, among other possible lengths.

One exemplary method of determining a center of gravity for a payload to be disposed in a cargo aircraft includes calculating one or more moments of a payload, determining a mass of the payload, and accounting for an amount of anticipated rotation of the package based on a bend angle formed between a centerline of an aft portion of a cargo bay of a cargo aircraft and a centerline of a forward portion of the cargo bay of the cargo aircraft. The aft portion and the forward portion are connected by a kinked portion of the cargo bay that defines the bend angle.

Accounting for an amount of anticipated rotation of the package based on the bend angle can include determining an angle between an approximate centerline of the payload and the centerline of the forward portion of the cargo bay based on a location of a proximal terminal end of the payload.

The method can be performed in conjunction with a payload having a length of at least about 57 meters, of at least about 65 meters, of at least about 75 meters, of at least about 85 meters, of at least about 100 meters, or of at least about 120 meters, among other possible payload lengths. The payload can include an irregular payload in which a center of gravity of the irregular payload is located at a separate location than a geometric centroid of the irregular payload. Additional details regarding what constitutes an irregular payload is provided below. The irregular package can be configured to have a compact volume. The payload can include one or more blades of a wind turbine. This can include, one blade, at least two blades, at least three blades, or at least four blades. Additional blades, including but not limited to five, six, seven, or eight can also be used in conjunction with these methods.

The payload can include a plurality of payload-receiving fixtures. The payload-receiving fixtures can be configured to secure a location of one or more structures within it. For example, the payload can include one or more blades of a wind turbine, and thus the one or more structures can include one or more blades of a wind turbine.

One exemplary embodiment of a cargo aircraft includes a fuselage, first and second fixed wings, and first and second fuel tanks. The fuselage defines a forward end, an aft end, and an interior cargo bay that spans a majority of a length of the fuselage from the forward end to the aft end. A first fixed wing extends from the fuselage in a first direction away from the fuselage, and a second fixed wing extends from the fuselage in a second direction away from the fuselage. The second direction is approximately symmetric about a longitudinal-vertical center plane of the cargo aircraft. The first fuel tank is disposed within the first fixed wing and the second fuel tank is disposed within the second fixed wing. More particularly, the first fuel tank extends longitudinally towards the aft end such that it terminates a first significant distance away from a first aft spar of the first fixed wing, and the second fuel tank likewise extends longitudinally towards the aft end such that it terminates a second significant distance away from a second aft spar of the second fixed wing. The interior cargo bay is configured to have a payload disposed in it that has a length of at least about 57 meters. In other embodiments, a payload length the interior cargo bay can be configured to have disposed in it can be at least about 65 meters, at least about 75 meters, at least about 85 meters, at least about 100 meters, or at least about 120 meters, among other possible lengths.

In some embodiments, the aircraft can include at least one wing-mounted engine coupled to the first fixed wing and at least one wing-mounted engine coupled to the second fixed wing. In such embodiments, the first fuel tank can be disposed within a volume of the first fixed wing such that it does not extend laterally beyond the at least one wing-mounted engine coupled to the first fixed wing, and the second fuel tank can be similarly disposed within a volume of the second fixed wing such that it does extend laterally beyond the at least one wing-mounted engine coupled to the second fixed wing. In at least some such embodiments, at least one of the first and second fuel tanks may not extend beyond a wing-mounted engine of the at least one wing-mounted engine that is furthest from the fuselage along the respective first or second fixed wing to which it is coupled. Alternatively, or additionally, the aircraft can include at least one engine mounted to the fuselage.

A center of gravity of the first fuel tank can be located within a lateral half of the first fixed wing disposed closest to the fuselage. Likewise, a center of gravity of the second fuel tank can be located within a lateral half of the second fixed wing disposed closest to the fuselage The aforementioned first significant distance can be such that a first longitudinal tank distance the first fuel tank extends longitudinally towards the aft end is less than a first longitudinal open distance between a first longitudinal terminal end of the first fuel tank and the first aft spar as measured from a location at which the first fuel tank is disposed closest to a centerline of the fuselage. Likewise, the aforementioned second significant distance can be such that a second longitudinal tank distance the second fuel tank extends longitudinally towards the aft end is less than a second longitudinal open distance between a second longitudinal terminal end of the first fuel tank and the second aft spar as measured from a location at which the second fuel tank is disposed closest to a centerline of the fuselage.

A combined fuel tank volume of a volume of the first fuel tank and a volume of the second fuel tank can be approximately 20 percent or less than a combined available fuel volume of an available fuel volume of the first fixed wing and an available fuel volume of the second fixed wing. In other non-limiting embodiments this value can be approximately 15 percent or less or approximately 10 percent or less.

In some embodiments the aircraft can include one or more rails disposed in the interior cargo bay. The rail(s) can extend from the forward end to the aft end of the cargo aircraft, and can be configured to receive the payload such that the payload is translated along the rail(s) to dispose it a desired location within the cargo bay. The desired location can be a location at which a center of gravity of the payload is located proximate to a center of gravity of the cargo aircraft. The rail(s) can include a kinked portion such that a vertical distance between at least a portion of the at least one rail aft of the kinked portion and a plane defined by an interior bottom contact surface of the interior cargo bay in the forward end of the cargo aircraft that is substantially parallel to a centerline of the forward end of the cargo aircraft can be greater than a vertical distance between at least a portion of the at least one rail forward of the kinked portion and the plane defined by the interior bottom contact surface of the interior cargo bay in the forward end of the cargo aircraft. The rail(s) can extend continuously along an interior bottom contact surface of the cargo bay from the forward end of the cargo aircraft to the aft end of the cargo aircraft. In some embodiments, the rails(s) can serve as a primary structural beam(s) of the cargo aircraft.

The aircraft can also include a cargo nose door configured to open a portion of the forward end of the cargo aircraft to load the payload into the cargo bay through an opening exposed by opening the cargo nose door. In some embodiments, the aircraft can include one or more designated markers in the interior cargo bay. The designated marker(s) can be indicative of a location where a payload is to be placed such that a center of gravity of the payload is located proximate to a center of gravity of the cargo aircraft. More particularly, located proximate to a center of gravity of the cargo aircraft can include being located within about 25%+/− about 5% MAC of the cargo aircraft.

The interior cargo bay can include a forward pay portion located in the forward end of the cargo aircraft, an aft bay portion located in the aft end of the cargo aircraft, and a kinked bay portion disposed between the forward bay portion and the aft bay portion. The kinked bay portion can define a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft. In some such embodiments, the aft end of the aft bay portion can extend above an upper outer surface of the forward end of the fuselage in which the forward bay portion is disposed. Alternatively, or additionally, a majority of a centerline extending through the aft bay portion can form an angle with a centerline extending through the forward bay portion.

The interior cargo bay can include one or more pre-formed markings formed in it, with the marking(s) being located such that the marking(s) designate a desired location at which a particular payload is located proximate to a center of gravity of the cargo aircraft. The pre-formed marking(s) can include a plurality of pre-designated payload markings, the plurality of pre-designated payload markings including at least one pre-formed marking for each type of payload that the interior cargo bay is configured to receive.

In some embodiments, the first and second fixed wings can define approximately no sweep angle. In other embodiments, they can define a sweep angle. The interior cargo bay can be configured to receive an irregular payload in which a center of gravity of the irregular payload is located at a separate location than a geometric centroid of the irregular payload. Additional details regarding what constitutes an irregular package is provided below. The irregular package can be configured to have a compact volume. The interior cargo bay can be configured to have one or more blades of a wind turbine disposed in it.

BRIEF DESCRIPTION OF DRAWINGS

This disclosure will be more fully understood from the following detailed description taken in conjunction with the accompanying drawings, in which:

FIG. 13B is a side, transparent view of the fuselage and payload of FIG. 13A;

FIG. 13C is a top, transparent view of the fuselage and payload of FIG. 13B;

DETAILED DESCRIPTION

Figure 1A:
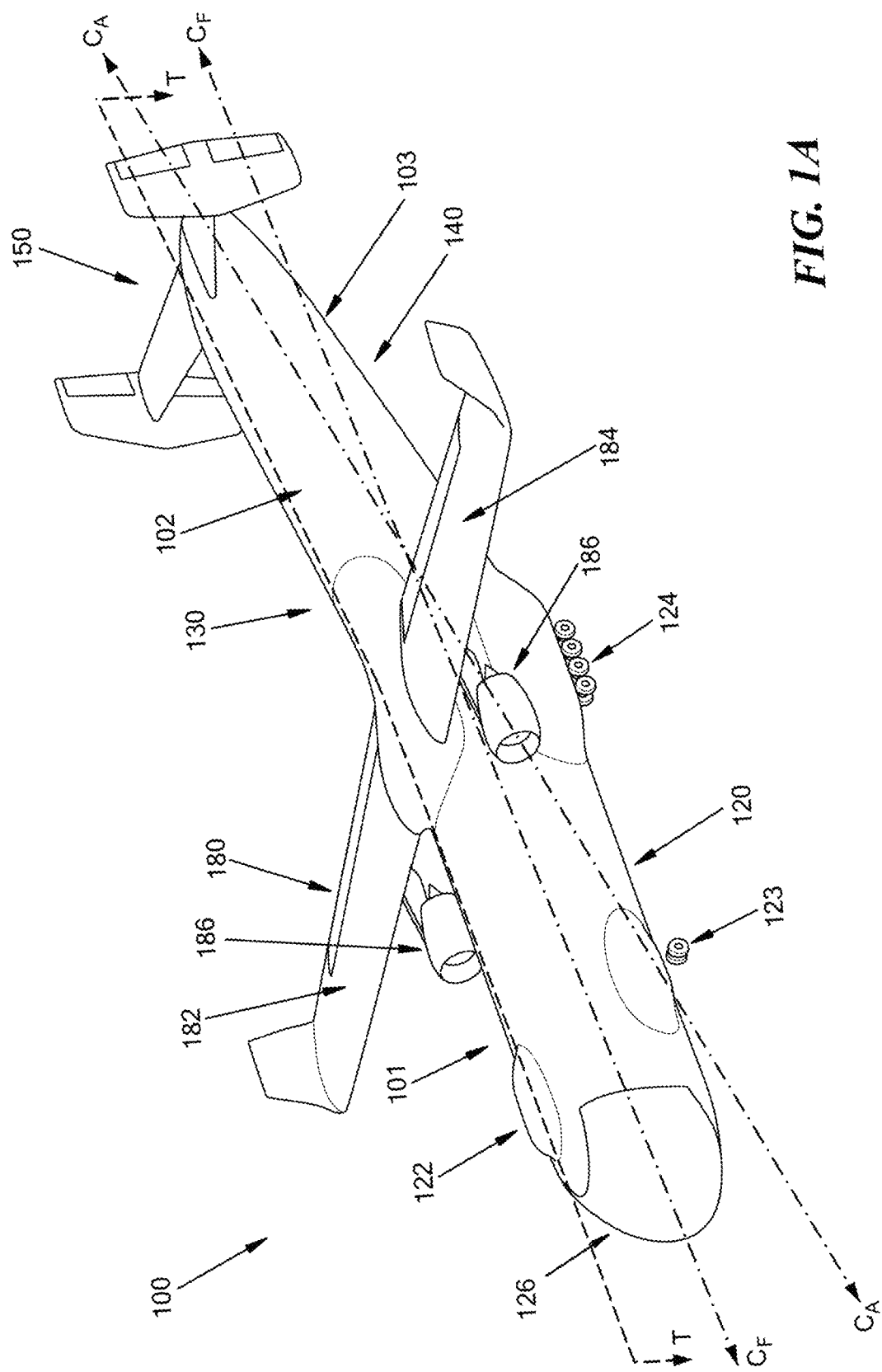
FIG. 1A is an isometric view of one exemplary embodiment of an aircraft.

Certain exemplary embodiments will now be described to provide an overall understanding of the principles of the structure, function, manufacture, and use of the devices, systems, aircraft, and methods disclosed herein. One or more examples of these embodiments are illustrated in the accompanying drawings. Those skilled in the art will understand that the devices, systems, aircraft, components related to or otherwise part of such devices, systems, and aircraft, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Some of the embodiments provided for herein may be schematic drawings, including possibly some that are not labeled as such but will be understood by a person skilled in the art to be schematic in nature. They may not to be scale or may be somewhat crude renderings of the disclosed components. A person skilled in the art will understand how to implement these teachings and incorporate them into work systems, methods, aircraft, and components related to each of the same, provided for herein.

To the extent the present disclosure includes various terms for components and/or processes of the disclosed devices, systems, aircraft, methods, and the like, one skilled in the art, in view of the claims, present disclosure, and knowledge of the skilled person, will understand such terms are merely examples of such components and/or processes, and other components, designs, processes, and/or actions are possible. By way of non-limiting example, while the present application describes loading an airplane through a front end of the aircraft, alternatively, or additionally, loading can occur through an aft end of the aircraft and/or from above and/or below the aircraft. In the present disclosure, like-numbered and like-lettered components of various embodiments generally have similar features when those components are of a similar nature and/or serve a similar purpose. To the extent terms such as front, back, top, bottom, forward, aft, proximal, distal, etc. are used to describe a location of various components of the various disclosures, such usage is by no means limiting, and is often used for convenience when describing various possible configurations. The foregoing notwithstanding, a person skilled in the art will recognize the common vernacular used with respect to aircraft, such as the terms "forward' and "aft," and will give terms of those nature their commonly understood meaning. Further in some instances, terms like forward and proximal or aft and distal may be used in a similar fashion.

The present application is directed to the management of center of gravity (CG) through various systems, methods, and aircraft. In view of the present disclosures, large payloads can be quickly and repeatedly loaded onto cargo aircraft for fast and efficient shipping to most any location where an aircraft can be flown. As described herein, this can include wind turbines, including their blades, among other large structures. The management of CG occurs in a variety of ways. In some instances, the management of the CG occurs by controlling the location of fuel within the cargo aircraft. In other instances, the management occurs by accounting for rotation of payloads as they are loaded onto the cargo aircraft. Various features of the aircraft help to allow for the management of the cargo aircraft. These various aspects of CG management will be understood after describing an exemplary embodiment of an aircraft that is designed for usage with large cargo, like wind turbine blades.

Aircraft

Figure 1B:
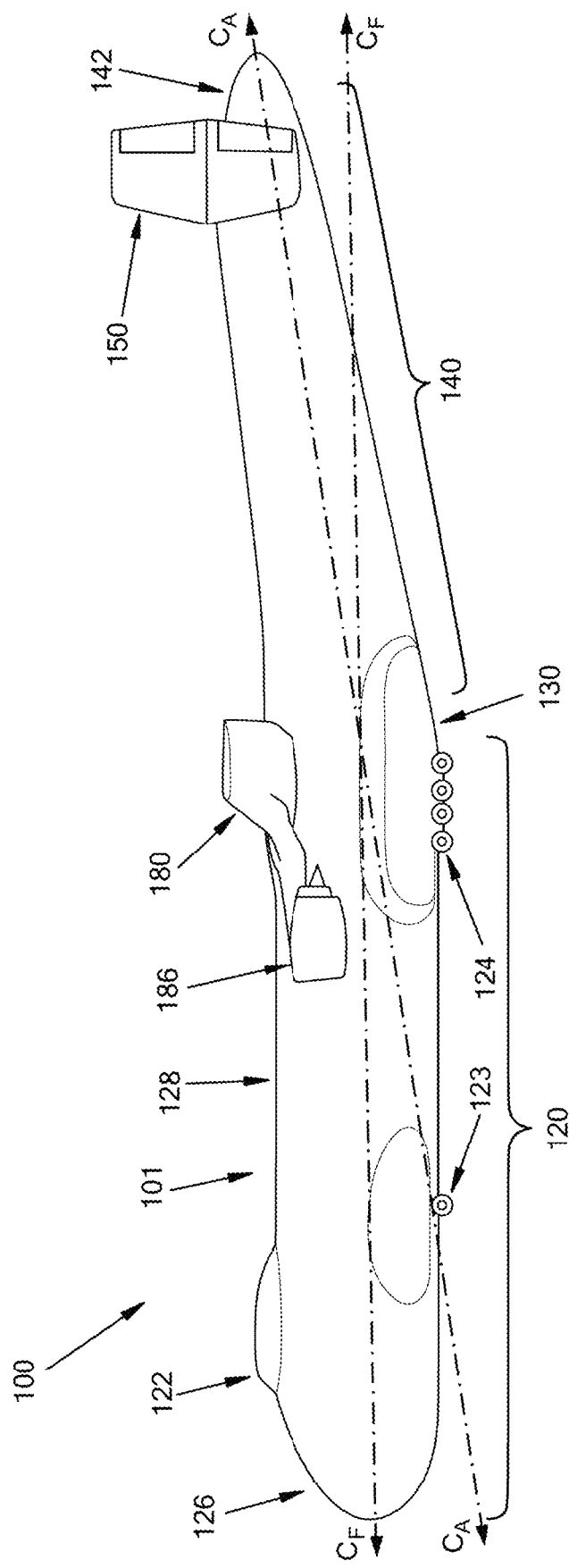
FIG. 1B is a side view of the aircraft of FIG. 1A.
Figure 11A:
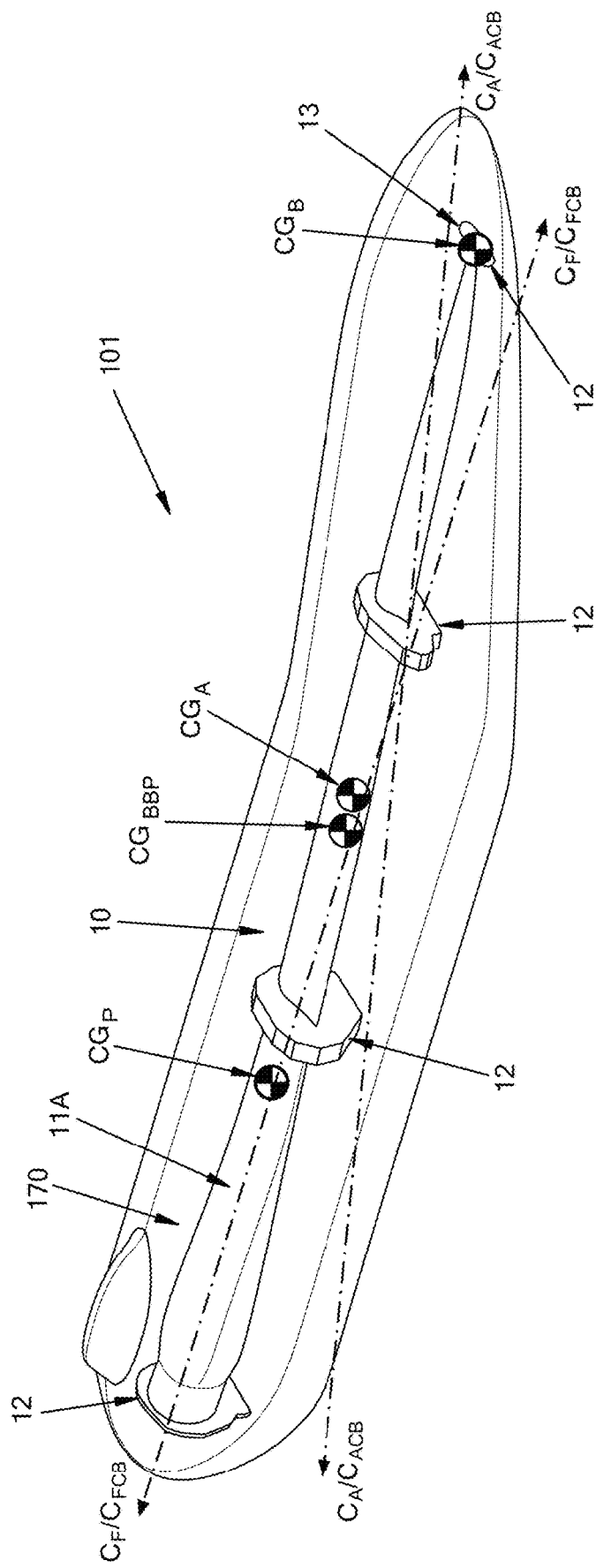
FIG. 11A is an isometric, transparent view of a fuselage of the aircraft of FIG. 1A having a payload that includes one wind turbine blade and a ballast disposed therein.
Figure 11B:
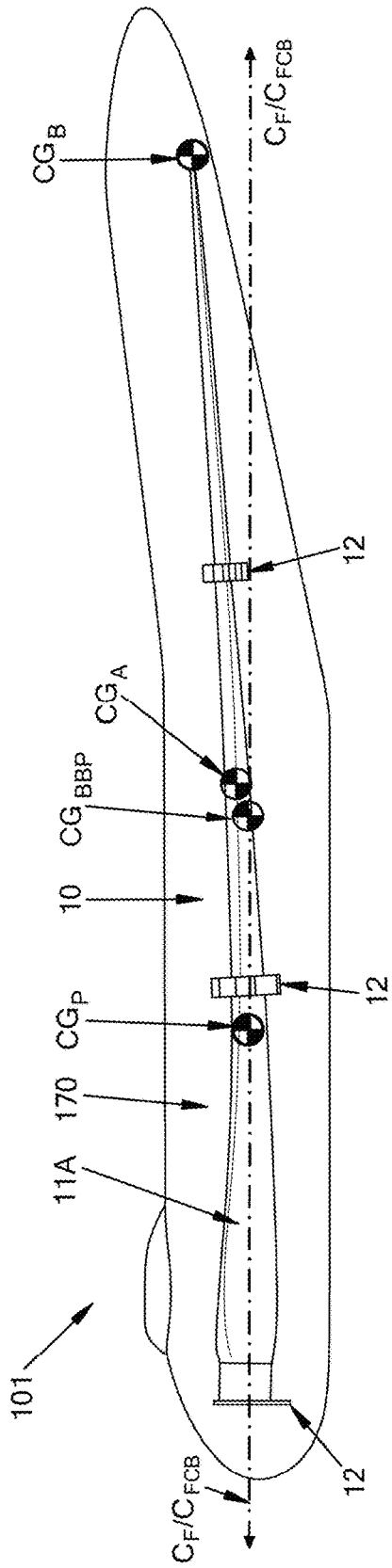
FIG. 11B is a side, transparent view of the fuselage, payload, and ballast of FIG. 11A.

The focus of the present disclosures is described with respect to a large aircraft 100, such as an airplane, illustrated in FIGS. 1A and 1B, along with the loading of a large payload into the aircraft, illustrated at least in FIGS. 2A-2D, 5B, 6A, and 16. Additional details about the aircraft and payload may be described with respect to the other figures of the present disclosure as well. In most illustrated embodiments, a payload 10 is a combination of two wind turbine blades 11A and 11B (FIGS. 2B-2D), although a person skilled in the art will appreciate that other payloads are possible (e.g., the payload 10 in FIGS. 11A and 11B is illustrated as a single wind turbine blade and includes a ballast). Such payloads can include other numbers of wind turbine blades (e.g., one, three, four, five, etc., or segments of a single even larger blade), other components of wind turbines (e.g., tower segments, generator, nacelle, gear box, hub, power cables, etc.), or many other large structures and objects whether related to wind turbines or not. The present application can be used in conjunction with most any large payload—large for the present purposes being at least about 57 meters long, or at least about 60 meters long, or at least about 65 meters long, or at least about 75 meters long, or at least about 85 meters long, or at least about 90 meters long, or at least about 100 meters long, or at least about 110 meters long, or at least about 120 meters long—or for smaller payloads if desired. Some non-limiting examples of large payloads that can be used in conjunction with the present disclosures beyond wind turbines include but are not limited to industrial oil equipment, mining equipment, rockets, military equipment and vehicles, defense hardware, commercial aerospace vehicles, crane segments, aircraft components, space launch rocket boosters, helicopters, generators, or hyperloop tubes. In other words, the aircraft 100 can be used with most any size and shape payload, but has particular utility when it comes to large, often heavy, payloads.

As shown, the aircraft 100, and thus its fuselage 101, includes a forward end 120 and an aft end 140, with a kinked portion 130 connecting the forward end 120 to the aft end 140. The forward end 120 is generally considered any portion of the aircraft 100, and related components, that are forward of the kinked portion 130 and the aft end 140 is considered any portion of the aircraft 100, and related components, that are aft of the kinked portion 130. The kinked portion 130, as described in greater detail below, is a section of the aircraft 130 in which both a top-most outer surface 102 and a bottom-most outer surface 103 of the fuselage 101 become angled (notably, the placement of reference numerals 102 and 103 in the figures do not illustrate location of the "kink" since they more generally refer to the top-most and bottom-most surfaces of the fuselage 101), as illustrated by an aft centerline $C_A$ of the aft end 140 of the fuselage 101 with respect to a forward centerline $C_F$ of the forward end 120 of the fuselage 101.

The forward end 120 can include a cockpit or flight deck 122, and landing gears, as shown a forward or nose landing gear 123 and a rear or main landing gear 124. The illustrated embodiment does not show various components used to couple the landing gears 123, 124 to the fuselage 101, or operate the landing gears (e.g., actuators, braces, shafts, pins, trunnions, pistons, cylinders, braking assemblies, etc.), but a person skilled in the art will appreciate how the landing gears 123, 124 are so connected and operable in conjunction with the aircraft 100. The forward-most end of the forward end 120 includes a nose cone 126. As illustrated more clearly in FIG. 2A, the nose cone 126 is functional as a door, optionally being referred to the nose cone door, thus allowing access to an interior cargo bay 170 defined by the fuselage 101 via a cargo opening 171 exposed by moving the nose cone door 126 into an open or loading position (the position illustrated in FIG. 2A; FIGS. 1A and 1B illustrate the nose cone door 126 in a closed or transport position). The door may operate by rotating vertically tip-upwards about a lateral axis, or by rotating horizontally tip-outboards about a vertical axis, or by other means as well such as translation forwards then in other directions, or by paired rotation and translation, or other means.

As described in greater detail below, the interior cargo bay 170 is continuous throughout the length of the aircraft 101, i.e., it spans a majority of the length of the fuselage. The continuous length of the interior cargo bay 170 includes the space defined by the fuselage 101 in the forward end 120, the aft end 140, and the kinked portion 130 disposed therebetween, such spaces being considered corresponding to the forward bay, aft bay, and kinked bay portions of the interior cargo bay 170. The interior cargo bay 170 can thus include the volume defined by nose cone 126 when it is closed, as well as the volume defined proximate to a fuselage tail cone 142 located at the aft end 140. In the illustrated embodiment of FIG. 2A, the nose cone door 126 is hinged at a top such that it swings clockwise towards the fuselage cockpit 122 and a fixed portion or main section 128 of the fuselage 101. In other embodiments, a nose cone door can swing in other manners, such as being hinged on a left or right side to swing clockwise or counter-clockwise towards the fixed portion 128 of the fuselage. The fixed portion 128 of the forwards fuselage 101 is the portion that is not the nose cone 126, and thus the forwards fuselage 101 is a combination of the fixed portion 128 and the nose cone 126. Alternatively, or additionally, the interior cargo bay 170 can be accessed through other means of access known to those skilled in the art, including but not limited to a hatch, door, and/or ramp located in the aft end 140 of the fuselage 101, hoisting cargo into the interior cargo bay 170 from below, and/or lowering cargo into the interior cargo bay 170 from above. One advantage provided by the illustrated configuration, at least as it relates to some aspects of loading large payloads, is that by not including an aft door, the interior cargo bay 170 can be continuous, making it significantly easier to stow cargo in the aft end 140 all the way into the fuselage tail cone 142. While loading through an aft door is possible with the present disclosures, doing so would make loading into and use of the interior cargo bay 170 space in the aft end 140 all the way into the fuselage tail cone 142 much more challenging and difficult to accomplish—a limitation faced in existing cargo aircraft configurations. Existing large cargo aircraft are typically unable to add cargo in this way (e.g., upwards and aftwards) because any kink present in their aft fuselage is specifically to create more vertical space for an aft door to allow large cargo into the forwards portion of the aircraft.

A floor 172 can be located in the interior cargo bay 170, and can also extend in a continuous manner, much like the bay 170 itself, from the forward end 120, through the kinked portion 130, and into the aft end 140. The floor 172 can thus be configured to have a forward end 172$f$, a kinked portion 172$k$, and an aft end 172$a$. In some embodiments, the floor 172 can be configured in a manner akin to most floors of cargo bays known in the art. In some other embodiments, discussed in greater detail below, one or more rails can be disposed in the interior cargo bay 170 and can be used to assist in loading a payload, such as the payload 10, into the interior cargo bay 170 and/or used to help secure the location of a payload once it is desirably positioned within the interior cargo bay 170. Additional fixtures and tooling designed to be used in conjunction with such rails are also discussed below at least with respect to FIGS. 6A-7.

Opening the nose cone 126 not only exposes the cargo opening 171 and the floor 172, but it also provides access from an outside environment to a cantilevered tongue 160 that extends from or otherwise defines a forward-most portion of the fixed portion 128 of the fuselage 101. The cantilevered tongue can be an extension of the floor 172, or it can be its own feature that extends from below or above the floor 172 and associated bottom portion of the fuselage 101. The cantilevered tongue 160 can be used to support a payload, thus allowing the payload to extend into the volume of the interior cargo bay 170 defined by the nose cone 126.

A wingspan 180 can extend substantially laterally in both directions from the fuselage. The wingspan 180 includes both a first fixed wing 182 and a second fixed wing 184, the wings 182, 184 extending substantially perpendicular to the fuselage 101 in respective first and second directions which are approximately symmetric about a longitudinal-vertical plane away from the fuselage 101, and more particularly extending substantially perpendicular to the centerline $C_F$. Wings 182, 184 being indicated as extending from the fuselage 101 do not necessarily extend directly away from the fuselage 101, i.e., they do not have to be in direct contact with the fuselage 101. Further, the opposite directions the wings 182, 184 extend from each other can alternatively be described as the second wing 184 extending approximately symmetrically away from the first wing 182. As shown, the wings 182, 184 define approximately no sweep angle and no dihedral angle. In alternative embodiments, a sweep angle can be included in the tip-forwards (−) or tip-aftwards (+) direction, the angle being approximately in the range of about −40 degrees to about +60 degrees. In other alternative embodiments, a dihedral angle can be included in the tip-downwards (negative, or "anhedral") or tip-upwards (positive, or "dihedral") direction, the angle being approximately in the range of about −5 degrees to about +5 degrees. Other typical components of wings, including but not limited to slats for increasing lift, flaps for increasing lift and drag, ailerons for changing roll, spoilers for changing lift, drag, and roll, and winglets for decreasing drag can be provided, some of which a person skilled in the art will recognize are illustrated in the illustrations of the aircraft 100 (other parts of wings, or the aircraft 100 more generally, not specifically mentioned in this detailed description are also illustrated and recognizable by those skilled in the art). Engines, engine nacelles, and engine pylons 186 can also be provided. In the illustrated embodiment, two engines 186, one mounted to each wing 182, 184 are provided. Additional engines can be provided, such as four or six, and other locations for engines are possible, such as being mounted to the fuselage 101 rather than the wings 182, 184.

The kinked portion 130 provides for an upward transition between the forward end 120 and the aft end 140. The kinked portion 130 includes a kink, i.e., a bend, in the fixed portion 128 of the fuselage 101 such that both the top-most outer surface 102 and the bottom-most outer surface 103 of the fuselage 101 become angled with respect to the centerline $C_F$ of the forward end 120 of the aircraft 100, i.e., both surfaces 102, 103 include the upward transition provided for by the kinked portion 130. As shown at least in FIG. 1B, the aft-most end of the aft end 140 can raise entirely above the centerline $C_F$. In the illustrated embodiment, the angle defined by the bottom-most outer surface 103 and the centerline $C_F$ is larger than an angle defined by the top-most outer surface 102 and the centerline $C_F$, although other configurations may be possible. Notably, although the present disclosure generally describes the portions associated with the aft end 140 as being "aft," in some instances they may be referred to as part of a "kinked portion" or the like because the entirety of the aft end 140 is angled as a result of the kinked portion 130. Thus, references herein, including in the claims, to a kinked portion, a kinked cargo bay or cargo bay portion, a kinked cargo centerline, etc. will be understood by a person skilled in the art, in view of the present disclosures, to be referring to the aft end 140 of the aircraft 100 (or the aft end in other aircraft embodiments) in some instances.

Despite the angled nature of the aft end 140, the aft end 140 is well-suited to receive cargo therein. In fact, the aircraft 100 is specifically designed in a manner that allows for the volume defined by the aft end 140, up to almost the very aft-most tip of the aft end 140, i.e., the fuselage tail cone 142, can be used to receive cargo as part of the continuous interior cargo bay 170. Proximate to the fuselage tail cone 142 can be an empennage 150, which can include horizontal stabilizers for providing longitudinal stability, elevators for controlling pitch, vertical stabilizers for providing lateral-directional stability, and rudders for controlling yaw, among other typical empennage components that may or may not be illustrated but would be recognized by a person skilled in the art.

The aircraft 100 is particularly well-suited for large payloads because of a variety of features, including its size. A length from the forward-most tip of the nose cone 126 to the aft-most tip of the fuselage tail cone 142 can be approximately in the range of about 60 meters to about 150 meters. Some non-limiting lengths of the aircraft 100 can include about 80 meters, about 84 meters, about 90 meters, about 95 meters, about 100 meters, about 105 meters, about 107 meters, about 110 meters, about 115 meters, or about 120 meters. Shorter and longer lengths are possible. A volume of the interior cargo bay 170, inclusive of the volume defined by the nose cone 126 and the volume defined in the fuselage tail cone 142, both of which can be used to stow cargo, can be approximately in the range of about 1200 cubic meters to about 12,000 cubic meters, the volume being dependent at least on the length of the aircraft 100 and an approximate diameter of the fuselage (which can change across the length). One non-limiting volume of the interior cargo bay 170 can be about 6850 cubic meters. Not accounting for the very terminal ends of the interior cargo bay 170 where diameters get smaller at the terminal ends of the fuselage 101, diameters across the length of the fuselage, as measured from an interior thereof (thus defining the volume of the cargo bay) can be approximately in the range of about 4.3 meters to about 13 meters, or about 8 meters to 11 meters. One non-limiting diameter of the fuselage 101 proximate to its midpoint can be about 9 meters. The wingspan, from tip of the wing 132 to the tip of the wing 134, can be approximately in the range of about 60 meters to 110 meters, or about 70 meters to about 100 meters. One non-limiting length of the wingspan 180 can be about 80 meters. A person skilled in the art will recognize these sizes and dimensions are based on a variety of factors, including but not limited to the size and mass of the cargo to be transported, the various sizes and shapes of the components of the aircraft 100, and the intended use of the aircraft, and thus they are by no means limiting. Nevertheless, the large sizes that the present disclosure both provides the benefit of being able to transport large payloads, but faces challenges due, at least in part, to its size that make creating such a large aircraft challenging. The engineering involved is not merely making a plane larger. As a result, many innovations tied to the aircraft 100 provided for herein, and in other counterpart patent applications, are the result of very specific design solutions arrived at by way of engineering.

Materials typically used for making fuselages can be suitable for use in the present aircraft 100. These materials include, but are not limited to, metals and metal alloys (e.g., aluminum alloys), composites (e.g., carbon fiber-epoxy composites), and laminates (e.g., fiber-metallic laminates), among other materials, including combinations thereof.

Figure 2A:
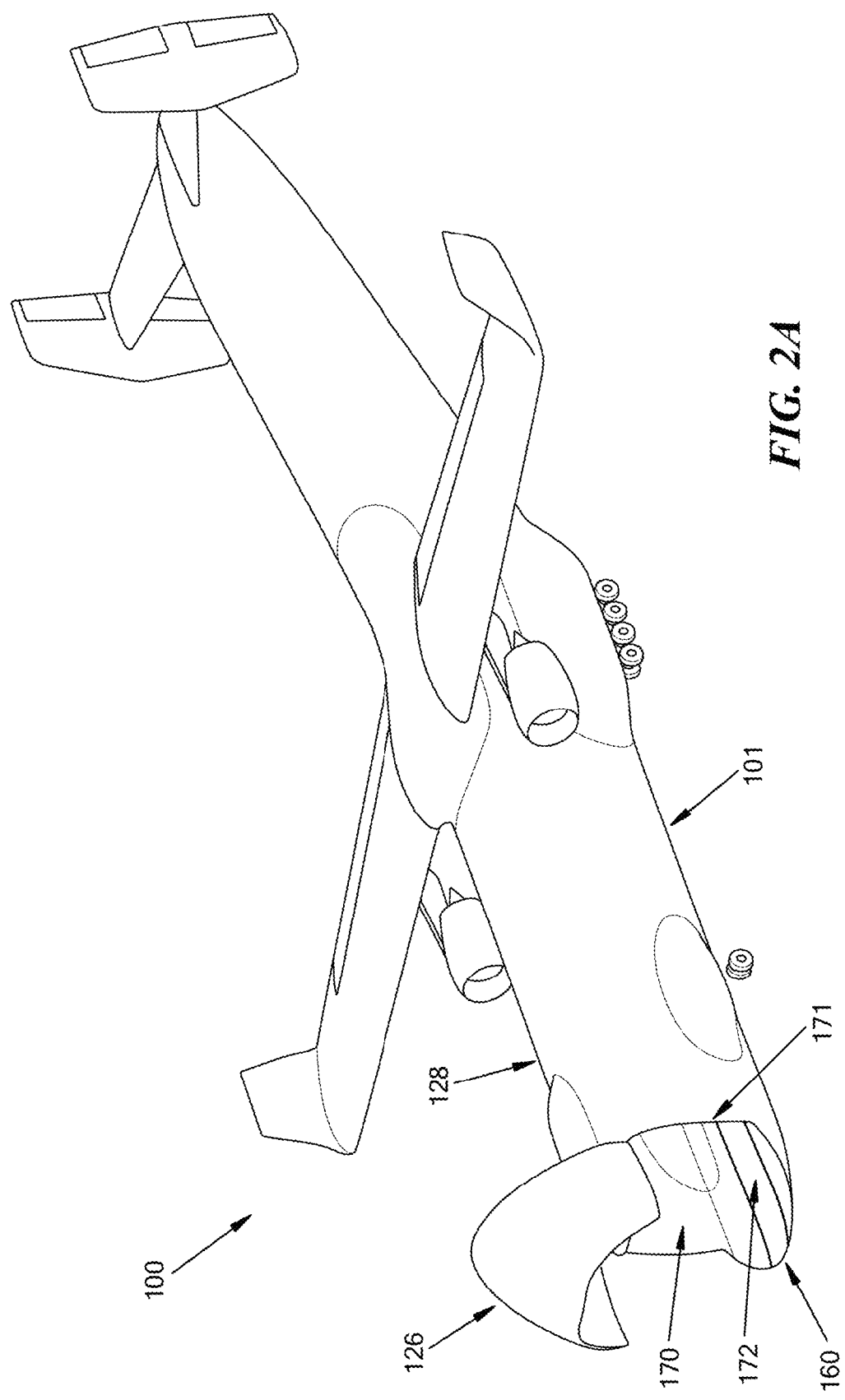
FIG. 2A is an isometric view of the aircraft of FIG. 1A with a nose cone door in an open position to provide access to an interior cargo bay of the aircraft.
Figure 2B:
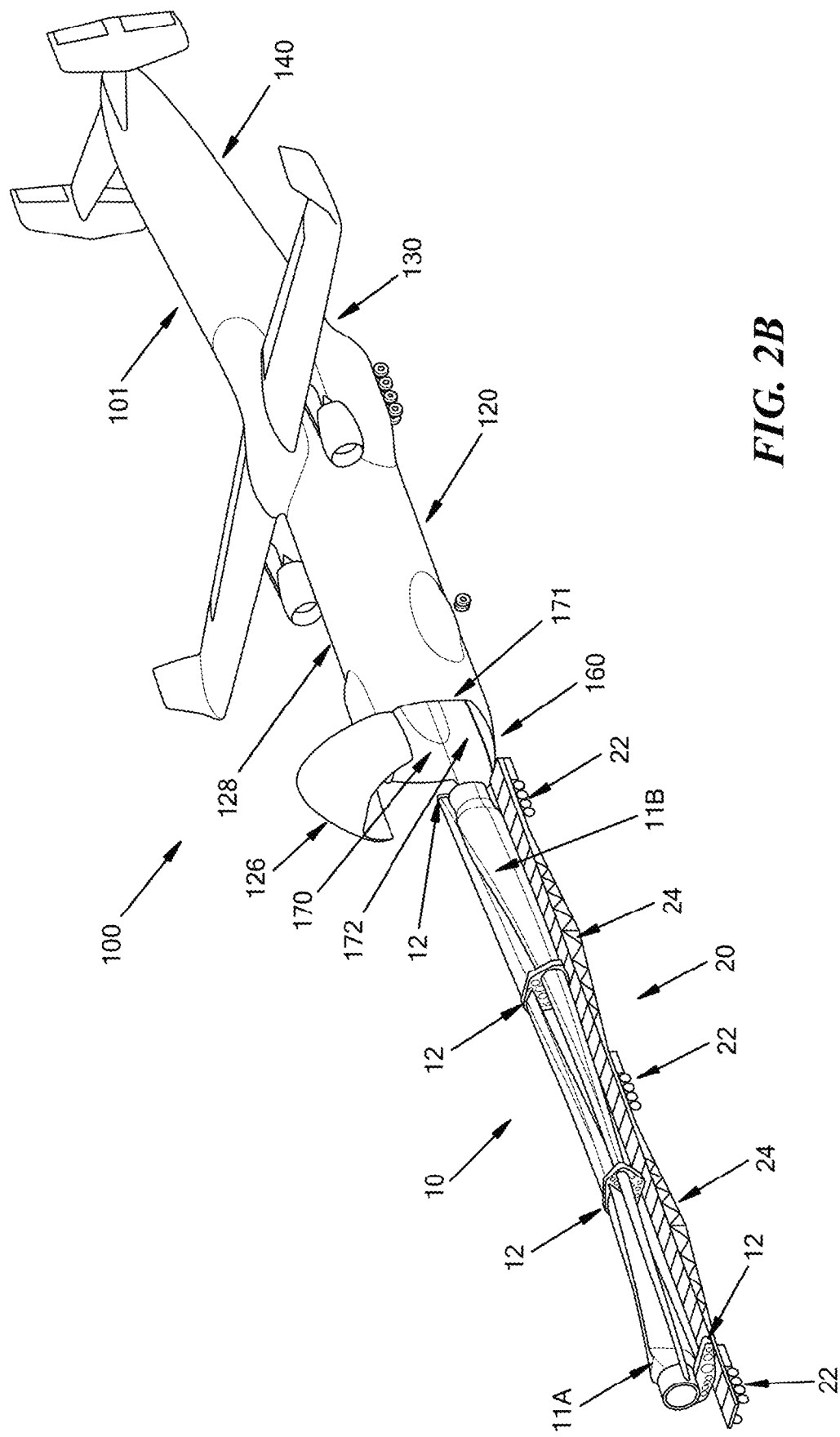
FIG. 2B is an isometric view of the aircraft of FIG. 2A with a payload being disposed proximate to the aircraft for loading into the interior cargo bay.
Figure 2C:
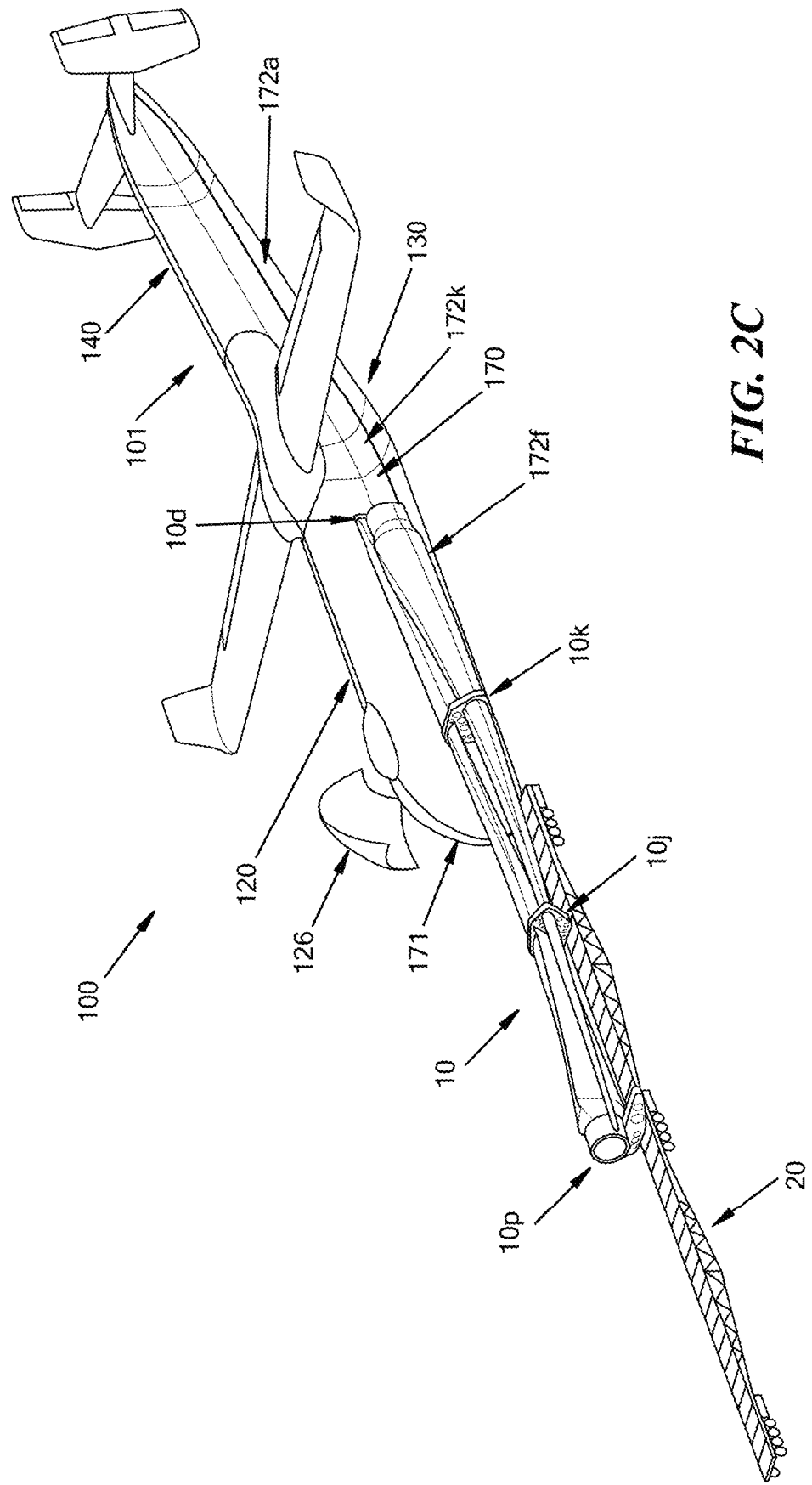
FIG. 2C is an isometric, partial cross-sectional view of the aircraft of FIG. 2B with the payload being partially loaded into the interior cargo bay.
Figure 2D:
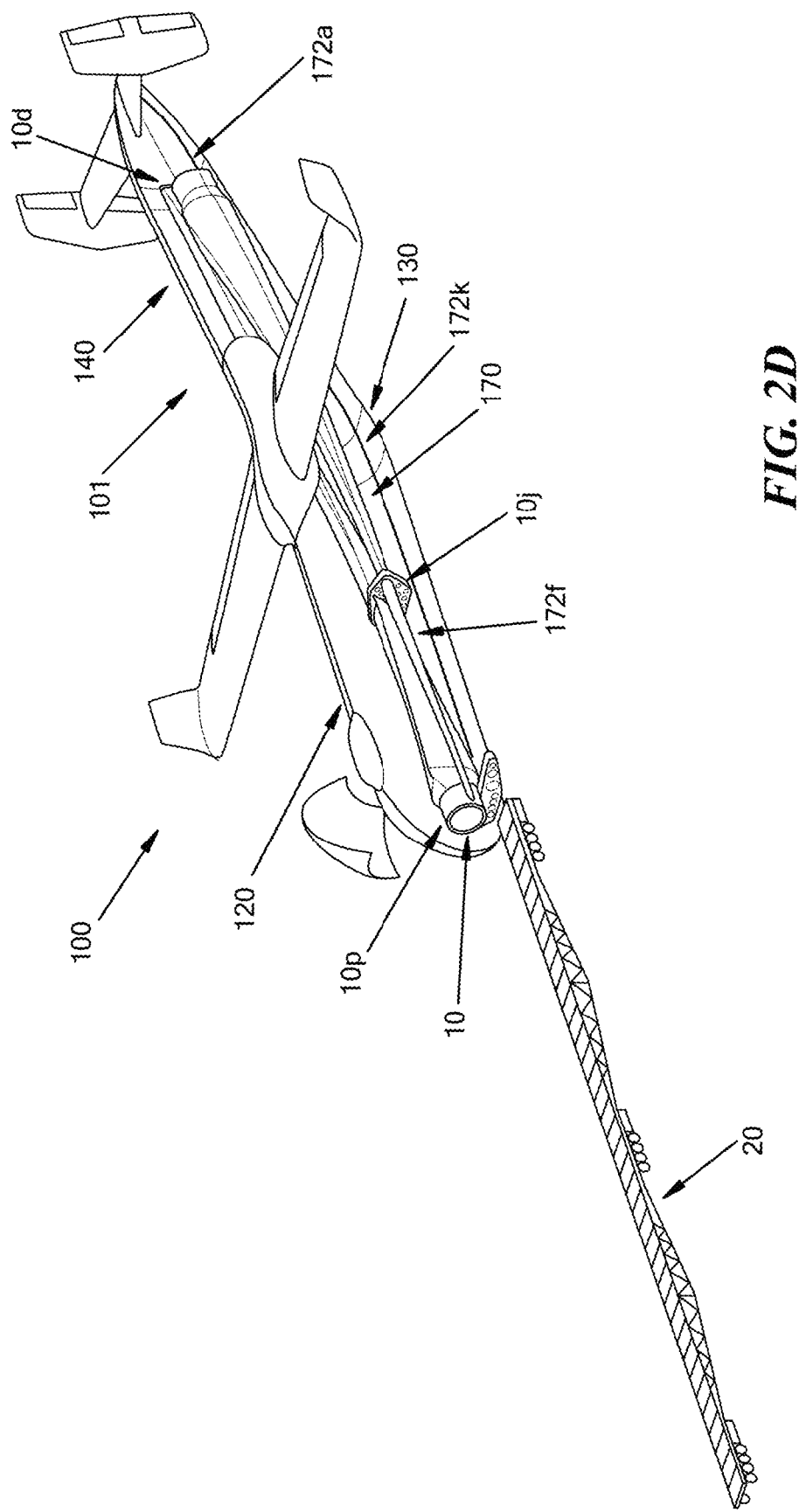
FIG. 2D is an isometric, partial cross-sectional view of the aircraft of FIG. 2C with the payload being fully loaded into the interior cargo bay.

FIGS. 2B-2D provide for a general, simplified illustration of one exemplary embodiment of loading a large payload 10 into the aircraft 100. As shown, the cargo nose door 126 is swung upwards into its open position, exposing the portion of the interior cargo bay 170 associated with the fixed portion 128 of the fuselage 101, which can extend through the kinked portion 130 and through essentially the entirety of the aft end 140. The cargo opening 171 provides access to the interior cargo bay 170, and the cantilevered tongue 160 can be used to help initially receive the payload. As shown, the payload 10 includes two wind turbine blades 11A, 11B, held with respect to each other by payload-receiving fixtures 12. The payload-receiving fixtures 12 are generally considered part of the payload, although in an alternative interpretation, the payload 10 can just be configured to be the blades 11A, 11B. This payload 10 can be considered irregular in that the shape, size, and weight distribution across the length of the payload is complex, causing a center of gravity of the payload to be at a separate location than a geometric centroid of the payload. One dimension (length) greatly exceeds the others (width and height), the shape varies with complex curvature nearly everywhere, and the relative fragility of the payload requires a minimum clearance be maintained at all times as well as fixturing support the length of the cargo at several locations even under the payload's own weight under gravity. Additional irregular payload criteria can include objects with profiles normal to a lengthwise axis rotate at different stations along that axis, resulting in a lengthwise twist (e.g., wind turbine blade spanwise twist) or profiles are located along a curved (rather than linear) path (e.g., wind turbine blade in-plane sweep). Additionally, irregular payloads include objects where a width, depth, or height vary non-monotonically along the length of the payload (e.g., wind turbine blade thickness can be maximal at the max chord station, potentially tapering to a smaller cylinder at the hub and to a thin tip). The term irregular package will be similarly understood.

The payload 10, which can also be referred to as a package, particularly when multiple objects (e.g., more than one blade, a blade(s) and ballast(s)) are involved, possibly secured together and manipulated as a single unit, can be delivered to the aircraft 100 using most any suitable devices, systems, vehicles, or methods for transporting a large payload on the ground. A package can involve a single object though. In the illustrated embodiment, a transport vehicle 20 includes a plurality of wheeled mobile transporters 22 linked together by a plurality of spans, as shown trusses 24. In some instances, one or more of the wheeled mobile transporters 22 can be self-propelled, or the transport vehicle 20 more generally can be powered by itself in some fashion. Alternatively, or additionally, an outside mechanism can be used to move the vehicle 20, such as a large vehicle to push or pull the vehicle 20, or various mechanical systems that can be used to move large payloads, such as various combinations of winches, pulleys, cables, cranes, and/or power drive units.

As shown in FIG. 2B, the transport vehicle 20 can be driven or otherwise moved to the forward end 120 of the aircraft 100, proximate to the cargo opening 171. Subsequently, the payload 10 can begin to be moved from the transport vehicle 20 and into the interior cargo bay 170. This can likewise be done using various combinations of one or more winches, pulleys, cables, cranes, and/or power drive units, such set-ups and configurations being known to those skilled in the art. FIG. 2C illustrates a snapshot of the loading process with half of the fuselage removed for illustrative purposes (as currently shown, the half of the nose cone 126 illustrated is in both an open and closed position, but during loading through the cargo opening 171, it is in an open position). As shown, the payload 10 is partially disposed in the interior cargo bay 170 and is partially still supported by the transport vehicle 20. A distal end 10d of the payload 10 is still disposed in the forward end 120, as it has not yet reached the kinked portion 130.

The system and/or methods used to move the payload 10 into the partially loaded position illustrated in FIG. 2C can continue to be employed to move the payload 10 into the fully loaded position illustrated in FIG. 2D. As shown, the distal end 10d of the payload 10d is disposed in the interior cargo bay 170 at the aft end 140, a proximal end 10p of the payload 10 is disposed in the interior cargo bay 170 at the forward end 120 (for example, on the cantilevered tongue 160, although the tongue is not easily visible in FIG. 2D), and the intermediate portion of the payload 10 disposed between the proximal and distal ends 10p, 10d extends from the forward end 120, through the kinked portion 130, and into the aft end 140. As shown, the only contact points with a floor of the interior cargo bay 170 (which for these purposes includes the tongue 160) are at the proximal and distal ends 10p, 10d of the payload 10 and at two intermediate points 10j, 10k between the proximal and distal ends 10p, 10d, each of which is supported by a corresponding fixture 12. In other embodiments, there may be fewer or more contact points, depending, at least in part, on the size and shape of each of the payload and related packaging, the size and shape of the cargo bay, the number of payload-receiving fixture used, and other factors. This illustrated configuration of the payload disposed in the interior cargo bay 170 is more clearly understood by discussing the configuration of the kinked fuselage (i.e., the fuselage 101 including the kinked portion 130) in greater detail. Once the payload 10 is fully disposed in the interior cargo bay 170, it can be secured within the cargo bay 170 using techniques provided for herein, in counterpart applications, or otherwise known to those skilled in the art.

Kinked Fuselage

Figure 3A:
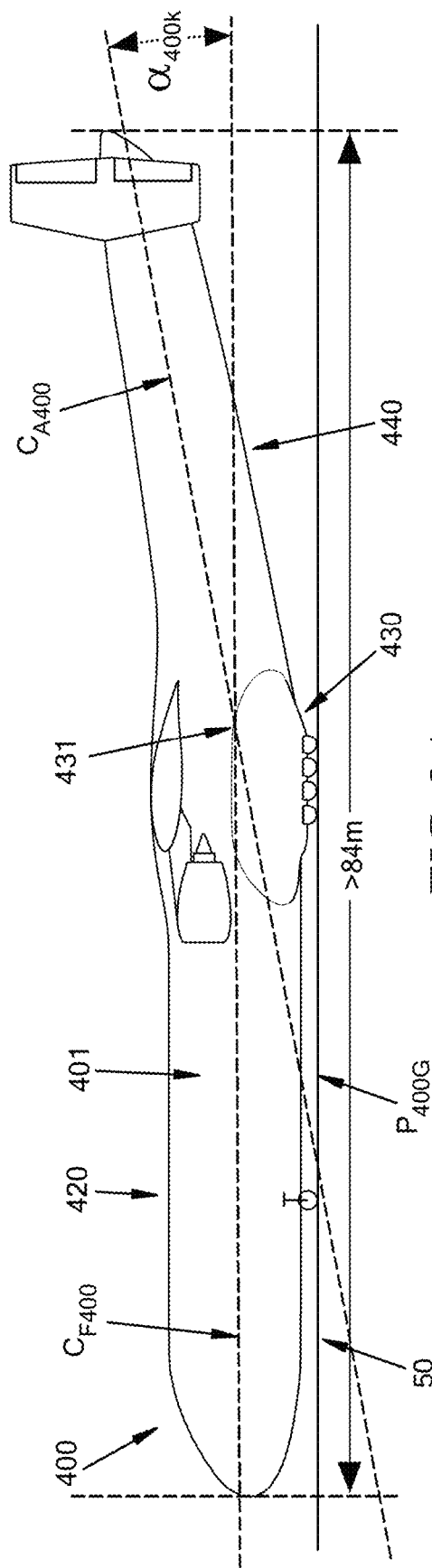
FIG. 3A is a side view of an alternative exemplary embodiment of an aircraft.
Figure 3B:
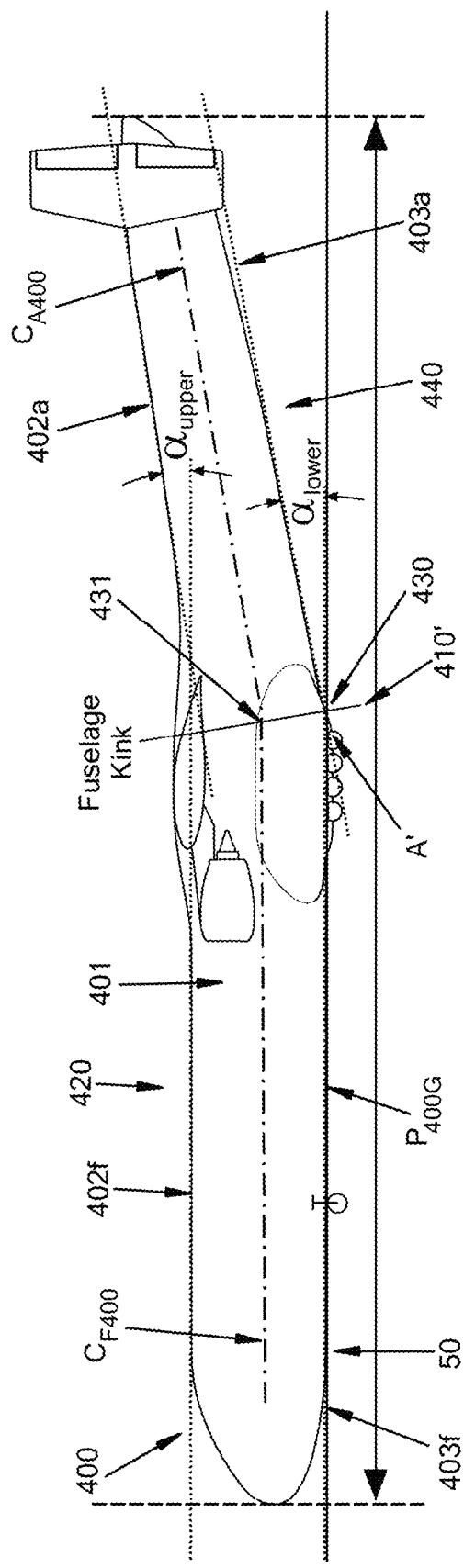
FIG. 3B is a side transparent view of the aircraft of FIG. 3A.

FIG. 3A is a side view illustration of an exemplary cargo aircraft 400 of the present disclosure. The aircraft 400, which is shown to be over 84 meters long, includes a fuselage 401 having a forward end 420 defining a forward centerline $C_{F400}$ and an aft end 440 defining an aft centerline $C_{A400}$, with the aft centerline $C_{A400}$ being angled up with respect to the forward centerline $C_{F400}$. The forward and aft centerlines $C_{F400}$, $C_{A400}$ define a junction or kink 431 therebetween, where the forward centerline $C_{F400}$ angles upward as the overall aft fuselage, which is in the aft end 440, changes in direction to be angled with respect to the forward fuselage, which is in the forward end 420. This defines a kink angle wook of the aft fuselage 440. The kink location 431 is contained in the kinked portion 430 disposed between and connecting the forward and aft ends 420, 440. FIG. 3B shows the forward centerline $C_{F400}$ as being an approximate midpoint between a top-most outer or upper surface 402f and a bottom-most outer or lower surface 403f of the fuselage 401 forward of a lateral axis of rotation A', with the aft centerline $C_{A400}$ being an approximate midpoint between an upper surface 402a and a lower surface 403a of the fuselage 401 aft of the lateral axis of rotation. FIG. 3B shows the kink 431 between the forward centerline $C_{F400}$ and the aft centerline $C_{A400}$ as being an approximate change in the angle of a plane 410' substantially perpendicular to the centerline $C_{F400}$ and most of the upper and lower surfaces 402a, 403a extending aft from the kink 431, such that the fuselage 401 aft of the kink 431 has a substantial portion of an approximately constant height or cross-sectional area. This represents only one example, and in other instances the upper surface 402a does not necessarily extend approximately parallel to the lower surface 402b at all even if the aft fuselage still defines a kink 431 in the centerline.

In FIG. 3B, the angle of the aft centerline $C_{A400}$ with respect to the forward centerline $C_{F400}$ defines a kink or bend angle (illustrated as $a_{400K}$ in FIG. 3A), which can be approximately equal to average of an angle $\alpha_{upper}$ of the after upper surface e 402a and an angle $\alpha_{lower}$ of the lower surface 403a with respect to the forward centerline $C_{F400}$ and forward upper and lower surfaces 402f, 403f for the case of a constant cross-section forward fuselage 401, as shown in FIG. 3B (hence, FIG. 3B indicating the upper and lower surfaces 402a, 403a defining the respective upper and lower angles $\alpha_{upper}$, $\alpha_{lower}$). In some instances, the angles $\alpha_{upper}$, $\alpha_{lower}$ of the aft upper and lower surfaces 402a, 403a vary with respect to the angle of the aft centerline $C_{A400}$, with the location of a substantial upward deflection in the overall centerline (e.g., kink 431) being defined by the overall shape and slope of the aft fuselage with respect to the forward fuselage (or more generally the overall shape and slope of the aft end 440 with respect to the forward end 420). For example, for the aircraft 100 of FIG. 1B, the lower surface defines a lower angle mower, which is approximately equal to the tailstrike angle of approximately 12 degrees, and the upper surface angle $\alpha_{upper}$ in the aft fuselage is approximately between 6 and 7 degrees. In some exemplary embodiments, the result kink angle of the aft centerline $C_{A400}$ can be approximately in the range of about 0.5 degrees to about 25 degrees, and in some instance it is about 10 degrees with respect to a longitudinal—lateral plane of the cargo aircraft 100, i.e., a plane in which the forward centerline $C_{F400}$ is disposed, the plane extend substantially parallel to the ground or a ground plane $P_{400G}$. Further, the kink angle $\alpha_{400K}$ can be approximately equal to a degree of maximal rotation of the aircraft during the takeoff operation. Still further, a length of the aft end 140, i.e., the portion that is angled with respect to the forward centerline $C_{F400}$, can be approximately in the range of about 15% to 65%, and in some instances about 35% to about 50% of a length of the entire fuselage 101, and in some embodiments it can be about 49% the length of the fuselage 101.

Figure 3C:
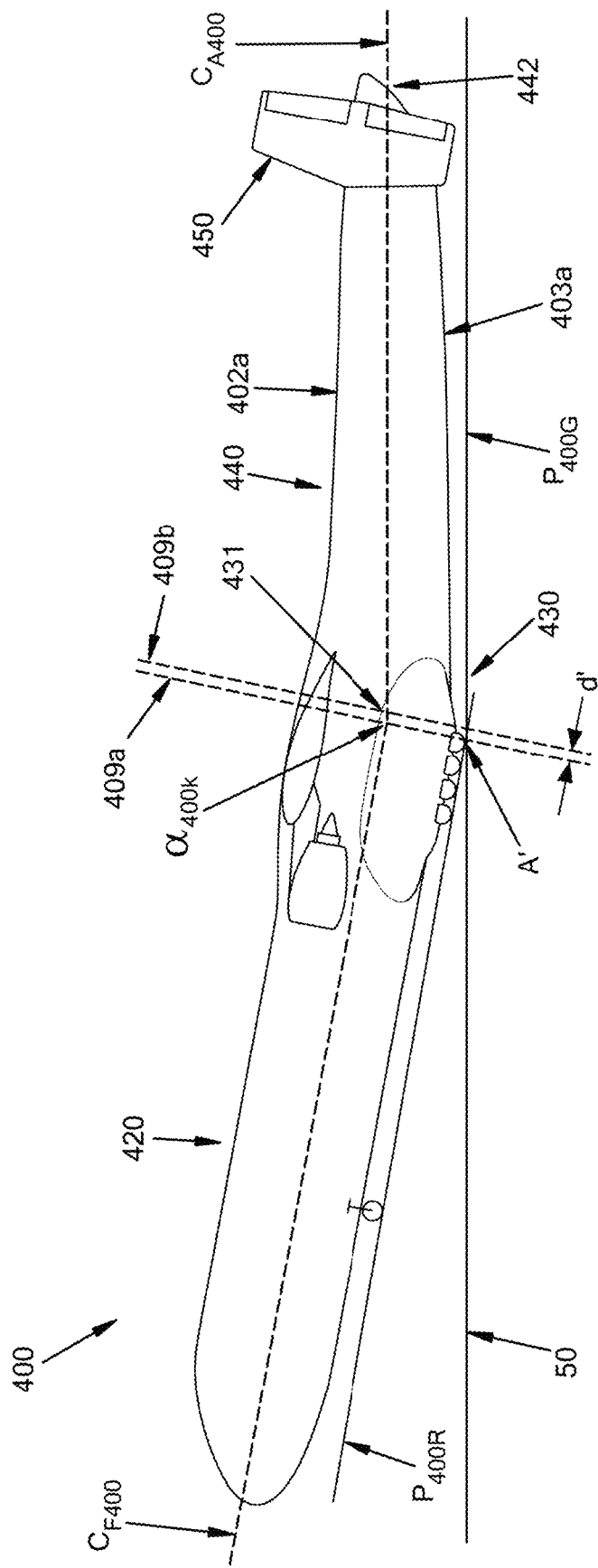
FIG. 3C is a side view of the aircraft of FIG. 3B in a take-off position.
Figure 4:
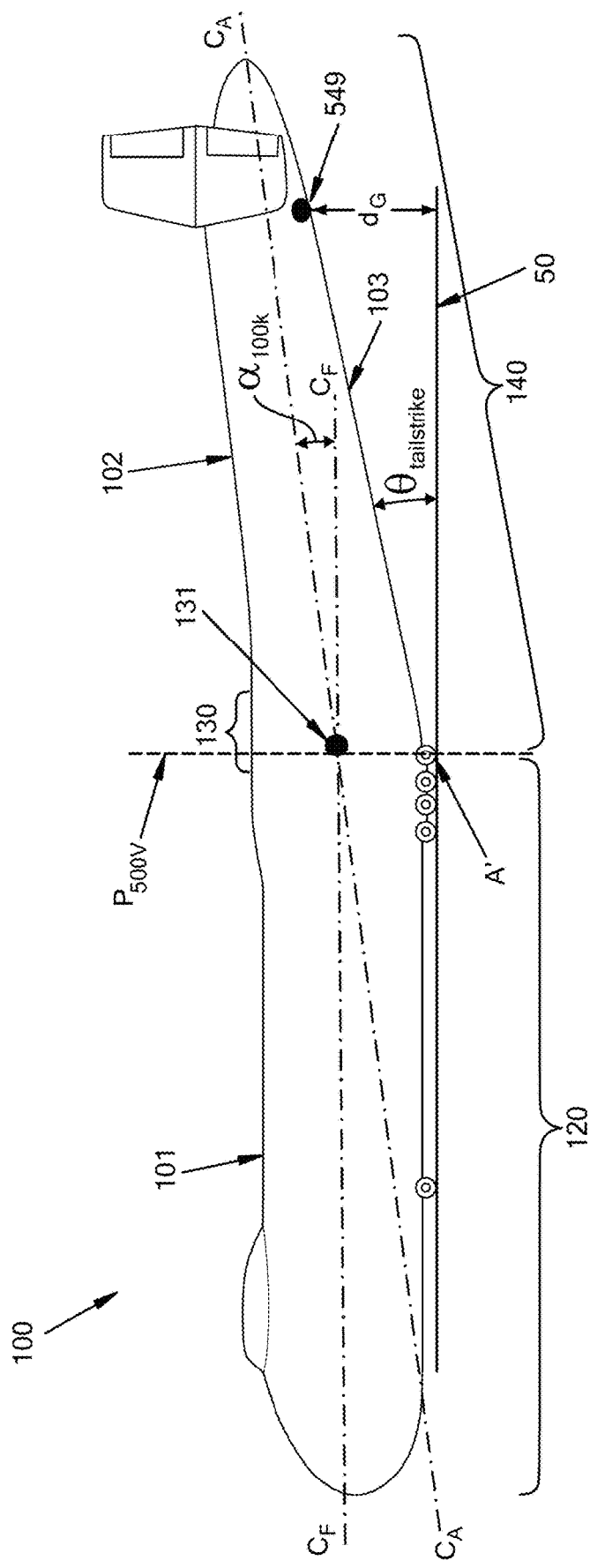
FIG. 4 is the side view of the aircraft of FIG. 1A with some additional details removed for clarity.

In FIG. 3C, the cargo aircraft 400 is shown on the ground 50 and rotated about the lateral axis of rotation to illustrate, for example, a takeoff pitch-up maneuver. In FIG. 3C, a resting plane $P_{400R}$ of the forward end 420 angled with respect to the ground or ground plane $P_{400G}$ at a degree just before $\theta_{tailstrike}$, as no part of the aft end 440, empennage 450, or tail 442 is contacting the ground. In this position, the lower surface 403a (and, approximately, the aft centerline $C_{A400}$) is substantially parallel with the ground or ground plane $P_{400G}$, and it can be seen that because the location of the centerline kink 431 of the kinked portion 430 is approximately with, or very close to, the lateral axis of rotation A', the angle $\alpha_{400K}$ of the kink 431 is approximately the maximum safe angle of rotation of the aircraft 400 about the lateral axis of rotation A'. FIG. 3C shows a vertical axis 409a aligned with the location of the lateral axis of rotation A' and another vertical axis 409b aligned with the kink 431 in the fuselage centerline $C_{F400}$, with a distance d' therebetween. With d' being small, and the lower surface 403a of the aft end 440 extending aft with approximately the kink angle $\alpha_{400K}$ of the kink 431 or a slightly larger angle, as shown, the aft end 440 is highly elongated without risking a tail strike. Accordingly, minimizing d' approximately sets the lower angle $\alpha_{lower}$ as an upper limit to the safe angle of rotation about the lateral pitch axis. Moreover, the upward sweep of the upper surface 402a can be arranged to maintain a relatively large cross-sectional area along most of the aft end 440, thereby enabling a substantial increase in the overall length of the cargo aircraft 400, and thus usable interior cargo bay within the aft end 440, without increasing $\theta_{tailstrike}$. FIG. 4 shows this in further detail for the cargo aircraft 100 of FIG. 1A.

In FIG. 4, the aft centerline $C_A$ and forward centerline $C_F$ of the fuselage 101 are shown intersecting at a kink location 131 just aft of the vertical plane $P_{500V}$ of the lateral axis of rotation A', which occurs within the kinked portion 130 connecting the forward end or fuselage 120 to the aft end or fuselage 140. The lower surface 103 of the aft fuselage 140 approximately defines $\theta_{tailstrike}$ of the cargo aircraft 100, which is slightly larger than a kink angle $\alpha 400K$ defined by the upslope of the aft centerline $C_A$ with respect to the forward centerline $C_F$. Additionally, in some examples, the aft fuselage can include a sensor 549 configured to measure the distance $d_G$ of the lower surface 103 of the aft fuselage 140 to the ground 50 to assist the pilot and/or computer in control of the aircraft 100 in maximally rotating the aircraft 100 about the lateral pitch axis without tailstrike.

Figure 5A:
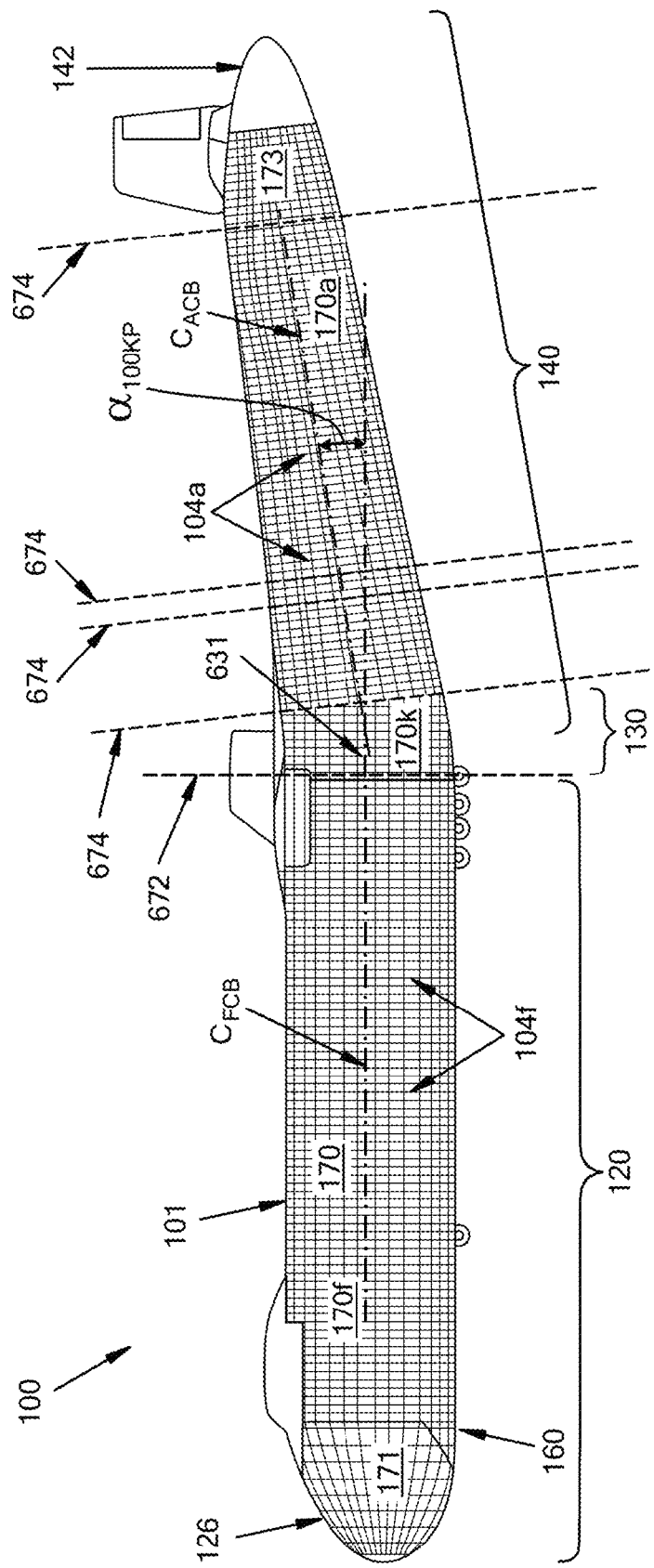
FIG. 5A is a side cross-sectional view of the aircraft of FIG. 4, including an interior cargo bay of the aircraft.

FIG. 5A is side cross-section view of the cargo aircraft 100, the cross-section being taken along an approximate midline T-T of the top-most outer surface, as shown in FIG. 1A. The cargo bay 170 defines a centerline that extends along the overall length of the cargo bay 170. The cargo bay 170 extends from a forward end 171 of a forward end or region 170f of the cargo bay 170, as shown located in the nose cone 126, to an aft end 173 of an aft end or region 170a of the cargo bay 170, as shown located in the fuselage tail cone 142. The forward and aft regions 170f, 170a of the cargo bay 170 sit within the forward and aft ends 120, 140, respectively, of the aircraft 100. More particularly, the forward region 170f can generally define a forward cargo centerline $C_{FCB}$ that can be substantially colinear or parallel to the forward fuselage centerline $C_F$ (shown in FIG. 4) and the aft region 170a can generally define an aft cargo centerline $C_{ACB}$ that can be substantially colinear or parallel to the aft fuselage centerline $C_A$ (shown in FIG. 4). Accordingly, in the kinked portion 130 of the fuselage 101, which itself can include a comparable kinked portion 170k of the cargo bay 170, where the aft fuselage centerline $C_A$ bends with respect to the forward fuselage centerline $C_F$, the aft cargo centerline $C_{ACB}$ also bends at a kink location 631 with respect to the forward cargo centerline $C_{FCB}$. The bend can be at approximately the same angle, as shown an angle $\alpha_{100KP}$, as the kink angle $\alpha_{100K}$ of the fuselage 101. The aft cargo centerline $C_{ACB}$ can extend at least approximately 25% of a length of a centerline of the continuous interior cargo bay 170, i.e., the length of the centerline throughout the entire cargo bay 170. This amount more generally can be approximately in the range of about 25% to about 50%. There are other ways to describe these dimensional relationships as well, including, by way of non-limiting example, a length of the aft cargo centerline $C_{ACB}$ being at least approximately 45% of the length of the fuselage 101 and/or at least approximately 80% of a length of the fuselage 101 aft of the lateral pitch axis, among other relationships provided for herein or otherwise derivable from the present disclosures.

FIG. 5A shows the aft region 170a of the cargo bay 170 extending through almost all of the aft fuselage 140, which is a distinct advantage of the configurations discussed herein. Moreover, due to the length of the aft fuselage 140, a pitch 674 of structural frames 104a of the aft fuselage 140 can be angled with respect to a pitch 672 of structural frames 104f of the forward fuselage 120 approximately equal to the kink angle $\alpha_{100K}$ of the fuselage 101. In some examples, the kinked region 130 represents an upward transition between the pitch 672 of the structural frames 104f of the forward fuselage 120 and the pitch 674 of the structural frames 104a of the aft fuselage 140. A person skilled in the art will recognize that structural frames 104a, 104f are merely one example of structural features or elements that can be incorporated into the fuselage 101 to provide support. Such elements can be more generally described as circumferentially-disposed structural elements that are oriented orthogonally along the aft centerline $C_{ACB}$ and the forward centerline $C_{FCB}$. In some examples, the location of the cargo bay kink 631 (FIG. 5A) is forward or aft of the fuselage kink 131 (FIG. 4) such that either the forward cargo region 170f partially extends into the aft fuselage 140 or the aft cargo region 170a partially extends into the forward fuselage 120, however, this generally depends, at least in part, on the distance between the interior of the cargo bay 170 and the exterior of the fuselage, which is typically a small distance for cargo aircraft having a maximally sized cargo bay. Regardless, to fully utilize examples of the present disclosure, the aft region 170a of the cargo bay 170 can be both (1) able to be substantially extended due to the ability of the aft fuselage 140 length to be extended and (2) able to extend along substantially all of the length of the aft fuselage 140 because examples of the present disclosure enable aircraft to have elongated aft fuselages for a fixed tailstrike angle and/or minimized kink angle. Additionally, minimizing the fuselage kink angle for elongated aft fuselages allows the aft region of the cargo bay to extend further along the fuse fuselage while increasing the maximum straight-line payload length for a given overall aircraft length and tailstrike angle, as shown at least in FIG. 5B.

Figure 5B:
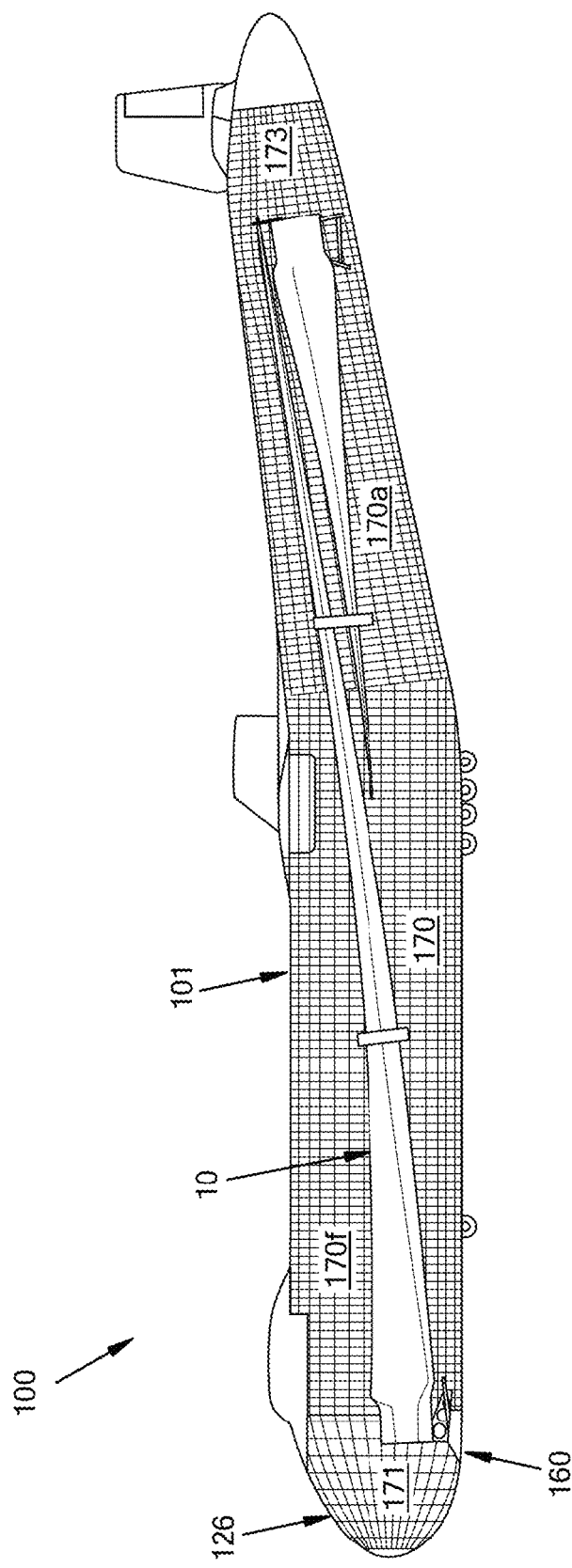
FIG. 5B is the side cross-sectional view of the aircraft of FIG. 5A with an exemplary payload disposed in the interior cargo bay.

FIG. 5B shows a side cross-sectional view of the fuselage 101 of the cargo aircraft 100 of FIG. 5A with a highly elongated payload 10 of two wind turbine blades 11A, 11B disposed substantially throughout the interior cargo bay 170 and extending from the forward end 171 of the forward region 170f to the aft end 173 of the aft region 170a. Having at least a portion of the aft region 170a being linearly connected to (e.g., within line of sight) of at least a portion of the forward region 170f enables the extension of the aft region 170a to result in an extension in the maximum overall length of a rigid payload capable of being carried inside the interior cargo bay 170. Wind turbine blades, however, are often able to be deflected slightly during transport and so examples of the present disclosure are especially suited to their transport as the ability to slightly deflect the payload 10 during transport enables even long maximum payload lengths to be achieved by further extending the aft end 173 of the aft region 170a beyond the line of sight of the forward-most end 171 of the forward region 170f.

Additional details about a kinked fuselage configuration are provided in a counterpart patent application entitled "AIRCRAFT FUSELAGE CONFIGURATIONS FOR AVOIDING TAIL STRIKE WHILE ALLOWING LONG PAYLOADS," filed concurrently herewith, the content of which is incorporated by reference herein in its entirety.

Rails and Payload-Receiving Fixtures

Figure 6A:
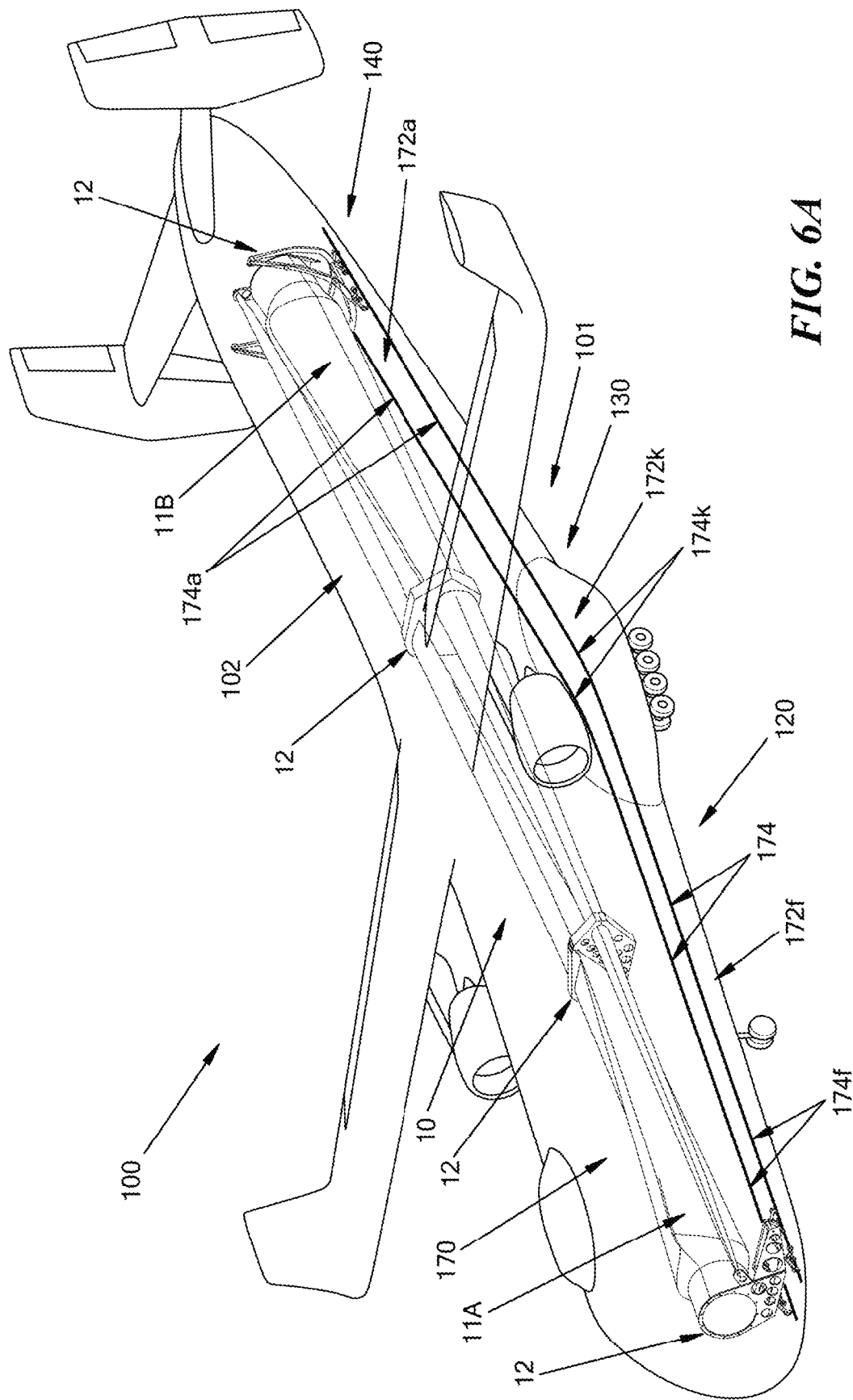
FIG. 6A is an isometric, transparent view of the aircraft of FIG. 1B having the payload disposed therein.
Figure 6B:
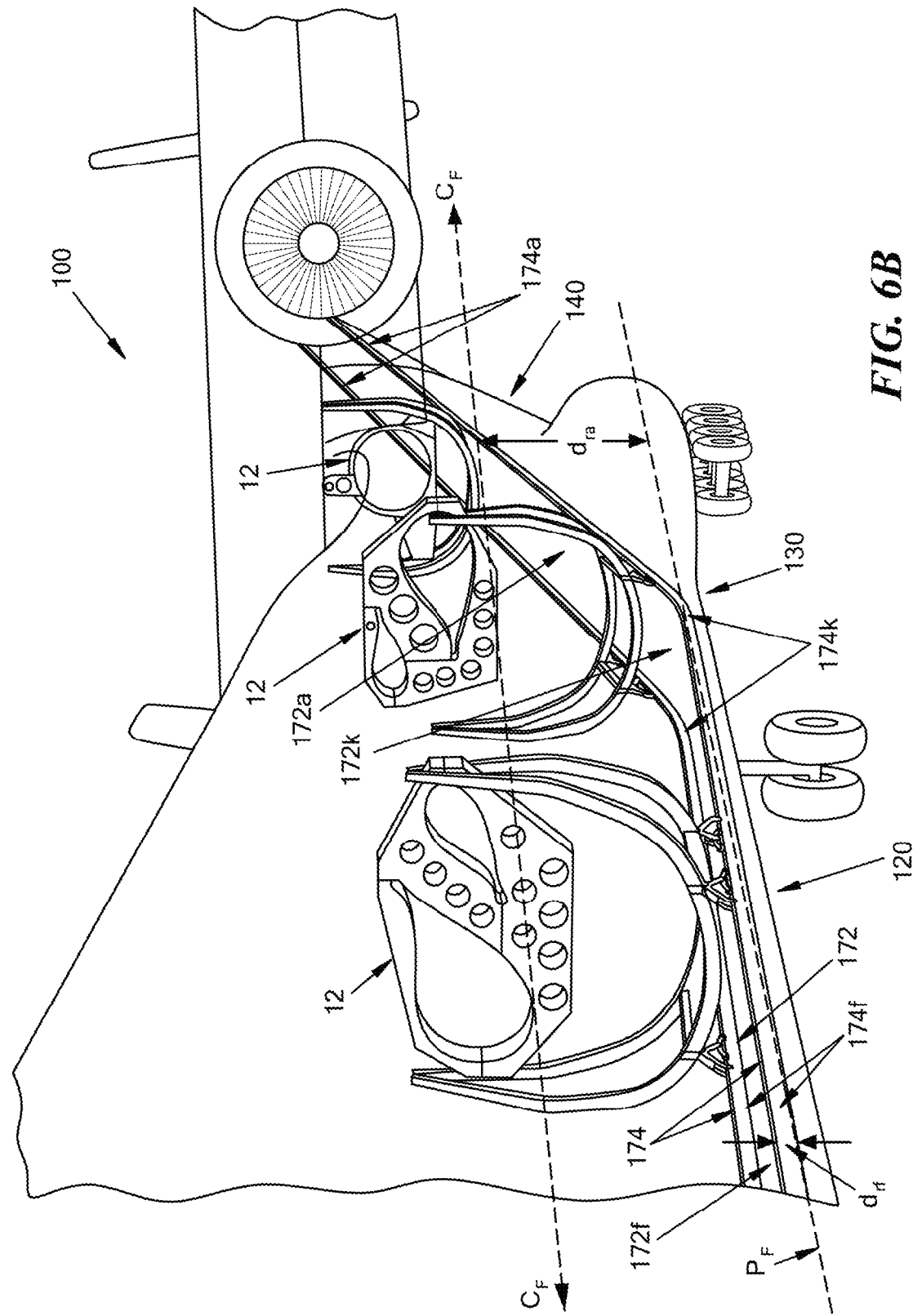
FIG. 6B is a detailed, front-side isometric, transparent view of the aircraft of FIG. 6A with wind turbine blades of the payload hidden from view to better illustrate a pair of rails disposed in the interior cargo bay and exemplary payload-receiving fixtures for holding the wind turbine blades coupled to the rails.
Figure 6C:
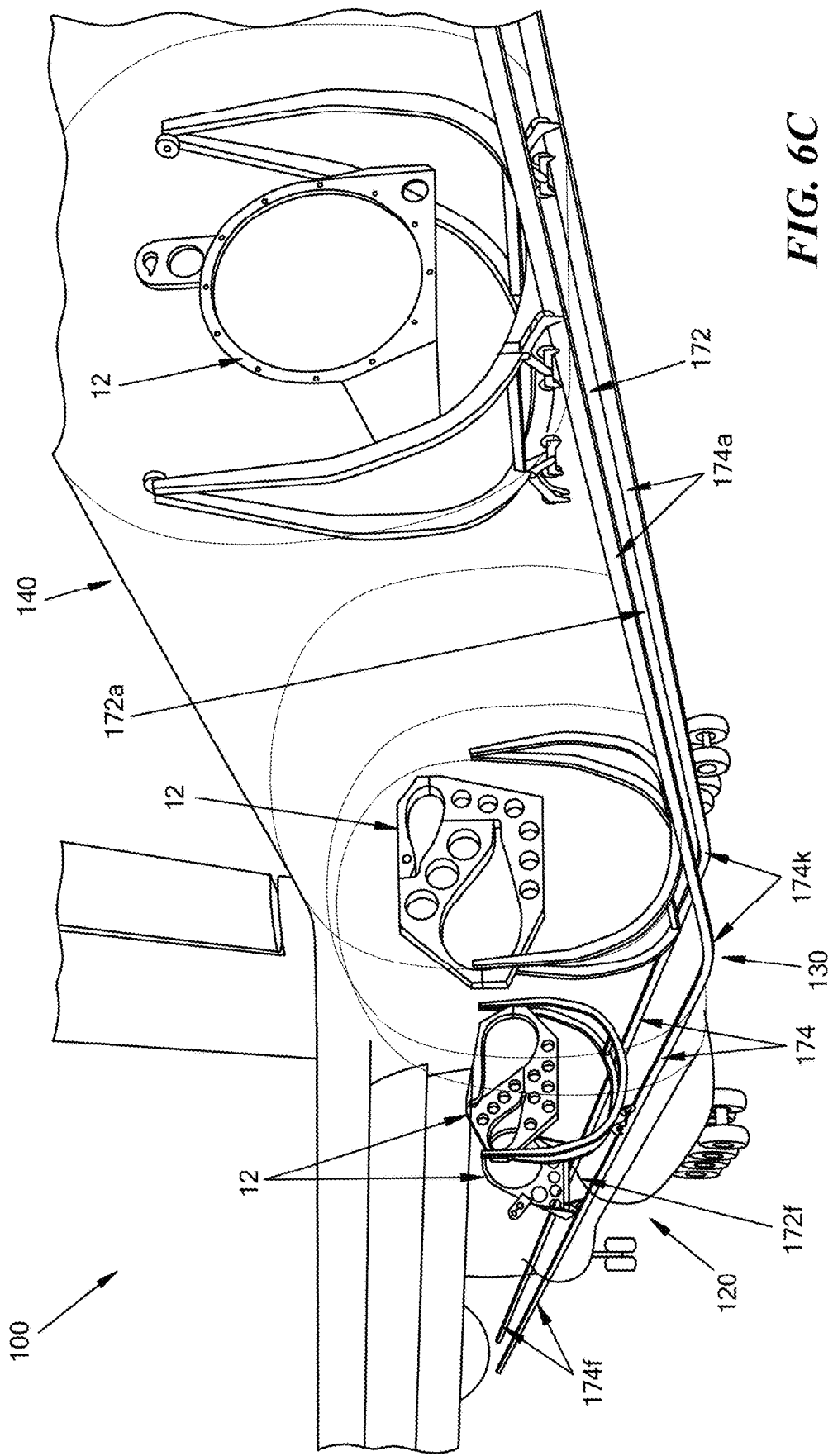
FIG. 6C is a detailed, back-side isometric, transparent view of the aircraft of FIG. 6B.

Hidden from view in the previous figures of the aircraft 100, but illustrated in FIGS. 6A-6C are a pair of rails 174 coupled to, extending from, or otherwise associated with the floor 172 of the cargo bay 170. Some of the illustrations may look incomplete or incompatible with other figures, such as having rails extending beyond what looks like the terminal end of a fixed portion of the fuselage (see, e.g., FIG. 6C as filed), but a person skilled in the art will recognize this is just the result of complications that can arise while drawing and viewing components using solid models and is not indicative of an incomplete, incompatible, or inoperable aspect of the aircraft and/or related components. A person skilled in the art, in view of the present disclosures, will understand how such components should be illustrated in view of the present disclosures and other figures.

Much like the bay 170 and the floor 172, the rails 174 can extend in a continuous manner from the forward end 120, through the kinked portion 130, and into the aft end 140. The rails 174 can thus be configured to have a forward end 174f, a kinked portion 174k, and an aft end 174a. As a result of the kinked portion 174k, a vertical distance $d_{ra}$ between the aft end 174a and a plane $P_F$ defined by an interior bottom contact surface of the interior cargo bay 170 in the forward end 120 of the aircraft 100, i.e., the plane $P_F$ extending longitudinally and laterally through the forward end 172f of the floor 172 and that is substantially parallel to the forward centerline $C_F$, is greater than a vertical distance $d_{rf}$ between at least a portion of the forward end 174f and the plane $P_F$. Further, in some embodiments in which the aft end 140 extends above a plane extending substantially through an entirety of the top surface 102 of the forward end 120 of the fuselage 101 such that the plane is substantially parallel to ground, because the rails 174 can extend towards and into the fuselage tail cone 142, a portion of at least one of the rails 174, as shown both rails 174, disposed in the aft bay portion 172a can also be located above the plane extending substantially through an entirety of the top surface 102 of the forward end 120 of the fuselage 101. The angle at which the rails 174 are disposed in the aft bay portion 170a can be akin to the kink angle $\alpha_K$. More generally, the rails 174 can extend in a manner such that a majority of it disposed in the aft bay portion 170a is disposed at the kink angle $\alpha_K$. As shown, there are two rails 174 that are substantially parallel to each other across their length, but in other embodiments there can be fewer (e.g., one rail) or more rails and the rails can extend in non-parallel manner, such as having them angle closer together or further apart slightly as they extend towards the aft end 140 to create a desired stopping location that works with fixtures loaded onto the rails 174. In some embodiments, the rail(s) 174 can serve as a primary structural member(s) or beam(s) of the fuselage 101, capable of bearing operational flight and/or ground loads, akin to a keel beam in some aircraft.

A payload, such as the payload 10, can be translated along the rails 174 from the forward end 174f and towards the aft end 174a until the payload reaches a desired location. That desired location can relate, for example, to placing a center of gravity of the payload within a desired range of a center of gravity of the aircraft. Translation of the payload can be aided by the fixtures 12 illustrated in FIGS. 6A-7. As shown best in FIG. 7, the fixtures 12 can have a variety of configurations that are configured to both receive a payload, such as wind turbine blades 11A, 11B (of fewer or more blades as desired) and translate along the rails 174 to place the payload at the desired location(s).

The payload-receiving fixtures 12, as shown fixtures 112, 212, 312, 412, can generally include a carriage 114, 114', a frame 116, and a receiver 118, 218, 318, 418. In at least some of the illustrated embodiments, a single type of carriage and a single type of frame are provided, while four different receivers are illustrated. A person skilled in the art will recognize other carriages, frames, and receivers that can be used in conjunction with the present disclosures. Further, while payload-receiving fixtures are referred to herein using reference numeral 12, in some embodiments, a payload-receiving fixture may just be a receiver, like the receivers 118, 218, 318, 418, and thus such usage of the term "payload-receiving fixture" herein, including in the claims, can be directed to just a receiver as provided for herein. Generally that term in any claim should be read in that manner, unless such interpretation would be incompatible with the remaining portion of the claim, for example, if the claim separately recites a receiver.

Some of the illustrations may look incomplete or incompatible with other figures, such as looking like a receiver is not quite properly coupled to a frame (see, e.g., FIGS. 6B, 6C, and 7 as filed) or the fixture 12 not being in contact with the rails 174 (see, e.g., FIG. 7), but a person skilled in the art will recognize this is just the result of complications that can arise while drawing and viewing components using solid models and is not indicative of an incomplete, incompatible, or inoperable aspect of the aircraft and/or related components. A person skilled in the art, in view of the present disclosures, will understand how such components should be illustrated in view of the present disclosures and other figures.

Figure 7:
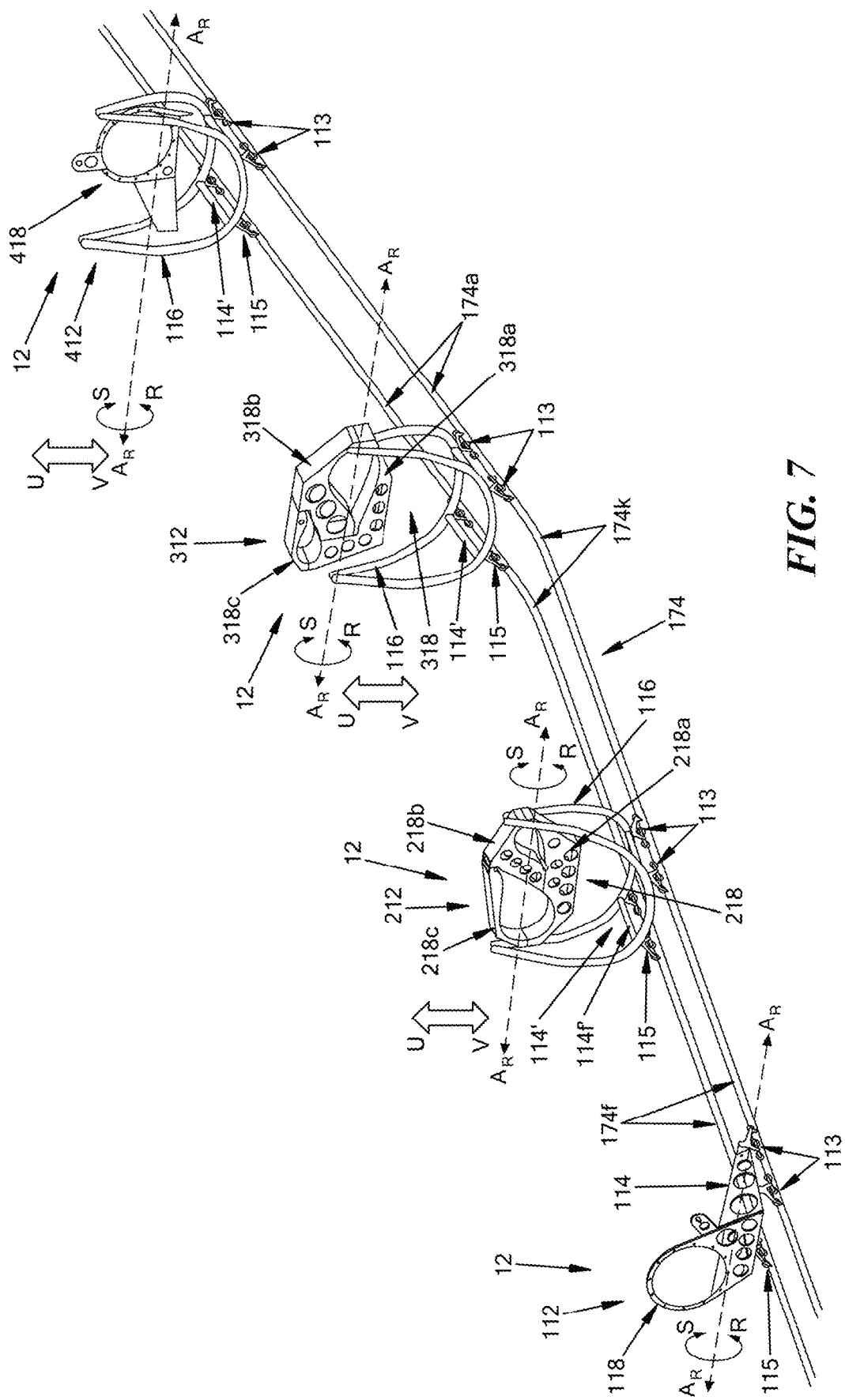
FIG. 7 is an isometric view of the rails and payload-receiving fixtures of FIG. 6B.

As shown in FIG. 7, a first payload-receiving fixture 112 includes a carriage 114 having a plurality of wheel sets 113 associated therewith. Each wheel set 113 is part of a whiffle tree 115 that extends from the carriage 114 to couple the wheels of the wheel sets 113 to the carriage 114. A receiver 118 is coupled to the carriage 114. The receiver 118 includes a plurality of holes or openings (these words may be used interchangeably herein) that can be used to receive a wind turbine blade. In the illustrated embodiment, the receiver 118 is designed to be a terminal end payload-receiving fixture with the largest opening configured to receive a root or hub of a wind turbine blade and one or more of the other openings configured to receive a tip of a second blade. The other openings disposed in the receiver 118 can also make the fixture 112 lighter in weight, making it more suitable for flying, and/or can be used in conjunction with securing a location of the payload within the cargo bay. In alternative embodiments, a frame, like the frame 116, can be used to couple the fixture 112 to the carriage 114.

A second payload-receiving fixture 212 provided for in FIG. 7 includes a carriage 114', wheel sets 113, and whiffle trees 115, each of which are the same as discussed above with respect to the carriage 114, wheel sets 113, and whiffle trees 115, except for slight differences between the carriages 114', 114. More particularly, a frame 116 is incorporated into the carriage 114', supporting the receiver 218. Any known techniques for mounting or otherwise integrating the frame 116 to the carriage 114' can be employed, whether provided for herein or otherwise known to those skilled in the art. In the illustrated embodiment the frame 116 replaces two bars of the frame 114f of the carriage 114'. A person skilled in the art will recognize that other means for translation can be used in lieu of or in addition to wheels and wheel sets in any of these embodiments, including but not limited to skis, skids, linked tracks (e.g., tractor tracks, military tank tracks), articulated legs, air cushions in the manner of a hovercraft, or other structures that allow for translation between two structures. Generally, any of the fixtures provided for in the present disclosure can translate along the rail(s) 174, with rolling and sliding being interchangeably used and more generally being considered translation or advancement of the fixture. The receiver 218 is adapted for receiving wind turbine blades. More particularly, the receiver 218 is designed as an intermediate fixture to receive an intermediate portion(s) of a wind turbine blade(s). For example, the two largest openings can be configured to receive portions of two wind turbine blades, and additional openings or holes can serve a similar purpose as the openings of the receiver 118. The illustrated receiver 218 is configured in a manner that it has multiple pieces, as shown three 218a, 218b, and 218c, that can couple together, for instance by snap-fitting together, to secure a location of the blades with respect to the receiver 218 and/or other blades received by the receiver 218.

A third payload-receiving fixture 312 provided for in FIG. 7 is mainly akin to the second fixture 212, including the carriage 114', wheel sets 113, whiffle trees 115, and frame 116, as well as a receiver 318 that is adapted for receiving wind turbine blades along intermediate portions of the blades. Like the second receiver 218, the two largest openings or holes of the third receiver 318 can be configured to receive intermediate portions of two wind turbine blades. The largest openings, and other openings, are positioned differently in the third receiver 318, but the intended purposes and uses of the same are akin. Further, like the second receiver 218, the third receiver 318 is designed to secure a location of the blades with respect to itself and/or other blades received by the receiver 318 by way of multiple pieces, as shown pieces 318a, 318b, and 318c, that couple together.

A fourth payload-receiving fixture 412 provided for in FIG. 7 is more akin to the first fixture 112 as it is also designed to be a terminal end receiving fixture. Its largest opening or hole can be configured to receive a root or hub of a wind turbine blade and one or more of the other openings or holes can be configured to receive a tip of a second blade and/or serve other purposes as provided for above. The fourth fixture 412 utilizes the carriage 114' and frame 116 of the fixtures 212 and 312. For each of the first and fourth receivers 118 and 418, a hub of a wind turbine blade can be coupled to the respective structure 118, 418 by way of bolting it thereto using the bolt holes disposed around a circumference of the largest opening. A person skilled in the art will recognize other ways by which a blade(s) can be coupled to any of the receivers 118, 218, 318, or 418 provided for herein.

Further, while in the illustrated embodiments the receivers 118, 218, 318, or 418 are generally designed to hold two wind turbine blades, a person skilled in the art will recognize those receivers, or other receivers, can be configured to hold other numbers of wind turbine blades, including one, three, four, five, or even more. As designed, the fixtures 12 and blades 11A, 11B, 11C, 11D can be packaged in a repetitive, repeatable manner, thus allowing for the center of gravity of the payload to be consistent across packaged payloads. Such packaging can be done in a manner that provides a compact volume of the irregular payload. Still further, while the fixtures 112, 212, 312, 412 are illustrated for use in conjunction with wind turbine blades, a person skilled in the art will recognize such fixtures can be used, re-designed, adapted, etc. for use with other large structures, including but not limited to industrial oil equipment, mining equipment, rockets, military equipment and vehicles, defense hardware, commercial aerospace vehicles, crane segments, aircraft components, space launch rocket boosters, helicopters, generators, or hyperloop tubes. Additionally, the various fixtures 112, 212, 312, 412, as well as other configurations of fixtures and/or components of the fixtures (e.g., carriages like the carriage 114, 114', frames like the frame 116, receivers like the receivers 118, 218, 318, 418, etc.) can be provided as a packaging kit to allow for the various fixtures and/or their components to be selected for particular uses, designs, and functions in a plug-and-play manner. At least some of the fixtures and/or their components can have common interface features amongst themselves and/or with respect to the aircraft in which it is loaded to further enhance the plug-and-pay ability. The fixtures themselves can be pre-designated for particular structures (e.g., wind turbine blades) and/or particular locations with respect to such structures (e.g., a terminal end, an intermediate—possibly designated—position).

As the fixtures 12 travel along the rails 174, some or all of them can be adapted to rotate and/or translate to enable desirable handling during travel. By way of example, all four of the fixtures 12 can be configured to rotate in directions R and S about a pivot axis $A_R$ of each of the fixtures 12, while at least the fixtures 12 that pass through along the kinked portion 174p of the rail 174 can be configured to translate vertically, up-and-down with respect to the rail 174 as shown by in directions U and V. Such movements can be achieved using known techniques for causing rotational and translational actuation, including but not limited to hydraulics, pistons, hydraulic pistons, pulleys-and-cables, and air chambers, among others. Further, such movements can be selectively active or passive. For example, with respect to an active movement, one or more of the fixtures 12 and/or the payload (it is noted that the payload can be interpreted to include or not include the fixtures as appropriate) can be monitored, for instance by a location and/or pressure sensor, and in response to one or more designated parameters or other cues (e.g., visual, tactile), action can be taken to rotate or vertically translate the fixture(s) 12 as desired. The input to take the action can be manual, e.g., by a person, or automated, by a program that acts in response to the designated parameter(s). Alternatively, or additionally, with respect to passive movement, one or more of the fixtures 12 can be designed to automatically mechanically rotate or vertically translate as a result of a change in conditions, such as translating the fixture(s) 12 and payload along the rails 174. In this type of instance, certain movements, such as part of the payload rising up as it becomes disposed in the aft bay portion 170a, may cause one or more fixtures to rotate and/or vertically translate.

Additional details about tooling for cargo management, including rails and payload-receiving fixtures, are provided in a counterpart patent application entitled "SYSTEMS AND METHODS FOR LOADING AND UNLOADING A CARGO AIRCRAFT," filed concurrently herewith, the content of which is incorporated by reference herein in its entirety.

Fuel Tanks

When transporting large cargo, like the highly elongated payload 10, management of centers of gravity (CGs, or CG singularly) is critical. This includes a CG of the aircraft and a CG of the payload. Management of CGs can be even more pronounced for irregular payloads, like one or more wind turbine blades, such as the blades 11A, 11B. This is due, at least in part, to the center of gravity of the irregular payload being at a separate location than a geometric centroid of the payload. One way the aircraft 100 is specifically designed to manage its center of gravity (CG) is by controlling a location of the fuel within the fuselage 101. As shown in FIGS. 8A-8D, a first fuel tank 181 is disposed in a volume of the first wing 182 and a second fuel tank 183 is disposed in a volume of the second wing 184. The fuel tanks 181, 183 are disposed adjacent a forward or main spar 188. By way of alternative, non-limiting embodiment, the main spar 188 can be two or more separate spars, such as a first forward or main spar disposed in the first wing 182 and a second forward or main spar disposed in the second wing 184. In the illustrated embodiment, the fuel tanks 181, 183 are mirror images of each other, so a description of one is equally applicable to the other. The fuel tanks 181, 183 do not necessarily have to be mirror images of each other, although making the symmetric to each other does aid in balancing the CG of the aircraft 100. Further, although the fuel tanks 181, 183 are illustrated as rectangular prisms or cuboids, a person skilled in the art will recognize many different shapes that can be used to form the fuel tanks 181, 183, including but not limited to cylinders, cubes, and spheres.

A lateral length of the fuel tanks 181, 183 is such that it does not extend too far towards a respective tip 182$t$, 184$t$ of the wings 182, 184. As shown, the lateral length P is less than half of a length L of the wing 182, 184 in which the tank 181, 183 is disposed such that the lateral length does not consume even a majority of the length L of the respective wing 182, 184. This can be true if the wing 182, 184 is measured from the forward centerline $C_F$ or, as illustrated, from a portion that starts where the fuselage 101 terminates. In the illustrated embodiment, the lateral length does not extend laterally beyond the wing-mounted engine 186. In embodiments in which there is more than one wing-mounted engine disposed on the wing(s) 182, 184, the fuel tanks 181, 183 may not extend laterally beyond the inner-most engine, the engine closest to the fuselage 101, although other configurations are possible (e.g., not beyond the next-to-last engine as judged moving away from the fuselage 101, not beyond the last engine as judged moving away from the fuselage 101).

A width w of the fuel tanks 181, 183, which as illustrated extends longitudinally along a longitudinal length of the fuselage 101, is such that the width w does not extend all the way to an aft spar 189. Similar to the main spar 188, in alternative, non-limiting embodiments, the aft spar 189 can be two or more separate spars, such as a first aft spar disposed in the first wing 182 and a second aft spar disposed in the second wing 184. More particularly regarding the width w, in the illustrated embodiment it is less than half of a distance $S_1$ between the two spars 188, 189 as measured from a side of the fuel tanks 181, 183 closest to the forward centerline $C_F$ of the fuselage 101. It can also be less than half of a distance $S_2$ between the two spars 188, 189 as measured from a side of the fuel tanks 181, 183 furthest from the forward centerline $C_F$ of the fuselage 101, although it may not necessarily be that way due to the illustrated pitch of one or both spars 188, 189 (the pitch being the angle at which a tangent of the spar intersects the forward centerline $C_F$ of the fuselage 101 when the respective spar is not substantially perpendicular to the centerline $C_F$ of the fuselage 101). While other configurations of the width w of the fuel tanks 181, 183 are possible, it can be beneficial to limit the width w to being less than the distance between the spars 188, 189 to assist in management of the CG of the aircraft 100 as it is impacted by the fuel disposed within the tanks 181, 183. More generally the width w of the fuel tanks 181, 183 can be described as terminating a significant distance away from aft spar 189 (or first and second aft spars of the first and second wings 182, 184, for instance when spars are disposed separately in each wing). That significant distance may be as illustrated, such that the width w is less than half the distance $S_1$, or stated another way, the width w of each of the first and second fuel tanks 181, 183 is less than a longitudinal open distance $l_{od}$ between a first longitudinal terminal end 181$lt$ of the first tank and/or a second longitudinal terminal end 183$lt$ of the second tank and the aft spar 189 (or first and second aft spars of the first and second wings 182, 184, for instance when spars are disposed separately in each wing) as measured from a location at which the respective first and second fuel tanks 181, 183 is disposed closest to the centerline $C_F$ of the fuselage 101. A height h of both fuel tanks 181, 183 is illustrated in FIG. 8C and can also be managed in a manner that limits the impact of the fuel on the CG of the aircraft 100.

The fuel tanks 181, 183 can be mounted within the wings 182, 184 using any techniques known to those skilled in the art. In the illustrated embodiment, an aft boundary of each fuel tank 181, 183 is defined by a wall 185 in the respective wings 182, 184 that is disposed a distance from the aft spar 189, thus defining the longitudinal open distance $l_{od}$, less a thickness of the wall 185. The wall 185 generally does not carry primary wing bending loads. The fuel tanks 181, 183 may be mounted to the respective walls 185 and/or the spar 188 and/or another component associated with the wings 182, 184 that can be used in conjunction with mounting fuel tanks in wings.

Figure 8A:
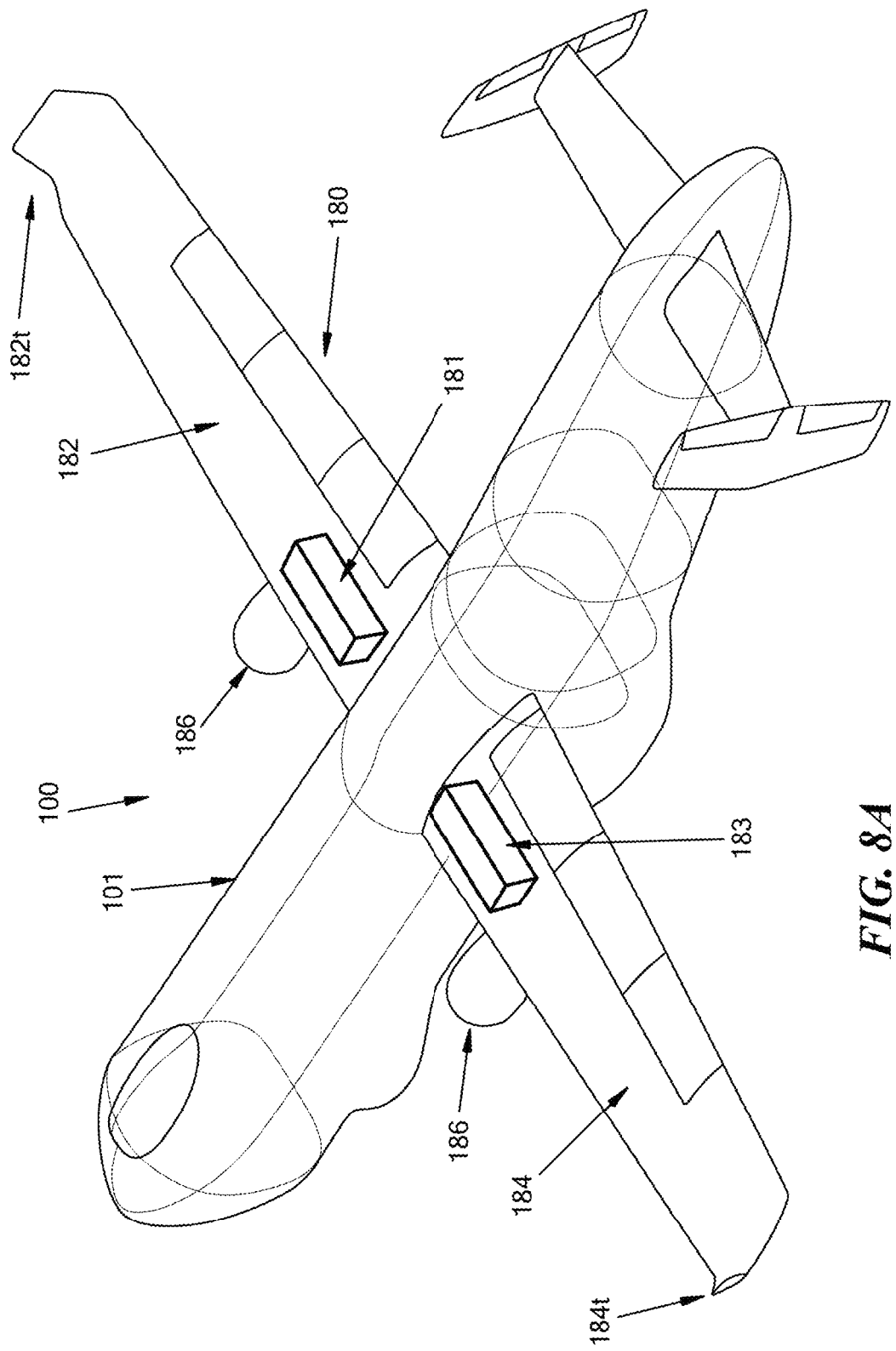
FIG. 8A is an isometric, transparent view of the aircraft of FIG. 1A, illustrating two fuel tanks.
Figure 8B:
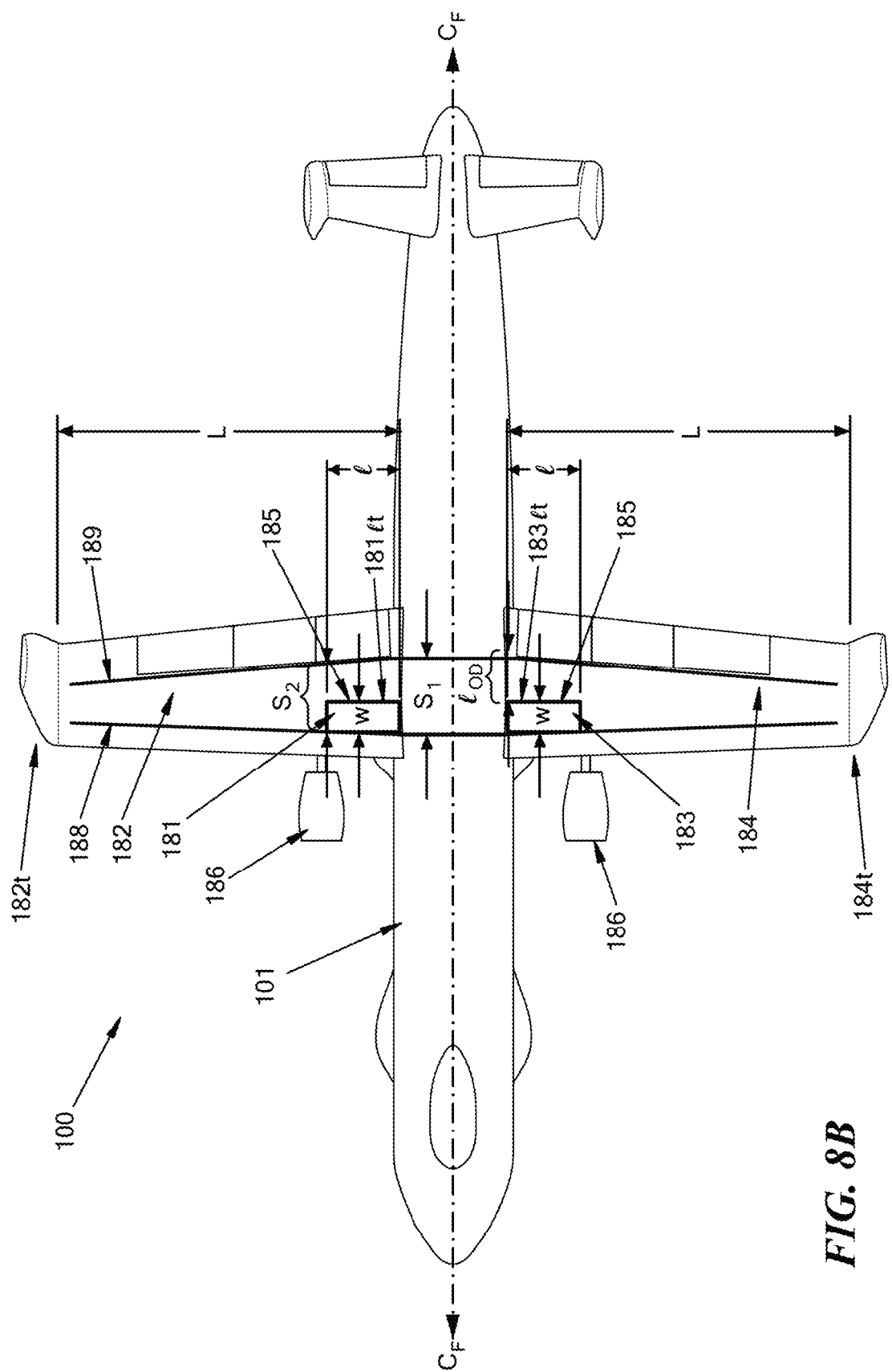
FIG. 8B is a top, transparent view of the aircraft of FIG. 8A.
Figure 8C:
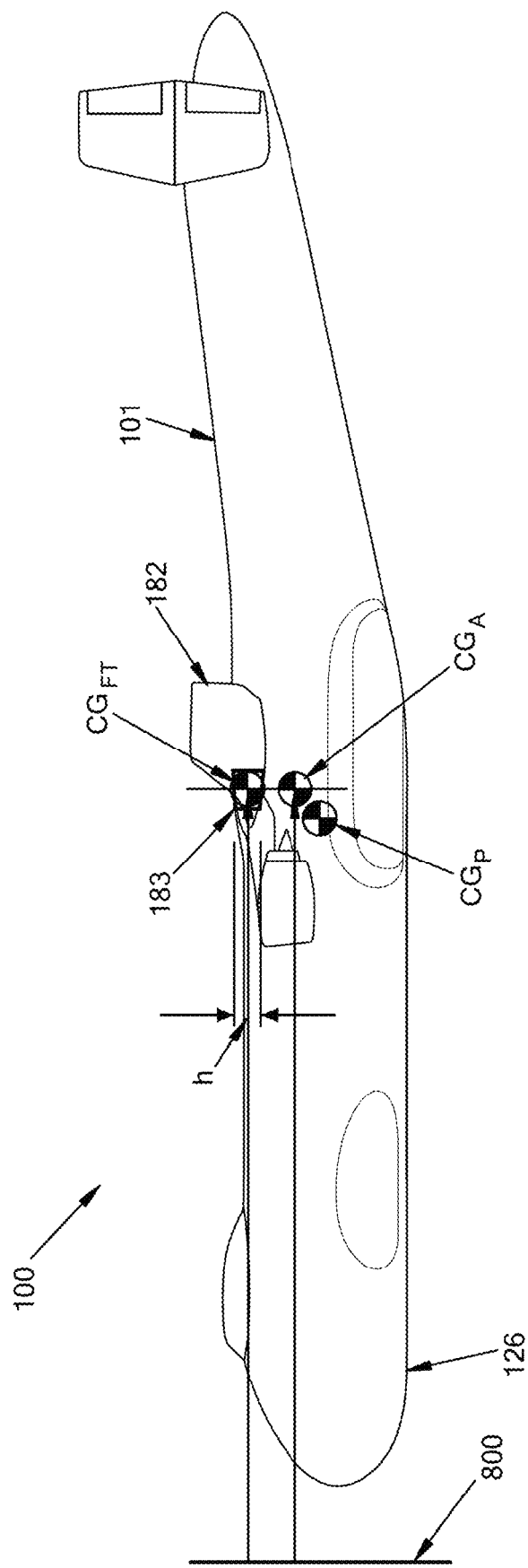
FIG. 8C is a side, transparent view of the aircraft of FIG. 8B, illustrating a payload center of gravity, fuel centers-of-gravity, and a net aircraft center of gravity.
Figure 8D:
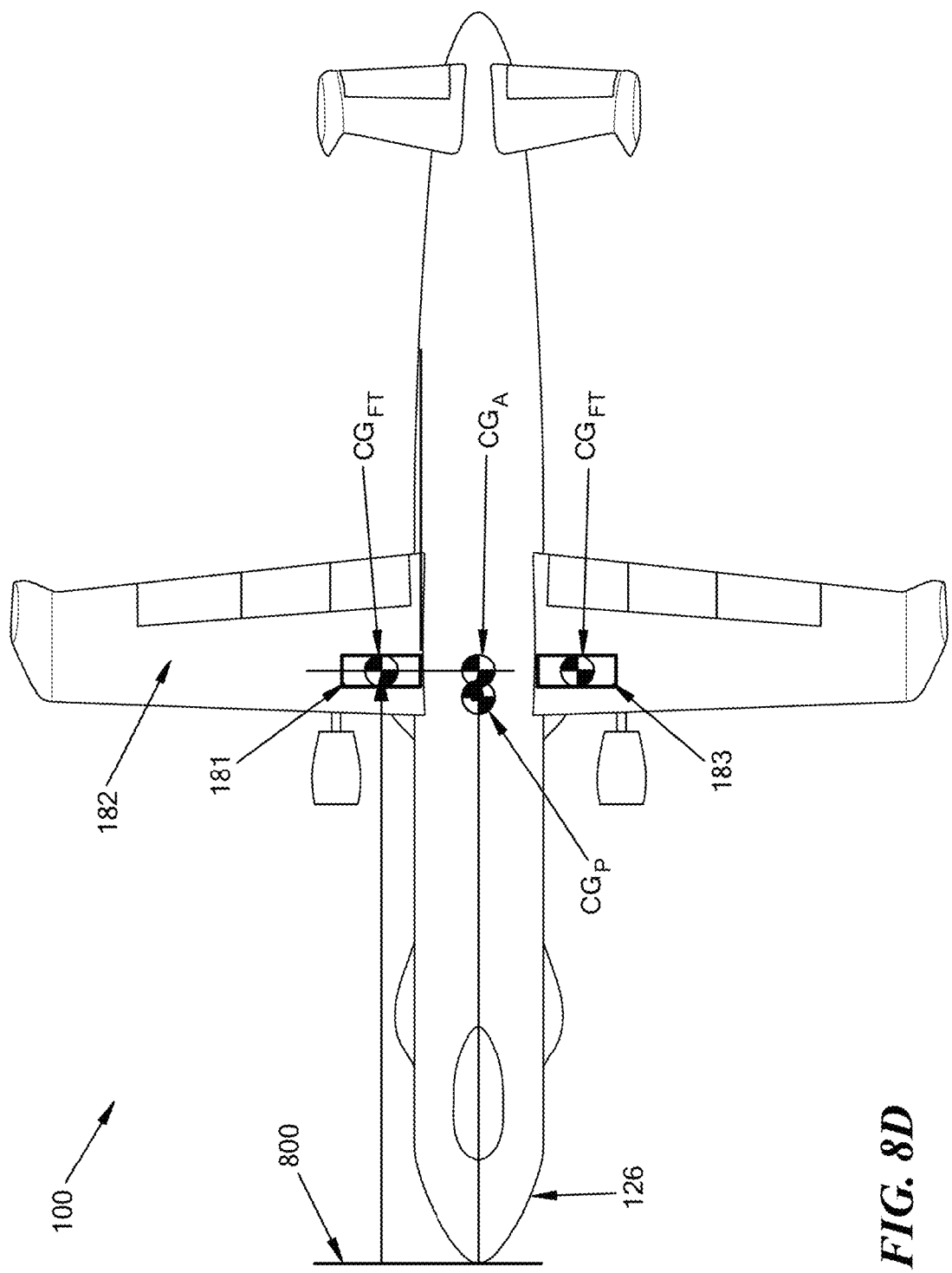
FIG. 8D is the top, transparent view of the aircraft of FIGS. 8B and 8C, illustrating the payload center of gravity, the fuel centers-of-gravity, and the net aircraft center of gravity.

FIGS. 8C and 8D illustrate the locations of CGs for each of the aircraft 100, the fuel tanks 181, 183, and a possible payload, such as the payload 10 or other payloads provided for herein or otherwise able to be disposed in aircrafts of the present disclosure. As shown, a $CG_{FT}$ of each fuel tank 181, 183 is disposed at an approximate centroid of the respective tanks 181, 183, i.e., centered laterally (see FIG. 8D) and longitudinally (see FIG. 8C). Each $CG_{FT}$ can likewise be aligned laterally with a $CG_A$ of the aircraft 100 (see FIG. 8D), as well as longitudinally and vertically with the $CG_A$ of the aircraft 100 (see FIG. 8C). The $CG_A$ of the aircraft 100 can be a net CG for the aircraft 100, meaning that it can be altered by adding or subtracting masses within the fuselage 101 or the like. The CGs of the fuel tanks 181, 183 and the aircraft 100 are stationary, although they can be changed, by way of non-limiting examples, by changing an amount of fuel in the tanks and or including a ballast in the fuselage 101, as discussed further below. Of course, alternative designs can include moving the fuel tanks 181, 183 to a different location or changing the overall configuration of the aircraft such that it changes the location of the $CG_A$.

A $CG_P$ of a payload, such as the payload 10, is also illustrated. Obviously the location of the $CG_P$ will depend at least on the size, shape, and distribution of mass of the payload, but the general goal of the present disclosure is to try and get the payload $CG_P$ to be coincident with the aircraft $CG_A$, or at least as close as possible. At least as close as possible can include within about 10% of each other. Generally the payload $CG_P$ is longitudinally aligned with the aircraft $CG_A$ (see FIG. 8D), with the payload being disposed substantially along the forward centerline $C_F$ and, as appropriate depending on at least a length and overall shape of the payload, the aft centerline $C_A$. Various non-limiting embodiments illustrating payloads including one, two, three, and four wind turbine blades are discussed below and illustrated with respect to FIGS. 11A-14C.

As illustrated in FIGS. 8C and 8D, a datum 800, defined as a yz plane passing through the origin of the aircraft fuselage-fixed coordinate frame, is a reference frame provided to help determine the impact of fuel load on the net aircraft fore-aft CG, if any. The net aircraft fore-aft CG is the linear distance in the x direction measured from the datum plane 800 to the net aircraft $CG_A$. As shown, the aircraft frame +x points aft, +y points out the wing 182, and +z points up. The origin is a point in space ahead and below the nose 126 of the aircraft 100, on the forward centerline $C_F$, as shown in FIG. 8D. Because the $CG_{FT}$ is the same distance aft of the datum 800 as the aircraft $CG_A$, the resulting net aircraft fore-aft CG is generally unaffected by fuel load.

Figure 9:
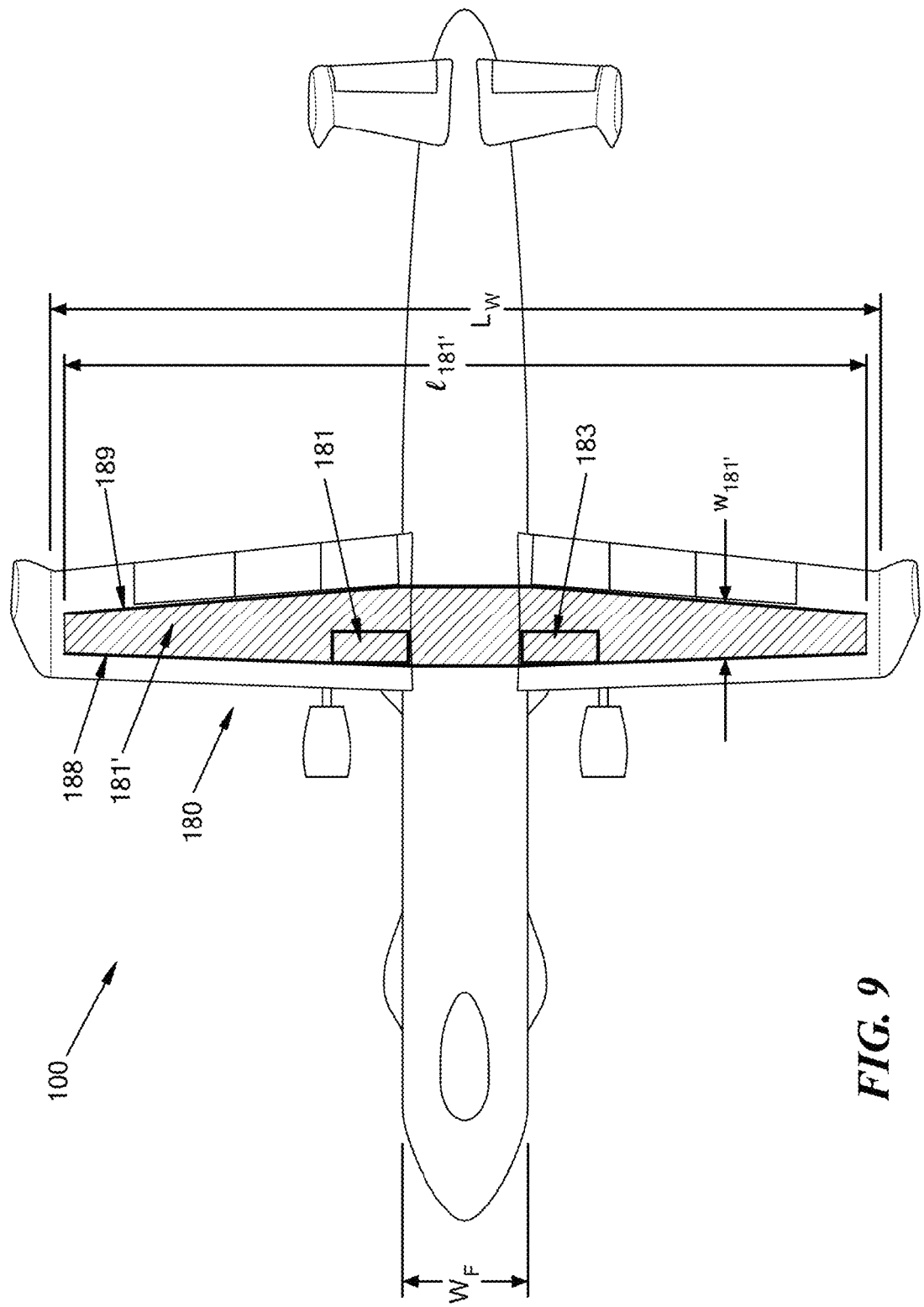
FIG. 9 is the top, transparent view of the aircraft of FIG. 8B, further illustrating a typical fuel tank location for prior art aircraft.

FIG. 9 illustrates a location of where a typical fuel tank 181' would be disposed within the wing span 180 of the aircraft 100 based on prior art aircraft teachings, thus allowing for a visual comparison of the amount of cross-sectional area consumed by the fuel tanks 181, 183 as compared to the typical fuel tank 181' of the prior art. As shown, the typical fuel tank 181' is disposed through an entire cross-sectional area between the forward and aft spars 188, 189 when the aircraft 100 is viewed from above. The fuel tank 181' extends longitudinally between the forward and aft spars 188, 189, defining a width W 181' of the fuel tank 181', across an entire lateral length $L_W$ of the wing span 180, and as shown is even disposed within the lateral width $W_F$ of the fuselage 101. The width W 181' changes across the lateral length $L_W$ due to the spars 188,189 not being fully perpendicular to the forward centerline $C_F$. A person skilled in the art would consider the fuel tank 181' to be disposed approximately from wing tip 182t to wing tip 184t of the first and second wings 182, 184, defining a length $l_{181'}$ of the fuel tank 181'. The height h (FIG. 8C) of the fuel tanks 181, 183 compared to a height (not illustrated) of the fuel tank 181' can also be different, or they can be similar. The heights naturally impact the amount of volume consumed by the fuel tanks 181, 183, 181', but have less of an impact on the $CG_A$ of the aircraft than the lengths and widths of the fuel tanks 181, 183, 181'.

A combined available fuel volume for the aircraft 100 can be considered a volume of space that is useable within the wingspan 180. A person skilled in the art will recognize what constitutes useable space, but it can include volume within the wingspan 180 that is not already being used for some other purpose and where a fuel tank can be disposed. The fuel tank 181' is representative of an available useable volume for the wingspan 180. Generally, a combined available fuel volume for the aircraft 100 can be approximately in the range of about 500 cubic meters to about 550 cubic meters (although these numbers may be lower once landing gear bays, dry bays for routing or avionics, and/or volumes occupied by ribs and spar caps/flanges are accounted for in the measurement), where the length $L_W$ of the wingspan 180 is approximately in the range of about 70 meters to about 80 meters and a width $W_W$ of the wingspan is approximately in the range of about 10 meters to about 14 meters. Despite having combined available fuel volumes of that size, the aircraft 100 only uses a small fraction of the available fuel volume, approximately in the range of about 10 percent to about 20 percent, for example, in some instances it is approximately 30 percent or less, approximately 25 percent or less, approximately 20 percent or less, approximately 15 percent or less, or approximately 10 percent or less. Accordingly, a combined fuel volume of the fuel tanks 181, 183 of the aircraft 100 can be approximately in the range of about 50 cubic meters to about 75 cubic meters. In some embodiments, the amount of fuel carried by the aircraft 100 can be approximately in the range of about 80,000 lbm to about 120,000 lbm, dependent, at least in part, upon engine selection and other factors known to those skilled in the art. These numbers can be parsed on a per-wing basis as well by a person skilled in the art, although that does not appear to be the typical way fuel volume is calculated in the art.

Center of Gravity

Figure 10:
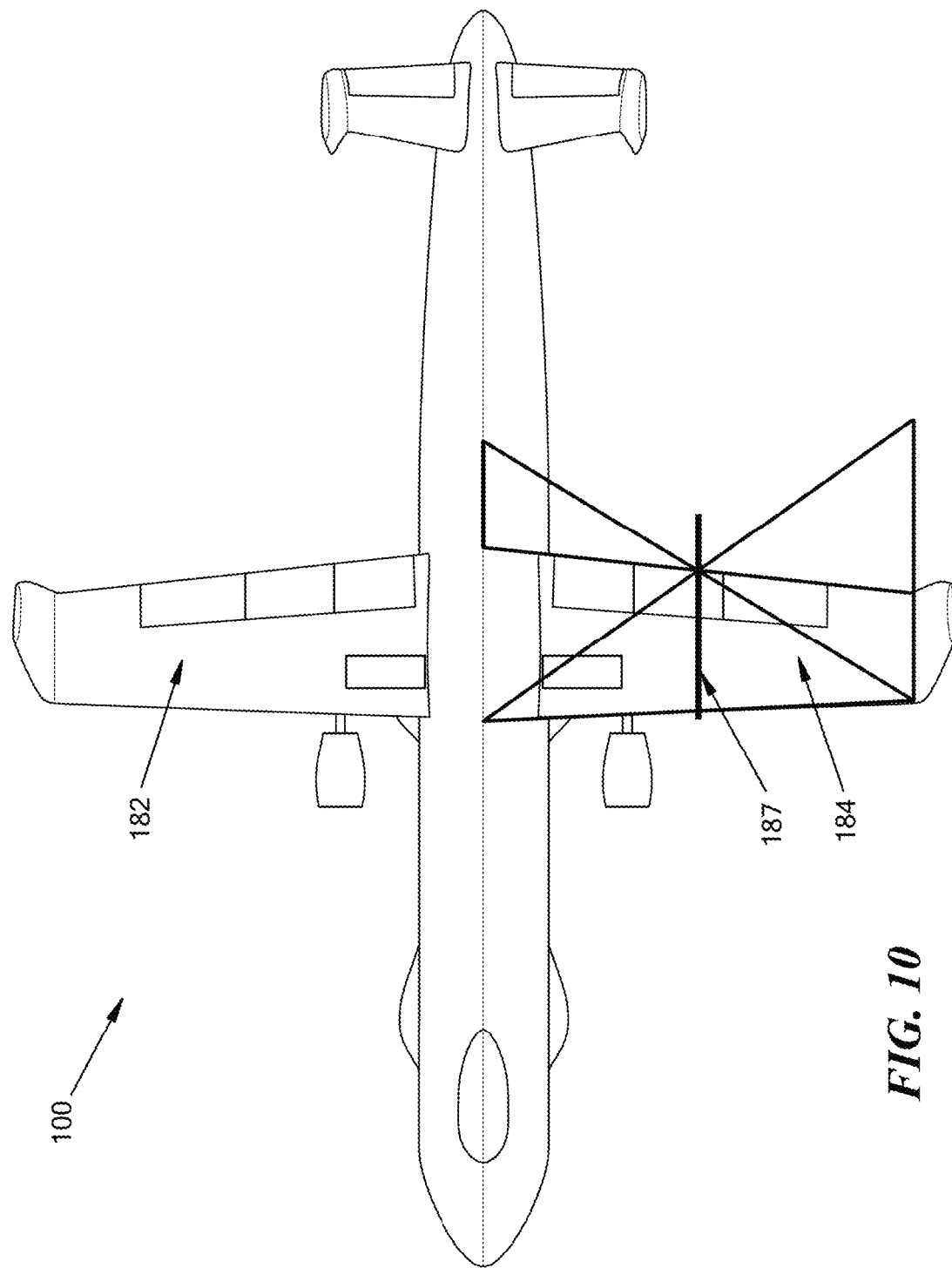
FIG. 10 is the top, transparent view of the aircraft of FIG. 8B, further illustrating a mean aerodynamic chord (MAC)

FIG. 10 illustrates a geometric parameter that is used in making CG assessments, a Mean Aerodynamic Chord (MAC) 187 of the wing 184 of the aircraft 100. A MAC exists for the wing 182 as well. More generally, a chord is the distance between the leading and trailing edge of a wing. While a standard mean chord (SMC) is defined as an area of a wing divided by a span of the wing, such a chord generally only exists if a wing is rectangular. In most aircrafts, including the aircraft 100, the chord of the wing changes along its span. This can be due, for example to tapering and/or the wing being swept. The MAC accounts for a more typical wing geometry by determining an effective average chord length of the wing. A person skilled in the art will understand how to calculate the MAC, so illustrating how to do so is unnecessary. The MAC is relevant to the discussion of CG, though, because it can be common to measure a position of a CG, like $CG_A$ or $CG_P$, relative to the MAC. For example, the location of the $CG_A$ can be the percentage of the distance from the leading edge of the MAC to the CG with respect to MAC itself.

With MAC in mind, the present disclosure provides for a range of possible locations for the payload $CG_P$ that is tighter, or more closely located, to the net aircraft $CG_A$. The location of the payload $CG_P$ is said to be proximate to the aircraft $CG_A$ when this range, or the tolerances, are adhered to when placing the payload in the cargo bay. This achieves an acceptable vehicle CG, as will be recognized by a person skilled in the art, in view of the present disclosures. These values can be expressed as a fraction of the MAC 187. For example, the present design of the aircraft 100 is such that the range, or tolerance, of possible locations for the $CG_P$ with respect to the $CG_A$ can be about 25%+/− about 5% MAC, meaning the $CG_P$. Stated another way, the range, or tolerance, of possible locations for the $CG_P$ with respect to the $CG_A$ can be approximately in the range of about 20% MAC to about 30% MAC. By way of comparison, aircraft in the prior art typically have a tolerance of about 25%+/− about 10% MAC or even about 25%+/− about 15% MAC, or approximately in the range of about 10% MAC to about 40% MAC. The smaller range of locations afforded by the present disclosure is intentional, and a result of specific engineering and design choices made to help, for example, simplify aircraft design, construction, and testing. These tighter tolerances are not a result of the inherent size of the aircraft 100, i.e., just because the lengths are longer, and widths are bigger, for the aircraft 100 as compared to aircraft in the prior art does not mean that the resulting percentages of the MAC are less.

FIGS. 11A-14C provide illustrations of non-limiting embodiments of payloads that can be disposed in the interior cargo bay 170 of the fuselage 101 of the aircraft 100. For each embodiment, a CG associated with each of the fuel ($CG_F$), the net aircraft ($CG_A$), and the payload ($CG_P$) are illustrated. Although the same reference numerals are used for the payload 10 and the CGs, it is clear from the illustrations and descriptions that the payloads 10 are different with respect to FIGS. 11A-11C, 12A-12C, 13A-13C, and 14A-14C. More particularly, each payload 10 includes at least one wind turbine blade 11A, 11B, 11C, 11D, as well as a plurality of payload-receiving fixtures 12 operable to secure a location of the blades 11A, 11B, 11C, 11D with respect to the fixtures 12 themselves, and with respect to other blades when the fixtures 12 secure more than one blade. As shown, in each illustrated embodiment, the payload 10 is generally placed along the forward centerline $C_F$ and the aft centerline $C_A$ of the fuselage 101, and thus along the forward cargo centerline $C_{FCB}$ and aft cargo centerline $C_{ACB}$ of the cargo bay 170. In view of the description above, such placement does not have to be exact given the tolerances permitted with respect to the MAC, but these locations for receiving the payload can be pre-established within the cargo bay 170 to ensure that the payload stays within the designed tolerances for managing the payload CG with respect to the aircraft CG. Typically these CGs will not be coincident, although they can be, but they do remain within the permitted tolerances as provided for herein. The location of the various CGs in the figures is clear from the three different views shown, and thus a detailed description about the exact location of one CG with respect to another is not necessary. The drawings speak for themselves in this regard. Nevertheless, the below description does provide some location discussions regarding the CG. Such discussions are by no means limiting, just as the illustrated figures are merely examples and not indicative of the only possible CG locations. As is clear from the present disclosures, there are many possible CG locations for the various components of the described system.

Figure 11C:
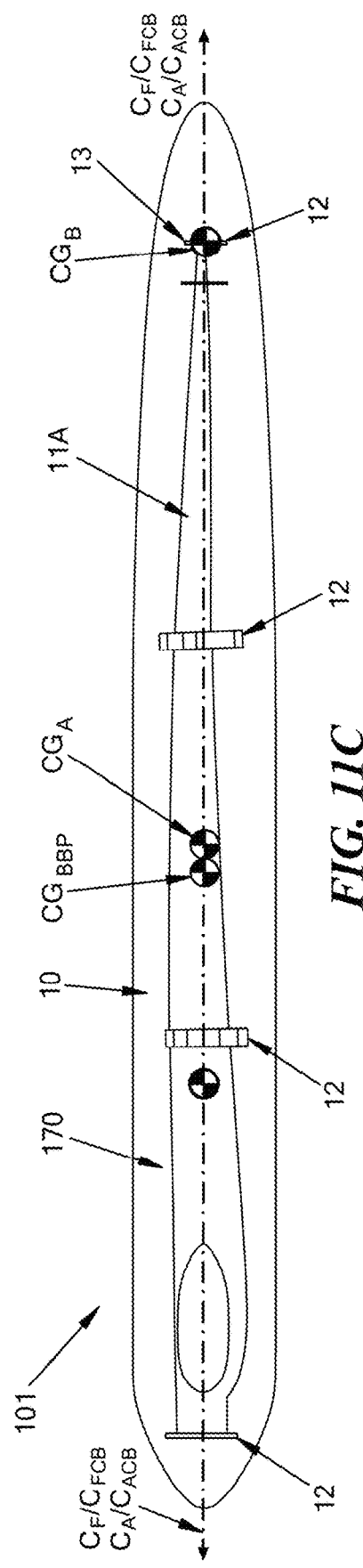
FIG. 11C is a top, transparent view of the fuselage, payload, and ballast of FIG. 11B.

As shown in FIGS. 11A-11C, the payload 10 is a single blade 11A disposed in the cargo bay 170 of the fuselage 101, the blade 11A being secured by various fixtures 12. Because of the irregular size and shape of the single blade 11A, and not having any other blades as part of the payload 10 to help counterbalance the blade 11A, a ballast 13 is provided. The ballast 13, or ballasts, can be provided as part of the payload 10 itself, as shown disposed at a distal tip 11At of the blade 11A. Alternatively, or additionally, one or more ballasts can be provided within the confines of the fuselage 101 itself, such as in the aft end 140 of the fuselage 101, proximate to the fuselage tail cone 142, to alter the $CG_A$ of the aircraft. The $CG_P$ of the payload 10 irrespective of the ballast 13 is illustrated to show how far the $CG_P$ would be with respect to the $CG_A$ of the aircraft 100. However, factoring in a $CG_B$ of the ballast 13, which is naturally disposed at the location of the ballast 13, the $CG_{BBP}$ of total payload including the blade 11A and the ballast 13 is proximate to the $CG_A$ of the aircraft, as shown slightly forward of the aircraft $CG_A$. That is, as shown, the location of the total payload $CG_{BBP}$ with respect to the $CG_A$ is about 25%+/− about 5% MAC. Although a ballast 13 is illustrated only in the one blade embodiment, one or more ballasts can be used with any number of blades and/or, more generally, with any type, size, amount, shape of payload.

Figure 12A:
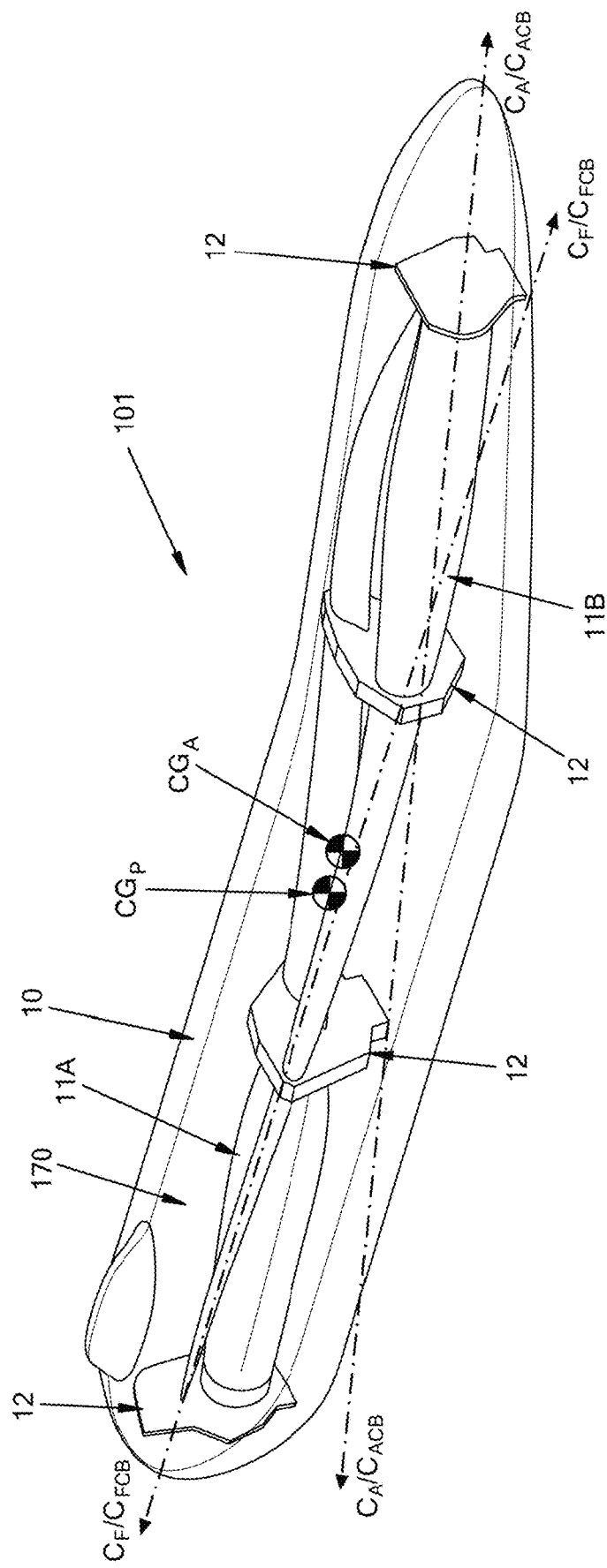
FIG. 12A is an isometric, transparent view of a fuselage of the aircraft of FIG. 1A having a payload that includes two wind turbine blades disposed therein.
Figure 12B:
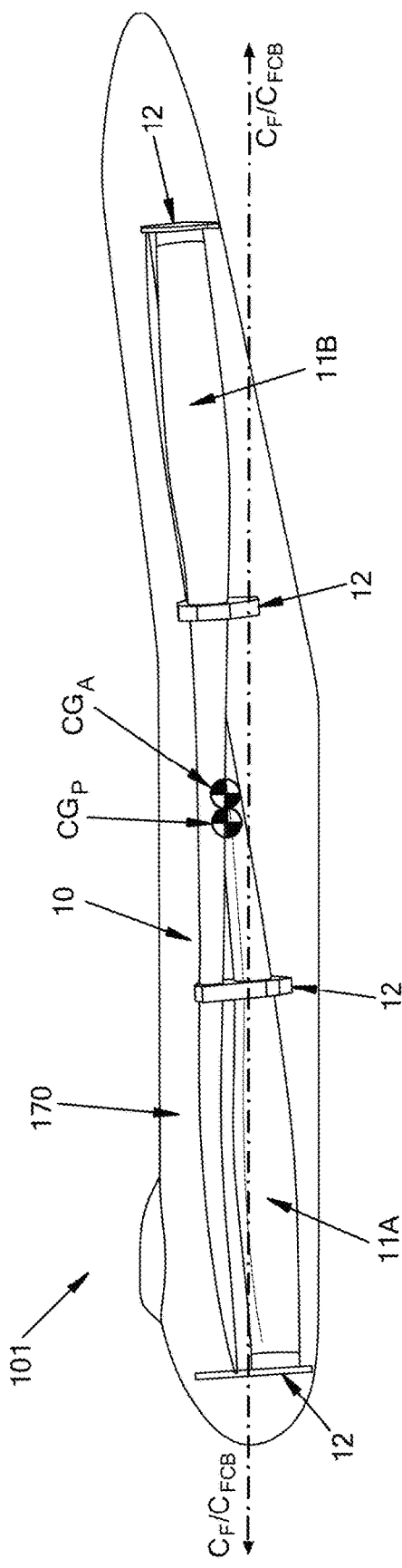
FIG. 12B is a side, transparent view of the fuselage and payload of FIG. 12A.
Figure 12C:
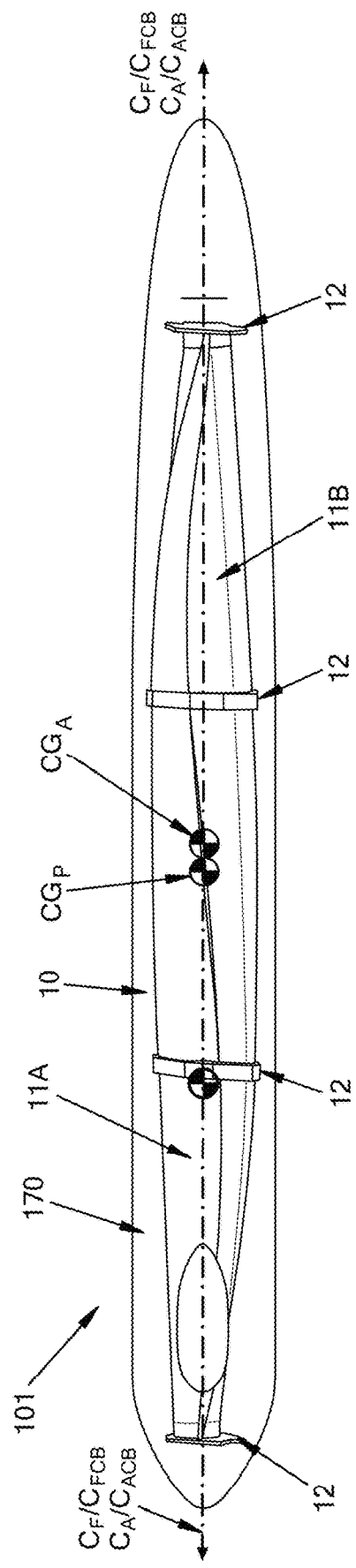
FIG. 12C is a top, transparent view of the fuselage and payload of FIG. 12B.

FIGS. 12A-12C illustrate the payload 10 with two blades 11A, 11B disposed in the cargo bay 170 of the fuselage 101, the blades 11A, 11B being secured by various fixtures 12. Unlike the previous embodiment, no ballast(s) is provided because the payload 10 has been packaged in such a manner that the payload $CG_P$ has an approximately central location (although not necessarily at a centroid of the payload 10; it can still be irregular, as set forth above). One or more ballasts can be used if desired, but are not in the present instance at least because the blades 11A, 11B are packaged in a manner that minimizes volume while keeping the payload $CG_P$ in an approximately central location. The placement of the payload 10 with respect to the cargo bay 170 is such that the payload $CG_P$ is proximate to the aircraft $CG_A$, as shown slightly forward of the aircraft $CG_A$. That is, as shown, the location of the total payload $CG_{BBP}$ with respect to the aircraft $CG_A$ is about 25%+/− about 5% MAC.

Figure 13A:
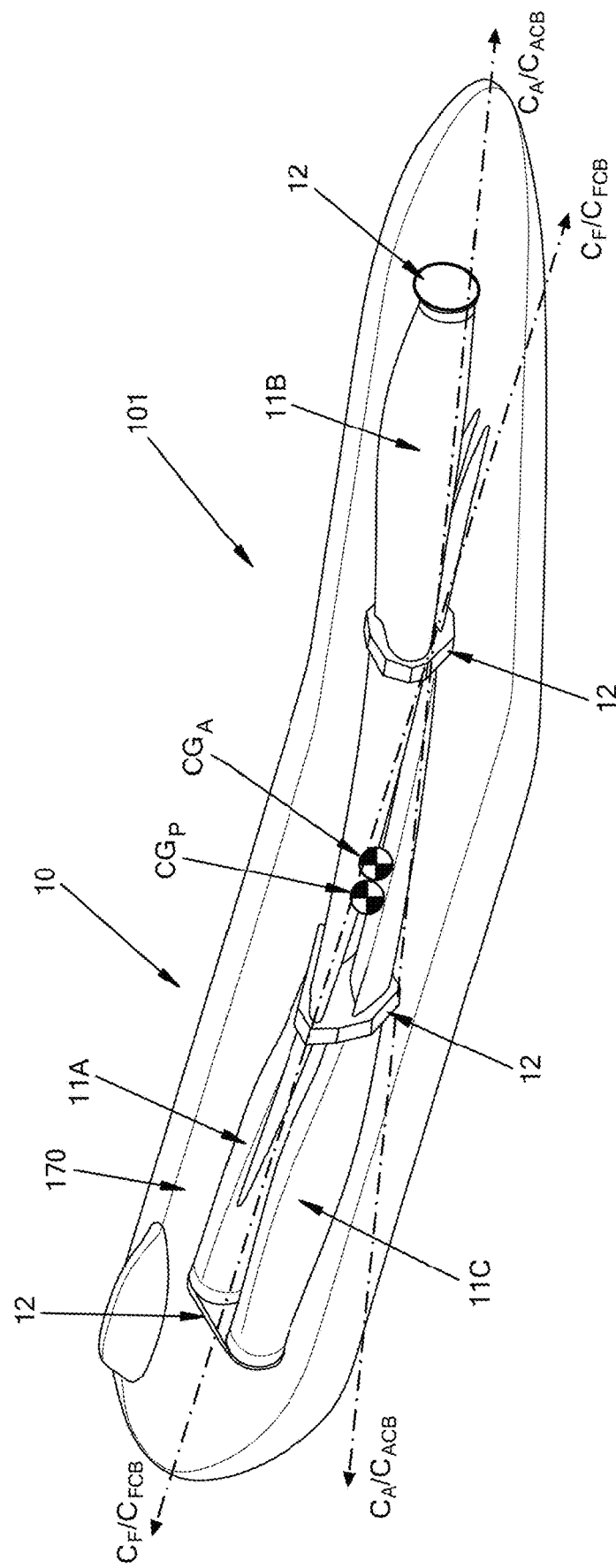
FIG. 13A is an isometric, transparent view of a fuselage of the aircraft of FIG. 1A having a payload that includes three wind turbine blades disposed therein.

The payload 10 including three blades 11A, 11B, 11C disposed in the cargo bay 170 of the fuselage 101 is illustrated in FIGS. 13A-13C, the blades 11A, 11B, 11C being secured by various fixtures 12. Again, no ballast(s) is provided, although one or more ballasts can be used if desired. None are provided in the present instance at least because the blades 11A, 11B, 11C are packaged to minimize volume while keeping the payload $CG_P$ in an approximately central location. The placement of the payload 10 with respect to the cargo bay 170 is such that the payload $CG_P$ is proximate to the aircraft $CG_A$, as shown slightly forward of the aircraft $CG_A$. That is, as shown, the location of the total payload $CG_{BBP}$ with respect to the aircraft $CG_A$ is about 25%+/− about 5% MAC.

Figure 14A:
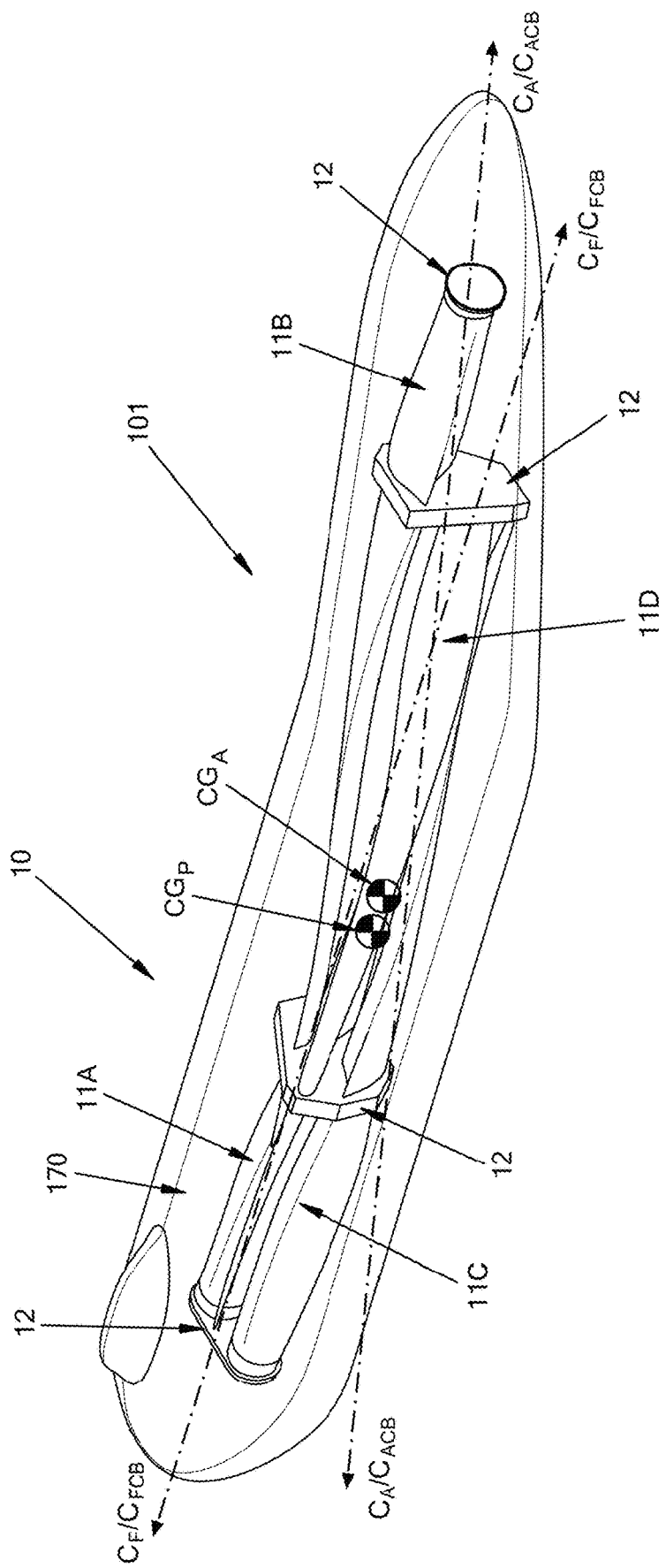
FIG. 14A is an isometric, transparent view of a fuselage of the aircraft of FIG. 1A having a payload that includes four wind turbine blades disposed therein.
Figure 14B:
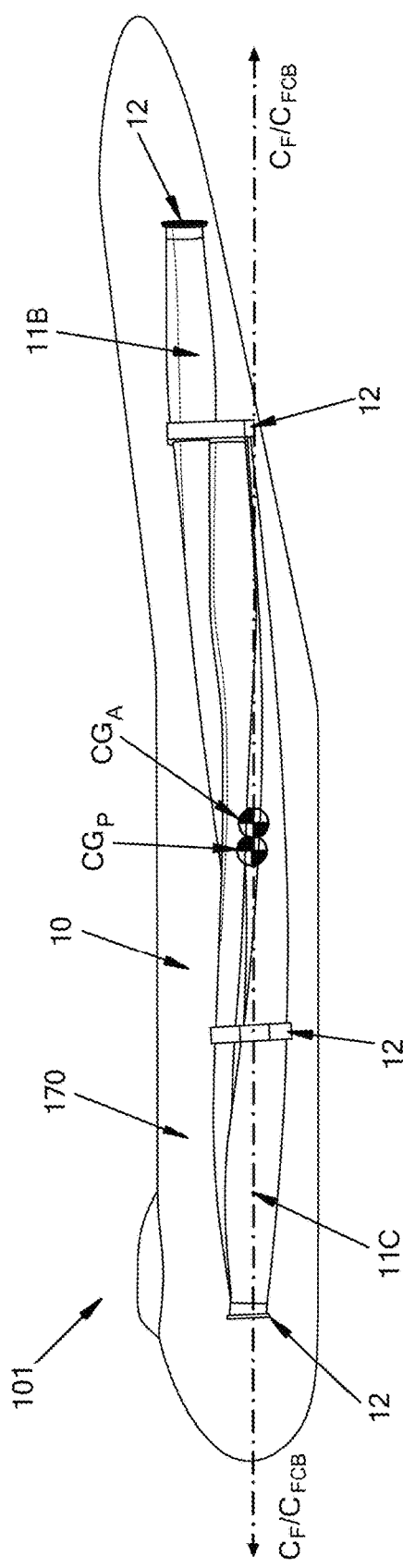
FIG. 14B is a side, transparent view of the fuselage and payload of FIG. 14A.
Figure 14C:
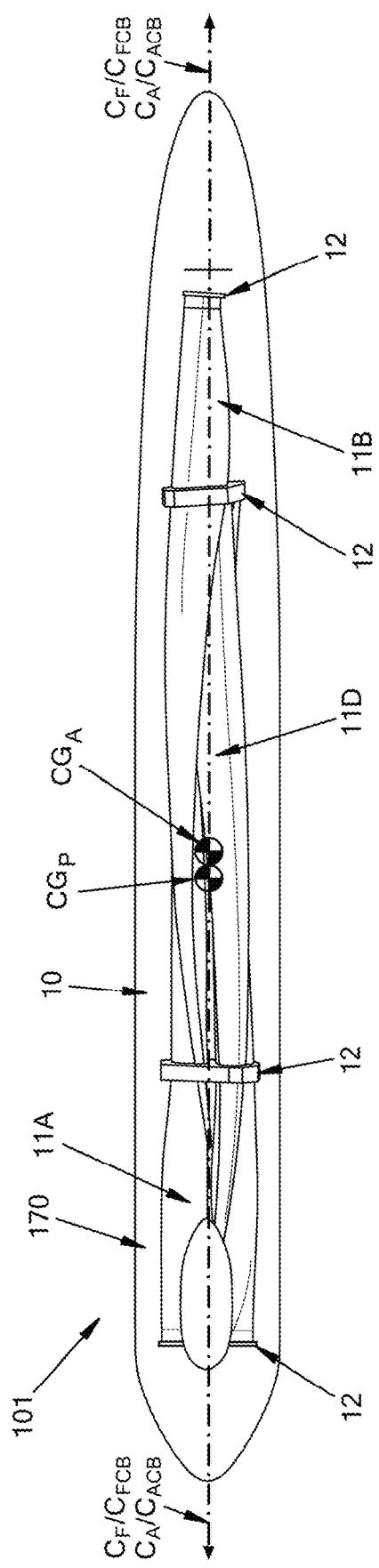
FIG. 14C is a top, transparent view of the fuselage and payload of FIG. 14B.

FIGS. 14A-14C illustrate the payload 10 with four blades 11A, 11B, 11C, 11D disposed in the cargo bay 170 of the fuselage 101, the blades 11A, 11B, 11C, 11D again being secured by various fixtures 12. Again, no ballast(s) is provided, although one or more ballasts can be used if desired. None are provided in the present instance at least because the blades 11A, 11B, 11C, 11D are packaged to minimize volume while keeping the payload $CG_P$ in an approximately central location. The placement of the payload 10 with respect to the cargo bay 170 is such that the payload $CG_P$ is proximate to the aircraft $CG_A$, as shown slightly forward of the aircraft $CG_A$. That is, as shown, the location of the total payload $CG_{BBP}$ with respect to the aircraft $CG_A$ is about 25%+/− about 5% MAC.

Figure 15:
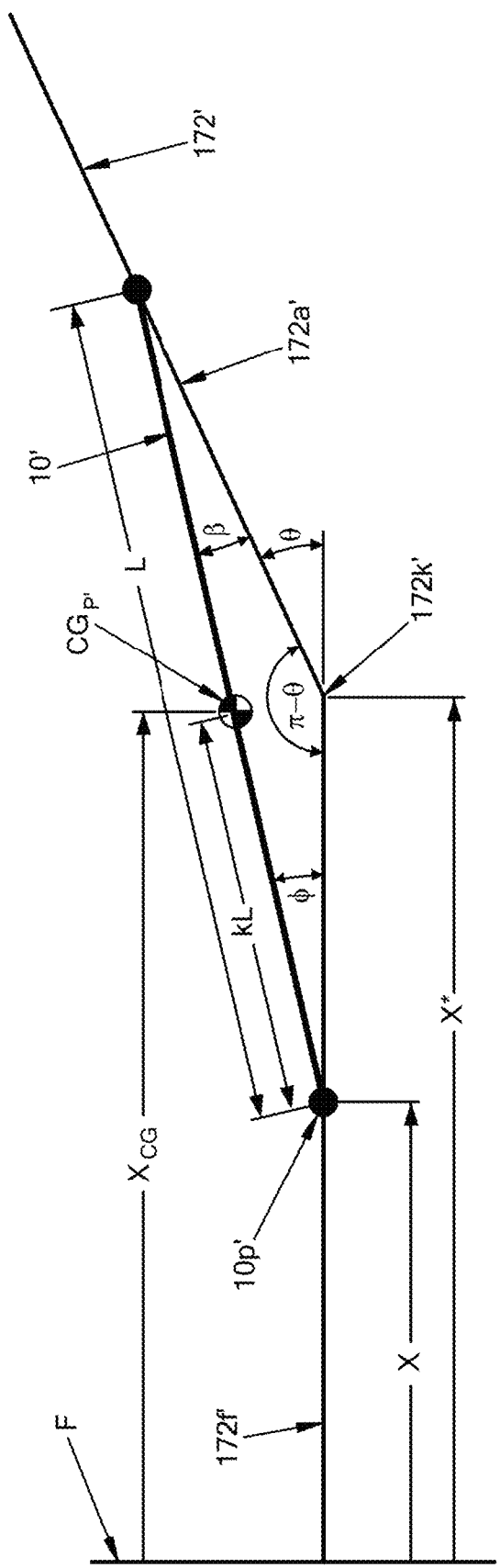
FIG. 15 is a schematic side view of a payload disposed on a sloping surface, the sloping surface being representative of a sloping surface of cargo bay floor of the aircraft of FIG. 1A.

FIG. 15 is schematic side view of a payload 10' disposed on a sloping surface 172', the sloping surface 172' being representative of a sloping surface of the cargo bay floor 172 of the aircraft 100. As shown, the $CG_{P'}$ of the payload 10' having a length L is illustrated as being a distance kL from a proximal terminal end 10p' of the payload 10', which can be, but does not have to be, at the centroid of the payload 10'. As discussed herein, for irregular packages, those two are not typically coincident. The schematic provided in this figure, however, is generally symmetrical, and thus the two appear to be coincident (recognizing that this is a 2D illustration, so the centroid would be more applicable to the 3D version of this figure). Accordingly, in the illustrated embodiment, k is approximately ½. An angle Φ is illustrated as the angle formed by a forward end 172f' of the sloping surface 172', an angle β as the angle formed by an aft end 172a' of the sloping surface 172', and an angle Θ as the angle formed between a longitudinal axis that extends through and beyond the forward end 172f' and the aft end 172a'. A distance from a reference plane F forward of or at the beginning of the forward end 172f' and the proximal terminal end 10p' of the payload 10' is denoted as x, which changes as the payload 10' moves away from the reference plane F, such as when the payload 10' is loaded onto an aircraft like those of the present disclosures. A distance from the reference plane F to the location where the forward end 172f' transitions to the aft end 172a', i.e., at a kinked portion 172p', is denoted as x*. This distance generally remains stationary unless the aircraft itself is moved or if the equivalent floor can move such that the kinked portion 172p' location can be adjusted. A distance from the reference plane F to the location of the payload $CG_{P'}$ is denoted as $x_{CG}$, which, like x, changes as the payload 10' moves away from the reference plane F. It is the variable $x_{CG}$ that is the variable that needs to be solved for when trying to manage the location of the payload CG with respect to the aircraft CG.

Using the law of sines, the angle β is found to be arcsin(((x*−x)/L)*sin(π−Θ)). More particularly:

$$L/\sin(\pi-\Theta)=(x^*-x)/\sin(\beta)$$

$$\sin(\beta)=((x^*-x)/L)*\sin(\pi-\Theta)$$

$$\beta=\arcsin(((x^*-x)/L)*\sin(\pi-\Theta))$$

The angle β can be used to solve for the angle Φ, which in turn can be used to solve for $x_{CG}$. More particularly:

$$\Phi=\pi-(\pi-\Theta)-\beta$$

$$\Phi=\Theta-(\arcsin(((x^*-x)/L)*\sin(\pi-\Theta)))$$

$$x_{CG}=x+kL\cos(\Phi)$$

As x goes to x*, the angle β goes to 0 and the angle Φ goes to the angle Θ. Accordingly:

$$x\leq(x^*-L):\Phi=0$$

Further, by accounting for the angle Φ while determining the location of the payload CG, the determination is being made by accounting for a rotation that occurs while the payload 10' is being loaded. This is different than the type of calculations typically done with respect to loading aircrafts, where the CG calculation is entirely based on a moment arm and mass of the payload; there is no accounting for rotation of the payload, which, as demonstrated above with respect to FIG. 15, occurs, for example, in response to the payload being moved up the aft end 172a' of the sloping surface 172'. The accounting for the rotation can be performed prior to loading and/or can be performed in real-time, as the loading is occurring.

Figure 16:
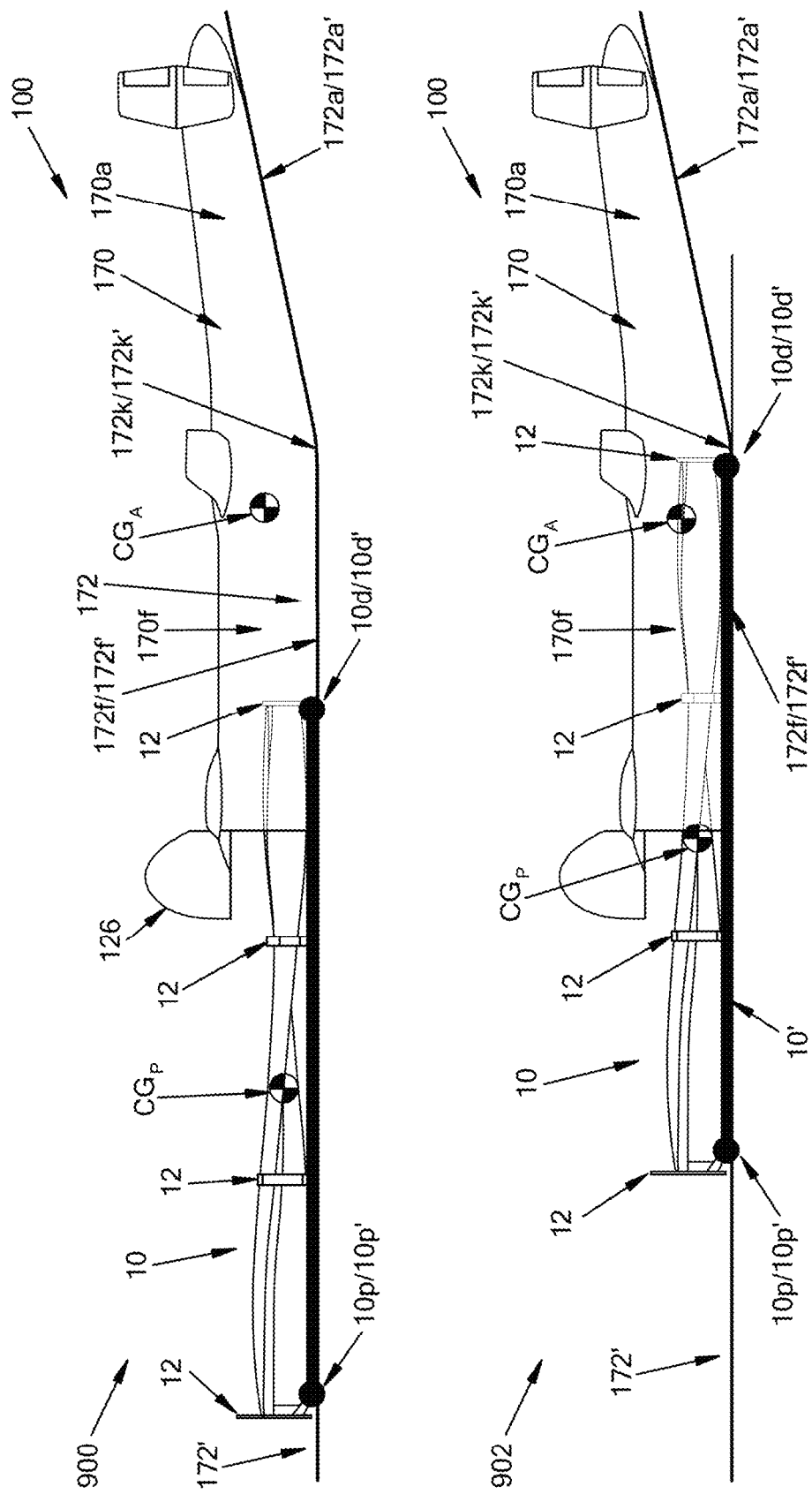
FIG. 16 is a schematic, sequential side, transparent view of the payload from FIG. 12A being loaded into the aircraft of FIG. 1A.
Figure 16:
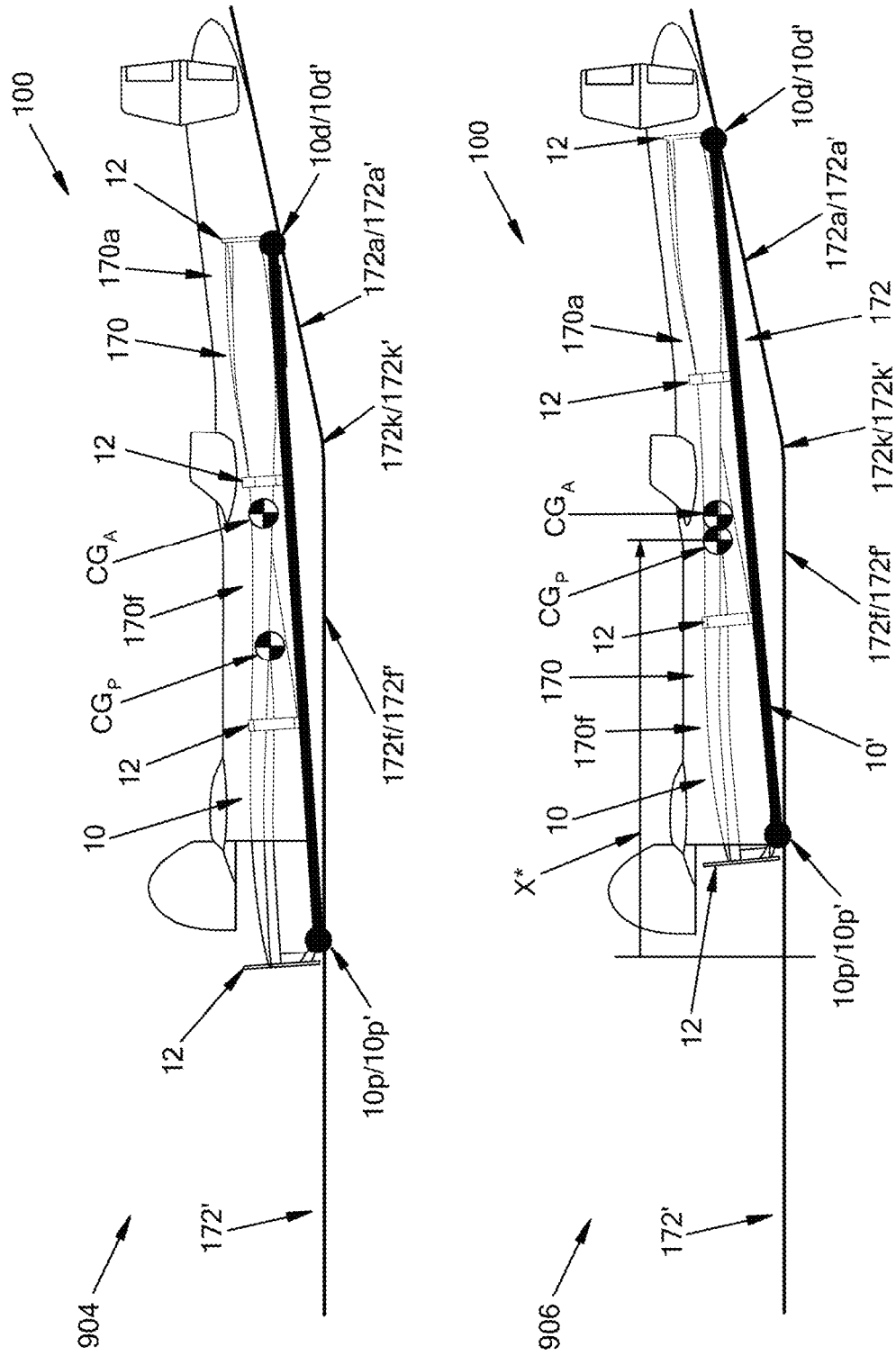

The equivalent of what is schematically illustrated in FIG. 15 is shown in FIG. 16 with respect to the aircraft 100 using the payload 10 from FIGS. 12A-12C with the payload 10' overlaid on the payload 10 and the sloping surface 172' overlaid on, and extending past, the floor 172 for illustrative purposes. In step 900, with the cargo nose door 126 in the open position, the payload 10, 10' is advanced into the cargo bay 170 using, for example, techniques known to those skilled in the art. For example, the distal-most fixture 12 may be coupled to a rail (not visible) and then the payload 10, 10' slid or otherwise translated towards the aft region 170a of the cargo bay 170 of the aircraft 100. The distal-most fixture 12, and thus a distal end 10p, 10p' of the payload 10, 10', continues to advance along a forward end (not visible) of the rail, and thus a forward end 172f/172f of the floor 172/sloping surface 172', until it reaches the kinked portion 172k/172k' of the floor 172/sloping surface 172'.

The arrival of the payload 10, 10' at the kinked region 130 is shown in step 902. Once at the kinked region 130, the payload 10, 10' may continue to be advanced, but the distal end 10p, 10p' of the payload 10, 10', no longer translates only longitudinally along the rail and floor 172/sloping surface 172', instead moving at the angle β as it advances distally into the aft region 170a of the cargo bay 170. This continued advancement is illustrated in step 904. As shown in step 904, fixtures 12, such as the two middle fixtures of the four illustrated, are now disposed a vertical distance further from the floor 172/sloping surface 172' than when the payload 10, 10' was only translating longitudinally around the floor 172/sloping surface 172'. As described with respect to FIG. 15, the payload 10, 10' rotates while traveling along an aft end 172a/172a' of the floor 172/sloping surface 172', and thus determining where to move the payload 10, 10' so that the payload $CG_P$ is at a location that is desirable, i.e., the location x*, with respect to the aircraft $CG_A$ can be more accurately achieved by accounting for the rotation. As an irregular payload, like the payload 10, rotates, it may cause the location of the payload $CG_P$ to change, and so failing to account for it will result in a less accurate determination of placement of the payload 10/10'. The present disclosure provides for a solution to this issue—by accounting for the rotation of the payload 10/10' in the determination of where the payload 10/10' should be placed within the interior cargo bay 170.

As shown in step 906, the payload 10/10' can continue to be advanced distally into the aft region 170a of the cargo bay 170 until the payload $CG_P$ reaches the distance defined as x*, the determined position for the payload $CG_P$ as measured from the reference plane F. Once in its desired location, the payload 10/10' can be secured at the designated location using techniques known to those skilled in the art or otherwise provided for herein. The determination of where this desired location is can be denoted by various designated markers. For example, one or more visual and/or tactile markers or markings can be placed within the cargo bay 170 at a location where the distal and/or proximal ends 10d, 10p of the payload 10 is to be positioned to place the payload $CG_P$ at the distance x*. Such designated markers can be placed on various surfaces within the cargo bay 170, and can be used consistently when the payload is consistent, i.e., it is the same payload as previous payloads, packaged in the same manner so that the payload $CG_P$ is consistent. The designated markers can be used for any payload that has similar dimensions and location of the payload $CG_P$. In view of the disclosures above, the markers can be help in positioning the payload $CG_P$ with respect to the $CG_A$ such that it is about 25%+/− about 5% MAC.

In some instances, various markings can be placed in the cargo bay to denote various packages. For example, there may be markings for a payload that includes a single wind turbine blade, separate markings for a payload that includes two wind turbine blades, further separate markings for a payload that includes three wind turbine blades, and so forth. Some of the markings can be used for multiple types of payloads, while other markings may be specifically designed for one type of payload. As discussed throughout this application, other types of payloads are possible, and thus other markings for such payloads are also possible. Exemplary designated markers for use with the types of heavy payloads accounted for in the present disclosure include, but are not limited to: visual markings on the floor 172, sidewall, rail(s), and/or ceiling of the interior cargo bay 170, raised surfaces that provide tactile feedback when the payload makes contact with the same, payload fixture stops, payload fixture latches or pins or other devices configured to stop the payload in the desired location, laser sighting lines through the payload or fixtures associated with the payload, plumb bob or liquid drop centering features on the payload or fixtures associated with the payload, circuit-closing or circuit-opening features between the cargo bay and payload or fixtures associated with the payload, proximity sensor(s) or trip sensor(s) or laser-line-of-sight breaking features integrated into the cargo bay, and/or other parts of the aircraft that may be triggered by specific features upon the payload or fixtures associated with the payload, among other systems, devices, and methods. These designated markers, or cues, can always be present by virtue of being pre-formed on surfaces, or alternatively, they can be selectively deployed. For example, with respect to raised surfaces, the raised surfaces can be coupled to the floor prior to loading the payload and/or can be selectively raised through the floor (or other locations where they may be located), or otherwise exposed, so that they do not impede the stowing of payloads that are not supposed to contact such surfaces. Even such markers that can be selectively deployed can be considered pre-formed in that they are already in place and/or placed prior to setting the payload at the desired location. It is noted that even though the present disclosure describes the management of CG during loading with respect to loading the payload from forward to aft, in alternative embodiments, the loading can be achieved through an aft opening. A person skilled in the art, in view of the present disclosures, will understand how to adapt the present teachings for such loading.

One skilled in the art will appreciate further features and advantages of the disclosures based on the provided for descriptions and embodiments. Accordingly, the inventions are not to be limited by what has been particularly shown and described. For example, although the present disclosure provides for transporting large cargo, such as wind turbines, the present disclosures can also be applied to other types of large cargos or to smaller cargo. Further, the present disclosure can provide for a transport system capable of managing center of gravity by including aircraft as provided in combination with the packaging and/or the payload (e.g., wind turbine blades). That is, the system includes the aircraft, packaging, and/or payload because of their inter-compatibility in view of the present disclosures. All publications and references cited herein are expressly incorporated herein by reference in their entirety.

Examples of the above-described embodiments can include the following:
1. A method of loading one or more blades of one or more wind turbines onto a cargo aircraft, comprising:
passing a package that includes one or more blades of one or more wind turbines into an interior cargo bay defined by a fuselage of a cargo aircraft; and
securing the package at a location within the interior cargo bay such that a center of gravity of the package is located proximate to a center of gravity of the cargo aircraft.
2. The method of claim 1, wherein located proximate to a center of gravity of the cargo aircraft further comprises being located within about 25%+/− about 5% MAC of the cargo aircraft.
3. The method of claim 1 or 2, wherein passing the package into the interior cargo bay further comprises:
passing the package through an opening formed in a forward end of the cargo aircraft due to a cargo nose door being opened with respect to a main section of the fuselage.
4. The method of any of claims 1 to 3, wherein passing the package into the interior cargo bay further comprises:
sliding the package along one or more rails disposed in the interior cargo bay to reach the location at which the package is to be secured, the one or more rails extending from a forward end to an aft end of the cargo aircraft.
5. The method of claim 4,
wherein at least one rail of the one or more rails includes a kinked portion such that a vertical distance between at least a portion of the at least one rail aft of the kinked portion and a plane defined by an interior bottom contact surface of the interior cargo bay in the forward end of the cargo aircraft that is substantially parallel to a centerline of the forward end of the cargo aircraft is greater than a vertical distance between at least a portion of the at least one rail forward of the kinked portion and the plane defined by the interior bottom contact surface of the interior cargo bay in the forward end of the cargo aircraft, and
wherein the sliding further comprises sliding the package along at least a portion of the at least one rail that is aft of the kinked portion.
6. The method of claim 4 or 5,
wherein at least one rail of the one or more rails extends continuously along an interior bottom contact surface of the cargo bay from the forward end of the cargo aircraft to the aft end of the cargo aircraft, and
wherein the sliding further comprises sliding the package along at least a portion of the at least one rail that is disposed in the aft end of the cargo aircraft.
7. The cargo aircraft of any of claims 4 to 6, wherein at least one rail of the one or more rails further serves as a primary structural beam of the cargo aircraft.
8. The method of any of claims 1 to 7, further comprising:
packaging the one or more blades to form the package, the package having the substantially same center of gravity of the package each time the a new one or more blades is packaged.
9. The method of claim 8, wherein packaging the one or more blades to form the package further comprises:
coupling a plurality of payload-receiving fixtures to each blade of the one or more blades, the plurality of payload-receiving fixtures securing a location for each blade of the one or more blades with respect to each payload-receiving fixture of the plurality of payload-receiving fixtures in which the respective blade is received and with respect to each other blade of the one or more blades.
10. The method of claim 9, wherein coupling the plurality of payload-receiving fixtures to each blade of the one or more blades, comprises:
for at least one payload-receiving fixture of the plurality of payload-receiving fixtures, coupling together a plurality of pieces that form the at least one payload-receiving fixture to couple the at least one payload-receiving fixture to each blade of the one or more blades.
11. The method of 9 or 10, further comprising:
selecting each payload-receiving fixture of the plurality of payload-receiving fixtures that is coupled to each blade of the one or more blades based on a pre-designation for that payload-receiving fixture that designates at least one of a type of package in which each payload-receiving fixture is configured to be used or one or more locations along each blade of the one or more blades that payload-receiving fixture is configured to be used, the type of package comprising various configurations of the one or more blades that depend on at least one of dimensions of the one or more blades or shape of the one or more blades.

12. The method of any of claims 1 to 11, further comprising: positioning the package at the location using one or more pre-formed markings in the interior cargo bay, the one or more pre-formed markings being located such that the one or more pre-formed markings designate the location for the package at which the center of gravity of the package is located proximate to a center of gravity of the cargo aircraft.

13. The method of claim 12, wherein the one or more pre-formed markings comprise a plurality of pre-designated package markings, the plurality of pre-designated package markings comprising at least one pre-formed marking for each type of package that the interior cargo bay is configured to receive.

14. The method of any of claims 1 to 13, wherein securing the package at a location within the interior cargo bay such that a center of gravity of the package is proximate to a center of gravity of the cargo aircraft further comprises: placing one or more ballasts in the interior cargo bay to cause the center of gravity of the package to be located proximate to a center of gravity of the cargo aircraft.

15. The method of any of claims 1 to 14, further comprising: calculating the location within the interior cargo bay at which the center of gravity of the package is located proximate to a center of gravity of the cargo aircraft based on each of one or more moments of the package, a mass of the package, and an amount of rotation of the package that results from a distal terminal end of the package being raised in an aft end of the interior cargo bay as the package is passed into the interior cargo bay to the location.

16. The method of claim 15, wherein the amount of rotation of the package is based on an angle formed between an aft portion of the interior cargo bay and a forward portion of the interior cargo bay.

17. The method of any of claims 1 to 16, wherein the one or more blades comprises at least two wind turbine blades.

18. The method of claim 17, wherein the at least two wind turbine blades comprises at least three wind turbine blades.

19. The method of claim 18, wherein the at least three wind turbine blades comprises at least four wind turbine blades.

20. The method of any of claims 1 to 19, wherein the package is an irregular package in which a center of gravity of the irregular package is located at a separate location than a geometric centroid of the irregular package.

21. The method of claim 20, wherein the irregular package is configured to have a compact volume.

22. The method of any of claims 1 to 21, at least one blade of the one or more blades has a length of at least about 57 meters.

23. The method of claim 22, wherein the length of the at least one blade is at least about 65 meters.

24. The method of claim 23, wherein the length of the at least one blade is at least about 75 meters.

25. The method of claim 24, wherein the length of the at least one blade is at least about 85 meters.

26. The method of claim 25, wherein the length of the at least one blade is at least about 100 meters.

27. The method of claim 26, wherein the length of the at least one blade is at least about 120 meters.

28. A method of determining a center of gravity for a payload to be disposed in a cargo aircraft, comprising: calculating one or more moments of a payload; determining a mass of the payload; and accounting for an amount of anticipated rotation of the package based on a bend angle formed between a centerline of an aft portion of a cargo bay of a cargo aircraft and a centerline of a forward portion of the cargo bay of the cargo aircraft, the aft portion and the forward portion being connected by a kinked portion of the cargo bay that defines the bend angle.

29. The method of claim 28, wherein accounting for the amount of anticipated rotation of the package based on the bend angle further comprises: determining an angle between an approximate centerline of the payload and the centerline of the forward portion of the cargo bay based on a location of a proximal terminal end of the payload.

30. The method of claim 28 or 29, wherein the payload has a length of at least about 57 meters.

31. The method of claim 30, wherein the length of the payload is at least about 65 meters.

32. The method of claim 31, wherein the length of the payload is at least about 75 meters.

33. The method of claim 32, wherein the length of the payload is at least about 85 meters.

34. The method of claim 33, wherein the length of the payload is at least about 100 meters.

35. The method of claim 34, wherein the length of the payload is at least about 120 meters.

36. The method of any of claims 28 to 35, wherein the payload comprises an irregular payload in which a center of gravity of the irregular payload is located at a separate location than a geometric centroid of the irregular payload.

37. The method of claim 36, wherein the irregular payload is configured to have a compact volume.

38. The method of any of claims 28 to 37, wherein the payload comprises one or more blades of a wind turbine.

39. The method of claim 38, wherein the one or more blades of the wind turbine comprises at least two blades.

40. The method of claim 39, wherein the one or more blades of the wind turbine comprises at least three blades.

41. The method of claim 40, wherein the one or more blades of the wind turbine comprises at least four blades.

42. The method of any of claims 28 to 41, wherein the payload further comprises a plurality of payload-receiving fixtures configured to secure a location of one or more structures therein, and wherein when the payload comprises one or more blades of a wind turbine, the one or more structures comprises the one or more blades of a wind turbine.

43. A cargo aircraft, comprising:
a fuselage defining a forward end, an aft end, and an interior cargo bay that spans a majority of a length of the fuselage from the forward end to the aft end;
a first fixed wing extending from the fuselage in a first direction away from the fuselage;
a second fixed wing extending from the fuselage in a second direction away from the fuselage, the second direction approximately symmetric about a longitudinal-vertical center plane of the cargo aircraft;
a first fuel tank disposed within the first fixed wing; and
a second fuel tank disposed within the second fixed wing,
wherein the first fuel tank extends longitudinally towards the aft end such that it terminates a first significant distance away from a first aft spar of the first fixed wing,
wherein the second fuel tank extends longitudinally towards the aft end such that it terminates a second significant distance away from a second aft spar of the second fixed wing, and wherein the interior cargo bay is configured to have a payload disposed therein that has a length of at least about 57 meters.

44. The cargo aircraft of claim 43, further comprising:
at least one wing-mounted engine coupled to the first fixed wing; and
at least one wing-mounted engine coupled to the second fixed wing.

45. The cargo aircraft of claim 44,
wherein the first fuel tank is disposed within a volume of the first fixed wing and does not extend laterally beyond the at least one wing-mounted engine coupled to the first fixed wing, and
wherein the second fuel tank is disposed within a volume of the second fixed wing and does extend laterally beyond the at least one wing-mounted engine coupled to the second fixed wing.

46. The cargo aircraft of claim 45, wherein at least one of the first fuel tank and the second fuel tank does not extend beyond a wing-mounted engine of the at least one wing-mounted engine that is furthest from the fuselage along the respective first or second fixed wing to which it is coupled.

47. The cargo aircraft of any of claims 43 to 46, further comprising at least one engine mounted on the fuselage.

48. The cargo aircraft of any of claims 43 to 47,
wherein a center of gravity of the first fuel tank is located within a lateral half of the first fixed wing disposed closest to the fuselage, and
wherein a center of gravity of the second fuel tank is located within a lateral half of the second fixed wing disposed closest to the fuselage.

49. The cargo aircraft of claims 43 to 48,
wherein the first significant distance is such that a first longitudinal tank distance the first fuel tank extends longitudinally towards the aft end is less than a first longitudinal open distance between a first longitudinal terminal end of the first fuel tank and the first aft spar as measured from a location at which the first fuel tank is disposed closest to a centerline of the fuselage, and
wherein the second significant distance is such that a second longitudinal tank distance the second fuel tank extends longitudinally towards the aft end is less than a second longitudinal open distance between a second longitudinal terminal end of the first fuel tank and the second aft spar as measured from a location at which the second fuel tank is disposed closest to a centerline of the fuselage.

50. The cargo aircraft of any of claims 43 to 49, wherein a combined fuel tank volume of a volume of the first fuel tank and a volume of the second fuel tank is approximately 20 percent or less than a combined available fuel volume of an available fuel volume of the first fixed wing and an available fuel volume of the second fixed wing.

51. The cargo aircraft of any of claims 43 to 50, further comprising:
one or more rails disposed in the interior cargo bay, the one or more rails extending from the forward end to the aft end of the cargo aircraft, the one or more rails being configured to receive the payload such that the payload is translated along the one or more rails to dispose it a desired location within the cargo bay, the desired location being a location at which a center of gravity of the payload is located proximate to a center of gravity of the cargo aircraft.

52. The cargo aircraft of claim 51, wherein at least one rail of the one or more rails includes a kinked portion such that a vertical distance between at least a portion of the at least one rail aft of the kinked portion and a plane defined by an interior bottom contact surface of the interior cargo bay in the forward end of the cargo aircraft that is substantially parallel to a centerline of the forward end of the cargo aircraft is greater than a vertical distance between at least a portion of the at least one rail forward of the kinked portion and the plane defined by the interior bottom contact surface of the interior cargo bay in the forward end of the cargo aircraft.

53. The cargo aircraft of claim 51 or 52, wherein at least one rail of the one or more rails extends continuously along an interior bottom contact surface of the cargo bay from the forward end of the cargo aircraft to the aft end of the cargo aircraft.

54. The cargo aircraft of any of claims 51 to 53, wherein at least one rail of the one or more rails further serves as a primary structural beam of the cargo aircraft.

55. The cargo aircraft of any of claims 43 to 54, further comprising a cargo nose door configured to open a portion of the forward end of the cargo aircraft to load the payload into the cargo bay through an opening exposed by opening the cargo nose door.

56. The cargo aircraft of any of claims 43 to 55, further comprising:
one or more designated markers provided for in the interior cargo bay, the one or more designated markers being indicative of a location where a payload is to be placed such that a center of gravity of the payload is located proximate to a center of gravity of the cargo aircraft.

57. The cargo aircraft of claim 56, wherein located proximate to a center of gravity of the cargo aircraft further comprises being located within about 25%+/− about 5% MAC of the cargo aircraft.

58. The cargo aircraft of any of claims 43 to 57, wherein the interior cargo bay comprises:
a forward bay portion located in the forward end of the cargo aircraft;
an aft bay portion located in the aft end of the cargo aircraft; and
a kinked bay portion disposed between the forward bay portion and the aft bay portion, the kinked bay portion defining a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft.

59. The cargo aircraft of claim 58, wherein the aft end of the aft bay portion extends above an upper outer surface of the forward end of the fuselage in which the forward bay portion is disposed.

60. The cargo aircraft of claim 58 or 59, wherein a majority of a centerline extending through the aft bay portion forms an angle with a centerline extending through the forward bay portion.

61. The cargo aircraft of any of claims 43 to 60, wherein the interior cargo bay further comprises one or more pre-formed markings formed therein, the one or more pre-formed markings being located such that the one or more pre-formed markings designate a desired location at which a particular payload is located proximate to a center of gravity of the cargo aircraft.

62. The cargo aircraft of claim 61, wherein the one or more pre-formed markings comprise a plurality of pre-designated payload markings, the plurality of pre-designated payload markings comprising at least one pre-formed marking for each type of payload that the interior cargo bay is configured to receive.

63. The cargo aircraft of any of claims 43 to 62, wherein the first and second fixed wings define approximately no sweep angle.

64. The cargo aircraft of any of claims 43 to 63, wherein the interior cargo bay is configured to have a payload disposed therein that has a length of at least about 65 meters.

65. The cargo aircraft of claim 64, wherein the interior cargo bay is configured to have a payload disposed therein that has a length of at least about 75 meters.

66. The cargo aircraft of claim 65, wherein the interior cargo bay is configured to have a payload disposed therein that has a length of at least about 85 meters.

67. The cargo aircraft of claim 66, wherein the interior cargo bay is configured to have a payload disposed therein that has a length of at least about 100 meters.

68. The cargo aircraft of claim 67, wherein the interior cargo bay is configured to have a payload disposed therein that has a length of at least about 120 meters.

69. The cargo aircraft of any of claims 43 to 68, wherein the interior cargo bay is configured to receive an irregular payload in which a center of gravity of the irregular payload is located at a separate location than a geometric centroid of the irregular payload.

70. The cargo aircraft of claim 69, wherein the irregular payload is configured to have a compact volume.

71. The cargo aircraft of any of claims 43 to 70, wherein the interior cargo bay is configured to have one or more blades of a wind turbine disposed therein.

What is claimed is:

1. A method of loading one or more blades of one or more wind turbines onto a cargo aircraft, comprising:
    passing a package that includes one or more blades of one or more wind turbines into an interior cargo bay defined by a fuselage of a cargo aircraft; and
    securing the package at a location within the interior cargo bay such that a center of gravity of the package is located proximate to a center of gravity of the cargo aircraft,
    wherein passing the package into the interior cargo bay further comprises sliding the package along one or more rails disposed in the interior cargo bay to reach the location at which the package is to be secured, the one or more rails extending from a forward end to an aft end of the cargo aircraft,
    wherein at least one rail of the one or more rails extends continuously along an interior bottom contact surface of the interior cargo bay from the forward end of the cargo aircraft to the aft end of the cargo aircraft, the bottom contact surface defining a bottommost surface of the interior cargo bay upon which the package is arranged within the interior cargo bay, and
    wherein the sliding further comprises sliding the package along at least a portion of the at least one rail that is disposed in the aft end of the cargo aircraft.

2. The method of claim 1, wherein the bottom contact surface extends between and interconnects opposing side surfaces of the interior cargo bay.

3. The method of claim 1, wherein located proximate to a center of gravity of the cargo aircraft further comprises being located within about 25%+/− about 5% MAC of the cargo aircraft.

4. The method of claim 1, wherein passing the package into the interior cargo bay further comprises:
    passing the package through an opening formed in a forward end of the cargo aircraft due to a cargo nose door being opened with respect to a main section of the fuselage.

5. The method of claim 1, further comprising:
    packaging the one or more blades to form the package, the package having substantially the same center of gravity of the package each time a new one or more blades is packaged that has a substantially similar configuration as the one or more blades.

6. A method of loading one or more blades of one or more wind turbines onto a cargo aircraft, comprising:
    passing a package that includes one or more blades of one or more wind turbines into an interior cargo bay defined by a fuselage of a cargo aircraft; and
    securing the package at a location within the interior cargo bay such that a center of gravity of the package is located proximate to a center of gravity of the cargo aircraft,
    wherein passing the package into the interior cargo bay further comprises sliding the package along one or more rails disposed in the interior cargo bay to reach the location at which the package is to be secured, the one or more rails extending from a forward end to an aft end of the cargo aircraft, and
    wherein at least one rail of the one or more rails further serves as a primary structural beam of the cargo aircraft configured to bear at least one of operational flight loads or ground loads of the cargo aircraft.

7. The method of claim 6, wherein located proximate to a center of gravity of the cargo aircraft further comprises being located within about 25%+/− about 5% MAC of the cargo aircraft.

8. The method of claim 6, wherein passing the package into the interior cargo bay further comprises:
    passing the package through an opening formed in a forward end of the cargo aircraft due to a cargo nose door being opened with respect to a main section of the fuselage.

9. The method of claim 6,
    wherein at least one rail of the one or more rails extends continuously along an interior bottom contact surface of the cargo bay from the forward end of the cargo aircraft to the aft end of the cargo aircraft, and
    wherein the sliding further comprises sliding the package along at least a portion of the at least one rail that is disposed in the aft end of the cargo aircraft.

10. The method of claim 6, further comprising:
    packaging the one or more blades to form the package, the package having substantially the same center of gravity of the package each time one or more blades is packaged that has a substantially similar configuration as the one or more blades.

11. The method of claim 6, wherein securing the package at a location within the interior cargo bay such that a center of gravity of the package is proximate to a center of gravity of the cargo aircraft further comprises:
    placing one or more ballasts in the interior cargo bay to cause the center of gravity of the package to be located proximate to a center of gravity of the cargo aircraft.

12. The method of claim 1, wherein the one or more blades comprises at least two wind turbine blades.

13. The method of claim 1, wherein the package is an irregular package in which a center of gravity of the irregular package is located at a separate location than a geometric centroid of the irregular package.

14. The method of claim 1, further comprising:
coupling a plurality of payload-receiving fixtures to each blade of the one or more blades, the plurality of payload-receiving fixtures securing a location for each blade of the one or more blades with respect to each payload-receiving fixture of the plurality of payload-receiving fixtures in which the respective blade is received and with respect to each other blade of the one or more blades.

15. The method of claim 14, further comprising:
selecting each payload-receiving fixture of the plurality of payload-receiving fixtures that is coupled to each blade of the one or more blades based on a pre-designation for that payload-receiving fixture that designates a type of package in which each payload-receiving fixture is configured to be used, the type of package comprising various configurations of the one or more blades that depend on at least one of dimensions of the one or more blades or shape of the one or more blades.

16. The method of claim 6, wherein the one or more blades comprises at least two wind turbine blades.

17. The method of claim 6, wherein the package is an irregular package in which a center of gravity of the irregular package is located at a separate location than a geometric centroid of the irregular package.

18. The method of claim 6, further comprising:
coupling a plurality of payload-receiving fixtures to each blade of the one or more blades, the plurality of payload-receiving fixtures securing a location for each blade of the one or more blades with respect to each payload-receiving fixture of the plurality of payload-receiving fixtures in which the respective blade is received and with respect to each other blade of the one or more blades.

19. The method of claim 18, further comprising:
selecting each payload-receiving fixture of the plurality of payload-receiving fixtures that is coupled to each blade of the one or more blades based on a pre-designation for that payload-receiving fixture that designates a type of package in which each payload-receiving fixture is configured to be used, the type of package comprising various configurations of the one or more blades that depend on at least one of dimensions of the one or more blades or shape of the one or more blades.

* * * * *

UNITED STATES PATENT AND TRADEMARK OFFICE
CERTIFICATE OF CORRECTION

PATENT NO. : 12,145,745 B2
APPLICATION NO. : 17/862317
DATED : November 19, 2024
INVENTOR(S) : Etan D. Karni, Scott David Rewerts and Mark Emil Lundstrom Page 1 of 1

It is certified that error appears in the above-identified patent and that said Letters Patent is hereby corrected as shown below:

On the Title Page

Item (72) is corrected as follows:
(72) Inventors: Etan D. Karni, Boulder, CO (US);
Scott David Rewerts, Summerfield, NC
(US); Mark Emil Lundstrom, Boulder,
CO (US)

Signed and Sealed this
First Day of July, 2025

Coke Morgan Stewart
*Acting Director of the United States Patent and Trademark Office*